United States Patent
Haraguchi et al.

(10) Patent No.: US 9,778,073 B2
(45) Date of Patent: Oct. 3, 2017

(54) POSITION SENSOR

(71) Applicant: Panasonic Intellectual Property Management Co., Ltd., Osaka (JP)

(72) Inventors: Kazuma Haraguchi, Osaka (JP); Yoshihiko Sugimoto, Mie (JP); Masahisa Niwa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/110,167

(22) PCT Filed: Jan. 20, 2015

(86) PCT No.: PCT/JP2015/000214
§ 371 (c)(1),
(2) Date: Jul. 7, 2016

(87) PCT Pub. No.: WO2015/115054
PCT Pub. Date: Aug. 6, 2015

(65) Prior Publication Data
US 2016/0334244 A1     Nov. 17, 2016

(30) Foreign Application Priority Data

Jan. 31, 2014   (JP) ................................. 2014-017758

(51) Int. Cl.
*G01D 5/22*         (2006.01)
(52) U.S. Cl.
CPC ............. *G01D 5/22* (2013.01); *G01D 5/2258* (2013.01)
(58) Field of Classification Search
CPC ........ G01D 5/145; G01D 11/245; G01D 5/20; G01D 5/225; G01D 5/3473; G01D 5/485; G01R 33/09

(Continued)

(56) References Cited

U.S. PATENT DOCUMENTS

| 7,514,919 B2 * | 4/2009 | James ................... G01D 5/204 324/207.17 |
| 2005/0030010 A1 | 2/2005 | Jones et al. |

(Continued)

FOREIGN PATENT DOCUMENTS

| JP | 2005-507496 | 3/2005 |
| JP | 2008-509419 | 3/2008 |

(Continued)

OTHER PUBLICATIONS

International Search Report of PCT application No. PCT/JP2015/000214 dated Apr. 14, 2015.

*Primary Examiner* — Melissa Koval
*Assistant Examiner* — Trung Nguyen
(74) *Attorney, Agent, or Firm* — McDermott Will & Emery LLP

(57) ABSTRACT

A position sensor includes a first transmission coil, a second transmission coil having a different shape from the first transmission coil, a receiver coil for receiving electromagnetic waves transmitted from the first and second transmission coils, a transmission waveform generator that inputs first and second input waves to the first and second transmission coils having frequencies identical to each other and having phases different from each other, and a position detector that detects a position of a target provided movably with respect to the first transmission coil, the second transmission coil, and the receiver coil based on a first output signal obtained from the receiver coil in response to the first and second input waves input from the transmission waveform generator to the first and second transmission coils, respectively. The position detector is configured to detect the position of the target based on values obtained by sampling the first output signal obtained from the receiver coil at least two times at a sampling period different from an integer (Continued)

multiple of a half of a period of the first input wave and the second input wave. This position sensor can simplify circuitry.

9 Claims, 23 Drawing Sheets

(58) Field of Classification Search
USPC ...... 324/207.11–207.25, 200, 234, 235, 238, 324/240, 256–258, 300, 310–317, 500, 324/520, 600, 633, 667, 674, 681, 707, 324/727; 702/47, 52
See application file for complete search history.

(56) References Cited

U.S. PATENT DOCUMENTS

| | | |
|---|---|---|
| 2008/0204116 A1 | 8/2008 | James |
| 2011/0109303 A1 | 5/2011 | Zhitomirsky |
| 2016/0153809 A1* | 6/2016 | Pantazi ................ G01D 5/145 324/207.21 |

FOREIGN PATENT DOCUMENTS

| | | |
|---|---|---|
| JP | 2010-145149 | 7/2010 |
| JP | 2011-515674 | 5/2011 |

* cited by examiner

POSITION SENSOR

This application is a U.S. national stage application of the PCT international application No. PCT/JP2015/000214 filed on Jan. 20, 2015, which claims the benefit of foreign priority of Japanese patent application No. 2014-017758 filed on Jan. 31, 2014, the contents all of which are incorporated herein by reference.

TECHNICAL FIELD

The present invention relates to a position sensor that detects a position of a target by using electromagnetic coupling.

BACKGROUND ART

A conventional position sensor that inputs a sine wave and a cosine wave into a sine coil and a cosine coil, respectively, and that detects a position of a target based on an output signal obtained from a receiver coil is known (for example, refer to PTL 1 and PTL 2). This position sensor is adapted to detect the position of the target by measuring a phase of the output signal of the receiver coil since the phase of the output signal of the receiver coil changes depending on the position of the target when the sine wave and the cosine wave are input into the sine coil and the cosine coil, respectively.

This position sensor is adapted to generate the sine wave and the cosine wave by modulating a high-frequency signal, and to input the sine wave and the cosine wave generated by modulating the high-frequency signal into the sine coil and the cosine coil, respectively. This position sensor is adapted to then demodulate the output signal of the receiver coil and to measure the phase of the demodulated signal.

In addition, this position sensor is adapted to input the sine wave and the cosine wave that have a first phase relationship into the sine coil and the cosine coil in a first mode, and to input the sine wave and the cosine wave that have a second phase relationship into the sine coil and the cosine coil in a second mode, respectively. The position sensor is adapted to then measure the phase of the output signal of the receiver coil in the first mode and the phase of the output signal of the receiver coil in the second mode, and to calculate a phase component corresponding to the position of the target based on these phases.

The conventional position sensor has complicated circuitry and may require a long time for detection of the position of the target.

CITATION LIST

Patent Literatures

PTL 1: Japanese Patent Laid-Open Publication No. 2011-515674
PTL 2: Japanese Patent Laid-Open Publication No. 2005-507496

SUMMARY

A position sensor includes a first transmission coil, a second transmission coil having a different shape from the first transmission coil, a receiver coil for receiving electromagnetic waves transmitted from the first and second transmission coils, a transmission waveform generator that inputs first and second input waves to the first and second transmission coils having frequencies identical to each other and having phases different from each other, and a position detector that detects a position of a target provided movably with respect to the first transmission coil, the second transmission coil, and the receiver coil based on a first output signal obtained from the receiver coil in response to the first and second input waves input from the transmission waveform generator to the first and second transmission coils, respectively. The position detector is configured to detect the position of the target based on values obtained by sampling the first output signal obtained from the receiver coil at least two times at a sampling period different from an integer multiple of a half of a period of the first input wave and the second input wave.

This position sensor can simplify circuitry.

DETAIL DESCRIPTION OF PREFERRED EMBODIMENTS

First Exemplary Embodiment

Figure 1A:
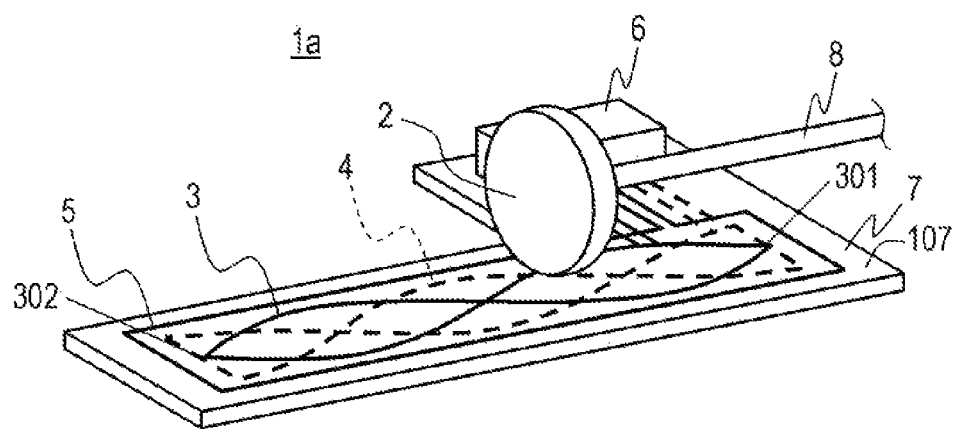
FIG. 1A is a perspective view of a position sensor according to a first exemplary embodiment.
Figure 1B:
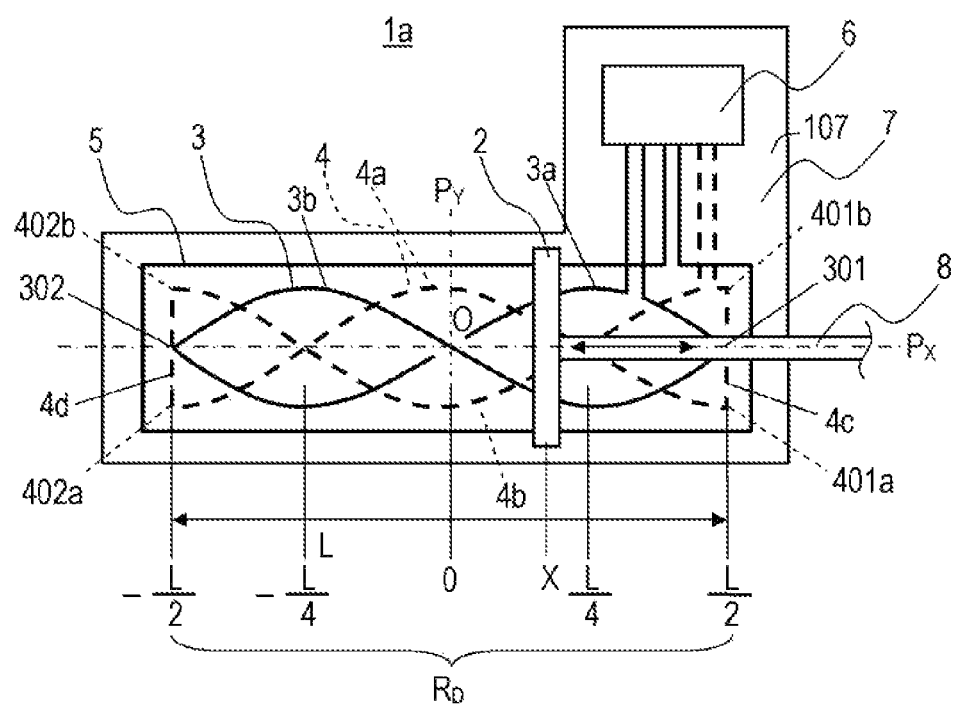
FIG. 1B is a plan view of the position sensor according to the first exemplary embodiment.

FIG. 1A and FIG. 1B are a perspective view and a plan view of position sensor 1a according to a first exemplary embodiment, respectively. Position sensor 1a includes metallic (conductive) target 2 to be detected, sine coil (first transmission coil) 3, cosine coil (second transmission coil) 4, receiver coil 5, and processing circuit unit 6 for detecting a position of target 2. Position sensor 1a detects the position of target 2 by using an electromagnetic coupling between sine coil 3 and receiver coil 5 and an electromagnetic coupling between cosine coil 4 and receiver coil 5 that are different according to the position of target 2.

Sine coil 3, cosine coil 4, receiver coil 5, and processing circuit unit 6 are provided on circuit board 7. Circuit board 7 is a multilayer board that has a surface layer and an inner layer. Sine coil 3 and receiver coil 5 are formed on the surface layer of circuit board 7, and cosine coil 4 is formed on the inner layer of circuit board 7. Sine coil 3 and cosine coil 4 overlap each other in a direction perpendicular to a surface of circuit board 7. Receiver coil 5 surrounds sine coil 3 and cosine coil 4. Sine coil 3, cosine coil 4, and receiver coil 5 are connected to processing circuit unit 6.

Target 2 is provided at an end of movable body 8. Movable body 8 is made of an insulator, such as a nonmetal. Movable body 8 is supported by a supporter to be reciprocally movable along a linear detection area $R_D$ with respect to circuit board 7. That is, target 2 is reciprocally movable along the linear detection area $R_D$ with respect to sine coil 3, cosine coil 4, and receiver coil 5. In addition, target 2 is movable in a place adjacent to surface 107 of circuit board 7 in parallel with surface 107 of circuit board 7 along the detection area $R_D$.

Sine coil 3 and cosine coil 4 are configured to transmit electromagnetic waves (exciting electromagnetic fields) while receiver coil 5 is configured to receive the electromagnetic waves transmitted from sine coil 3 and cosine coil 4 (receiving the excited electromagnetic fields). Processing circuit unit 6 is configured to drive sine coil 3 and cosine coil 4, and to detect the position of target 2 based on an output signal of receiver coil 5.

When a voltage that changes at a certain frequency is input to sine coil 3, a voltage that changes at a frequency identical to the aforementioned frequency is output from receiver coil 5 as an output signal V due to electromagnetic induction. Amplitude of the voltage output from receiver coil 5 changes depending on the shape of sine coil 3 or the position of target 2. This is because the electromagnetic coupling between sine coil 3 and receiver coil 5 changes depending on the shape of sine coil 3 or the position of target 2.

The shapes of sine coil 3, cosine coil 4, and receiver coil 5 will be detailed below. In FIG. 1B, a coordinate axis $P_X$ parallel to surface 107 of circuit board 7 along the detection area $R_D$ is defined, and a coordinate axis $P_Y$ parallel to surface 107 of circuit board 7 is defined. The coordinate axis $P_Y$ crosses the coordinate axis $P_X$ perpendicularly at an origin O, which is a predetermined position in the detection area $R_D$. A position on a $P_X$-$P_Y$ plane including the coordinate axes $P_X$ and $P_Y$ is expressed as coordinates ($p_X$, $p_Y$). The detection area $R_D$ of position sensor 1a has ends 301 and 302 on the coordinate axis $P_X$ along the detection area $R_D$ of target 2. The origin O is a middle point of a line segment having both ends 301 and 302 on the coordinate axis $P_X$, and the origin O is positioned at coordinates (0, 0). The detection area $R_D$ has a length L. That is, ends 301 and 302 of the detection area $R_D$ are distanced by length L. End 301 is positioned at coordinates (L/2, 0) on the coordinate axis $P_X$ while end 302 is positioned at coordinates (−L/2, 0) on the coordinate axis $P_X$.

Sine coil 3 has a first predetermined shape. When a voltage changing at the certain frequency is input into sine coil 3, the output signal of receiver coil 5 has amplitude A1. The first predetermined shape is a shape that causes the amplitude A1 to changes in accordance with a sine function depending on a position X of target 2. This sine function has an origin at the origin O, and has a cycle of the length L of the detection area $R_D$. That is, the first predetermined shape causes the amplitude A1 to be proportional to sin ((2π/L)X).

According to the present exemplary embodiment, a central position of the detection area $R_D$ is the origin O of the position X of target 2.

Specifically, the first predetermined shape is symmetrical with respect to a straight line parallel to a movement path along which target 2 moves along the detection area $R_D$. A length of the shape in a direction of the coordinate axis $P_X$ is identical to the length L of the detection area $R_D$, the shape is twisted by 180 degrees at a position (origin O) at a half of the length, both ends of the shape are aligned with both ends 301 and 302 of the detection area $R_D$, and a center of the shape is aligned with the origin O of the detection area $R_D$. Portions twisted by 180 degrees are not connected to each other but intersect three-dimensionally via an insulator or a space. Sine coil 3 has a width W in a direction of the coordinate axis $P_Y$. When a voltage that changes at a certain frequency is input to sine coil 3 having such a shape, the amplitude A1 of the output signal of receiver coil 5 is proportional to sin $((2\pi/L)X)$. That is, sine coil 3 is a coil configured such that the amplitude A1 is proportional to sin $((2\pi/L)X)$.

Sine coil 3 has the length L in the direction of the detection area $R_D$, that is, the coordinate axis $P_X$, and has a width H in the direction of the coordinate axis $P_Y$. Sine coil 3 has portions 3a and 3b extending from end 301 to end 302. Portion 3a is positioned at coordinates $(p_X, p_Y)$ expressed as the following formula.

$$p_Y=(L/2)\sin((2\pi/L)p_X)$$

(where $-L/2 \leq p_X \leq L/2$)

Portion 3b of sine coil 3 is positioned at coordinates $(p_X, p_Y)$ expressed as the following formula.

$$p_Y=(-L/2)\sin((2\pi/L)p_X)$$

(where, $-L/2 \leq p_X \leq L/2$)

Portions 3a and 3b of sine coil 3 are connected to each other at ends 301 and 302 to form one loop. At the origin O at which portions 3a and 3b intersect, portions 3a and 3b are not connected to each other, but are separated.

In addition, when a voltage that changes at the certain frequency is input to cosine coil 4, a voltage that changes at a frequency identical to the certain frequency is output from receiver coil 5 due to electromagnetic induction. Amplitude of the voltage that is output from receiver coil 5 changes depending on the shape of cosine coil 4 or the position X of target 2. This is because an electromagnetic coupling between cosine coil 4 and receiver coil 5 changes depending on the shape of cosine coil 4 or the position X of target 2.

Cosine coil 4 has a second predetermined shape. When a voltage that changes at the certain frequency is input to cosine coil 4, the output signal of receiver coil 5 has amplitude A2. The second predetermined shape causes the amplitude A2 to change in accordance with a cosine function depending on the position X of target 2. The cosine function has the origin O at a predetermined position within the detection area $R_D$, and has a cycle of the length L of the detection area $R_D$. That is, the second predetermined shape is a shape that causes the amplitude A2 to be proportional to cos $(2\pi X/L)$.

Specifically, the second predetermined shape is symmetrical with respect to the straight line parallel to the movement path along which target 2 moves along the detection area $R_D$. A length of the shape in the direction of the coordinate axis $P_X$ is identical to the length L of the detection area $R_D$, the shape is twisted by 180 degrees at each of a position of ¼ of the length and a position of ¾ of the length, and both ends of the shape are aligned with both ends 301 and 302 of the detection area $R_D$. Portions twisted by 180 degrees are not connected to each other but intersect three-dimensionally via an insulator or a space. A width of cosine coil 4 in the direction of the coordinate axis $P_Y$ is a width H of sine coil 3. When a voltage that changes at a certain frequency is input to cosine coil 4 having such a shape, the amplitude A2 of the output signal of receiver coil 5 is proportional to cos$((2\pi/L)X)$. That is, cosine coil 4 is a coil configured so that the amplitude A2 is proportional to cos$((2\pi/L)X)$.

Similarly to sine coil 3, cosine coil 4 has the length L in the direction of the detection area $R_D$, that is, the coordinate axis $P_X$, and has the width H in the direction of the coordinate axis $P_Y$. Sine coil 3 includes portion 4a extending from corner 401a (L/2, −H/2) which is end 301 in the direction of the coordinate axis $P_X$ to corner 402a (−L/2, −H/2) which is end 302, portion 4b extending from corner 401b (L/2, H/2) which is end 301 in the direction of the coordinate axis $P_X$ to corner 402b (−L/2, H/2) which is end 302, linear portion 4c extending from corner portion 401a (L/2, −H/2) which is end 301 in the direction of the coordinate axis $P_X$ to corner 401b (L/2, H/2), and linear portion 4d extending from corner 402a (−L/2, −H/2), which is end 302 in the direction of the coordinate axis $P_X$ to corner 402b (−L/2, H/2).

Portion 4a of cosine coil 4 is positioned at coordinates $(p_X, p_Y)$ expressed as the following formula.

$$p_Y=(L/2)\cos((2\pi/L)p_X)$$

(where, $-L/2 \leq p_X \leq L/2$)

Portion 4b of cosine coil 4 is positioned at coordinates $(p_X, p_Y)$ expressed as the following formula.

$$p_Y=(-L/2)\sin((2\pi/L)p_X)$$

(where, $-L/2 \leq p_X \leq L/2$)

Portion 4c of cosine coil 4 is positioned at coordinates $(p_X, p_Y)$ expressed as the following formula.

$$p_X=L/2 \text{ (where, } -H/2 \leq p_Y \leq H/2)$$

Portion 4d of cosine coil 4 is positioned at coordinates $(p_X, p_Y)$ expressed as the following formula.

$$p_X=-L/2 \text{ (where, } -H/2 \leq p_Y \leq H/2)$$

Portions 4a and 4c of cosine coil 4 are connected to each other at corner 401a. Portions 4a and 4d of cosine coil 4 are connected to each other at corner 402a. Portions 4b and 4c of cosine coil 4 are connected to each other at corner 401b. Portions 4b and 4d of cosine coil 4 are connected to each other at corner 402b. Thus, portions 4a to 4d of cosine coil 4 are connected to each other at corners 401a, 401b, 402a, and 402b to form one loop. At a position (L/4, 0) and position (−L/4, 0) at which portions 4a and 4b intersect, portions 4a and 4b are not connected to each other, but are separated.

Sine coil 3 and cosine coil 4 are positioned within a rectangular area with vertexes of corner portions 401a, 401b, 402a, and 402b. Receiver coil 5 has a rectangular shape surrounding the rectangular area in which sine coil 3 and cosine coil 4 are positioned.

Figure 2:
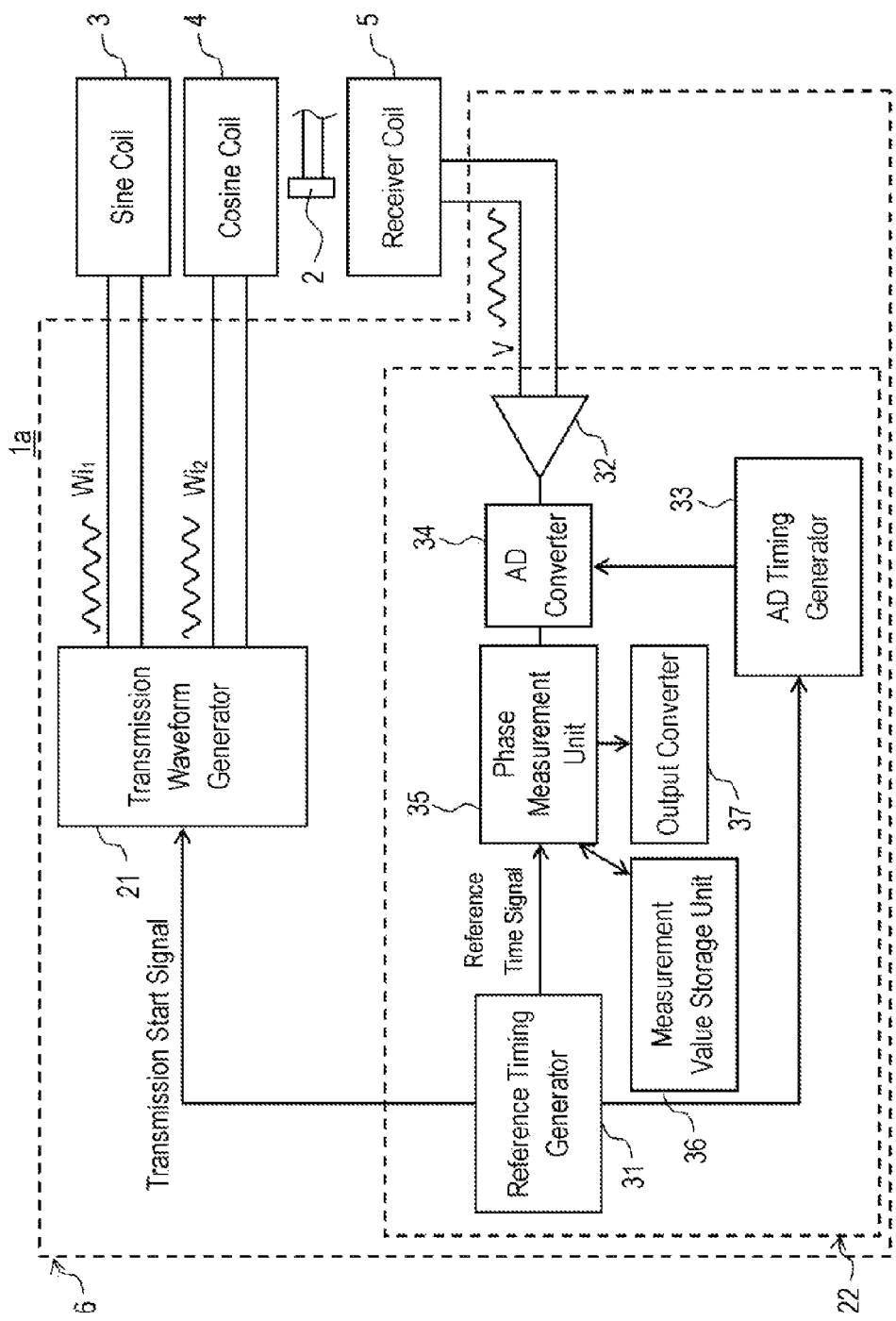
FIG. 2 is a circuit block diagram of the position sensor according to the first exemplary embodiment.

FIG. 2 is a circuit block diagram of position sensor 1a. Processing circuit unit 6 includes transmission waveform generator 21 that inputs input waves $Wi_1$ and $Wi_2$ to sine coil 3 and cosine coil 4, respectively, and position detector 22 that detects the position X of target 2 based on the output signal V obtained from receiver coil 5.

Position detector 22 includes reference timing generator 31 that generates a signal indicating various kinds of timing necessary for detection of the position X of target 2. Position detector 22 further includes amplifier 32 that amplifies the output signal V obtained from receiver coil 5, and analog-to-digital (A/D) timing generator 33 and A/D converter 34 for sampling an output from amplifier 32, that is, the output signal V of receiver coil 5. Position detector 22 further includes phase measurement unit 35 that measures a phase component $\theta_X$ included in the output signal V of receiver coil 5, measurement value storage unit 36 that stores various measurement values temporarily, and output converter 37. The phase component $\theta_X$ corresponds to the position X of target 2. Output converter 37 converts the phase component $\theta_X$ into the position X.

Reference timing generator 31 transmits a transmission start signal to transmission waveform generator 21. The transmission start signal is a signal that indicates input start timing of the input wave $Wi_1$ and the input wave $Wi_2$ into sine coil 3 and cosine coil 4, respectively. The transmission start signal instructs input start of the input wave $Wi_1$ and the input wave $Wi_2$ into sine coil 3 and cosine coil 4, respectively. In addition, after transmitting the transmission start signal, reference timing generator 31 transmits a reference time signal to phase measurement unit 35. The reference time signal is a signal indicating that the transmitted time is reference timing for phase measurement, and the reference time signal instructs start of an operation for phase measurement.

Reference timing generator 31 repeats transmission of the transmission start signal and transmission of the reference time signal at a predetermined operation period. Reference timing generator 31 transmits the reference time signal when delay time ta elapses from transmission of the transmission start signal, and then reference timing generator 31 transmits the transmission start signal when measurement operation time tb elapses from transmission of the reference time signal. Thus, reference timing generator 31 repeats transmission of the reference time signal and the transmission start signal alternately at an operation period (ta+tb). The delay time ta is a certain time shorter than waiting time tw in a phase measurement operation performed by phase measurement unit 35 described later. The measurement operation time tb is longer than the waiting time tw, and is required for the phase measurement operation performed by phase measurement unit 35.

Figure 3:
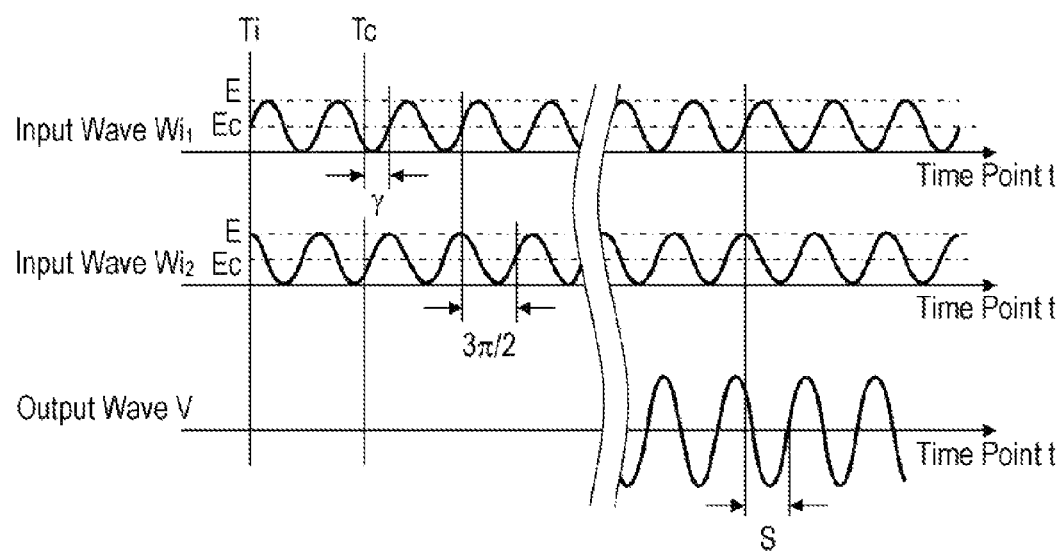
FIG. 3 illustrates rectangular waves that are input into a sine coil and a cosine coil, and an output signal of a receiver coil of the position sensor according to the first exemplary embodiment.

FIG. 3 illustrates the input waves $Wi_1$ and $Wi_2$ input from transmission waveform generator 21 into sine coil 3 and cosine coil 4, respectively, and the output signal V obtained from receiver coil 5.

Transmission waveform generator 21 inputs, to sine coil 3 and cosine coil 4, the input wave $Wi_1$ and the input wave $Wi_2$ that have fundamental frequencies f identical to each other and phases different from each other, respectively. The input waves $Wi_1$ and $Wi_2$ have a predetermined phase relationship with each other. According to the present exemplary embodiment, the predetermined phase relationship is a phase relationship in which the phase of the input wave $Wi_2$ that is input to cosine coil 4 is delayed by $3\pi/2$ with respect to the phase of the input wave $Wi_1$ that is input to sine coil 3. In addition, according to the present exemplary embodiment, the input waves $Wi_1$ and $Wi_2$ are sine waves. In addition, according to the present exemplary embodiment, the fundamental frequency f of the input waves $Wi_1$ and $Wi_2$ is 2 MHz. Transmission waveform generator 21 starts inputting the input wave $Wi_1$ and the input wave $Wi_2$ to sine coil 3 and cosine coil 4, respectively, in response to the transmission start signal that is input from reference timing generator 31.

Inputting of the input waves $Wi_1$, $Wi_2$ is executed as follows. As illustrated in FIG. 3, both the input waves $Wi_1$ and $Wi_2$ are sine wave voltages that oscillate at the fundamental frequency f, and have a voltage value E and a central voltage Ec of amplitude of oscillation with the voltage value E. At input time point Ti at which the transmission start signal is input, the input wave $Wi_1$ changes from E<Ec to E>Ec. In addition, at a time point delayed by time of $(1/f) \times (\frac{3}{4})$ from the input time point Ti of the transmission start signal, the input wave $Wi_2$ changes from E<Ec to E>Ec.

The input wave $Wi_1$ that is input into sine coil 3 has phase delay $\gamma$ ($\gamma>0$) with respect to reference time point Tc. That is, at time point when phase delay $\gamma$ elapses from the reference time point Tc, the input wave $Wi_1$ changes from E<Ec to E>Ec for the first time after the reference time point Tc. When phase delay ($\gamma+3\pi/2$) elapses from certain reference time point Tc, the input wave $Wi_2$ that is input into cosine coil 4 changes from E<Ec to E>Ec after the reference time point Tc. The reference time point Tc may be arbitrarily determined, and phase delay $\gamma$ is a phase offset component generated depending on the reference time point Tc. If the time point when the input wave $Wi_1$ changes from E<Ec to E>Ec, for example, if the input time point Ti of the transmission start signal is determined to be the reference time point Tc, then phase delay $\gamma$ becomes 0 ($\gamma=0$), the phase of the input wave $Wi_1$ becomes zero, and the phase of the input wave $Wi_2$ becomes $3\pi/2$. According to the present exemplary embodiment, the phase relationship between the input wave $Wi_1$ and the input wave $Wi_2$ is a phase relationship in which the phase of the input wave $Wi_2$ is delayed by $3\pi/2$ with respect to the phase of the input wave $Wi_1$.

When the input waves $Wi_1$ and $Wi_2$ are input into sine coil 3 and cosine coil 4, respectively, the output signal V is output from receiver coil 5. The output signal V changes at the fundamental frequency f of the input waves $Wi_1$ and $Wi_2$, and is delayed by a phase difference S with respect to the input wave $Wi_1$.

The output signal V which is a voltage obtained from receiver coil 5 at time t while transmission waveform generator 21 inputs the input waves $Wi_1$ and $Wi_2$ into sine coil 3 and cosine coil 4 is expressed as Formula 1 below.

$$V \propto \sin\left(2\pi ft - \left(\frac{2\pi}{L}X + \alpha\right)\right) = \sin(2\pi ft - \theta) \quad \text{[Formula 1]}$$

where $$\theta = \frac{2\pi}{L}X + \alpha$$

$$\alpha = \gamma + \delta - \frac{\pi}{2}$$

A phase offset $\alpha$ contains the phase offset component $\gamma$ and a phase offset component $\delta$. The phase offset component $\gamma$ is generated according to the reference time point Tc, and corresponds to the phase (phase delay) of the input wave $Wi_1$ with respect to the reference time point Tc. The phase offset component $\delta$ is generated by a factor, such as temperature.

The output signal V is calculated by Formula 1 for the following reason. The output signal V is obtained by a sum or superimposition of a signal that is output from receiver coil 5 in response to the input wave $Wi_1$ that is input into sine coil 3 and a signal that is output from receiver coil 5 in response to the input wave $Wi_2$ that is input into cosine coil 4.

The signal that is output from receiver coil 5 in response to the input wave $Wi_1$ that is input into sine coil 3, to which the phase delay of the phase offset component δ generated by a factor, such as a temperature, is added is expressed as Formula 2.

$$A_1 \sin(2\pi ft - \gamma - \delta) = \sin\left(\frac{2\pi}{L}X\right) \sin(2\pi ft - (\gamma + \delta))$$ [Formula 2]

The signal that is output from receiver coil 5 in response to the input wave $Wi_2$ that is input into cosine coil 4, to which the phase delay of the phase offset component δ generated by a factor, such as a temperature, is added is expressed as Formula 3 below.

$$A_2 \sin\left(2\pi ft - \left(\gamma + \frac{3\pi}{2}\right) - \delta\right) = \cos\left(\frac{2\pi}{L}X\right) \cos(2\pi ft - (\gamma + \delta))$$ [Formula 3]

A signal obtained through superimposition (addition) of the signal expressed as Formula 2 and the signal expressed as Formula 3 is the output signal V. Addition of Formula 2 to Formula 3 provides Formula 1 representing the output signal V.

As shown in Formula 1, the output signal V changes at the fundamental frequency f of the input waves $Wi_1$ and $Wi_2$. In addition, the phase θ (=(2π/L)X+δ−π/2+γ) of the output signal V expressed as Formula 1 is the phase with respect to the reference time point Tc. When θ>0, the phase θ is a phase delay with respect to the reference time point Tc. That is, the output signal V is delayed by the phase difference S(=(2π/L)X+δ−π/2) with respect to the input wave $Wi_1$.

The phase θ includes the phase component $\theta_X$ (=(2π/L)X) corresponding to the position X of target 2, and the phase offset α (=δ+γ−π/2). The phase θ is expressed as θ=$\theta_X$+α by using the phase component $\theta_X$ and the phase offset α. Thus, the phase θ has a value that changes depending on the position X of target 2.

Figure 4A:
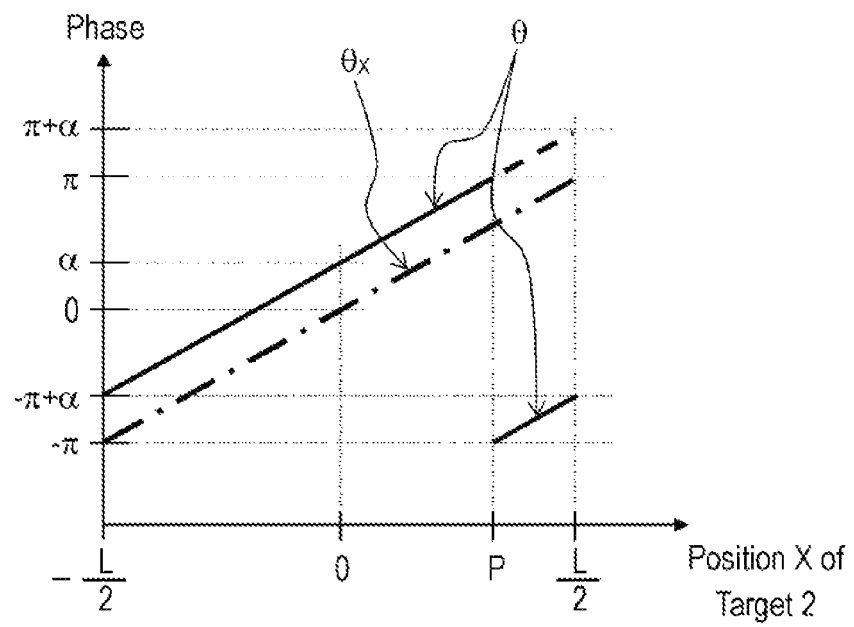
FIG. 4A illustrates a relationship between a position of a target and a phase of the output signal of the position sensor according to the first exemplary embodiment.
Figure 4B:
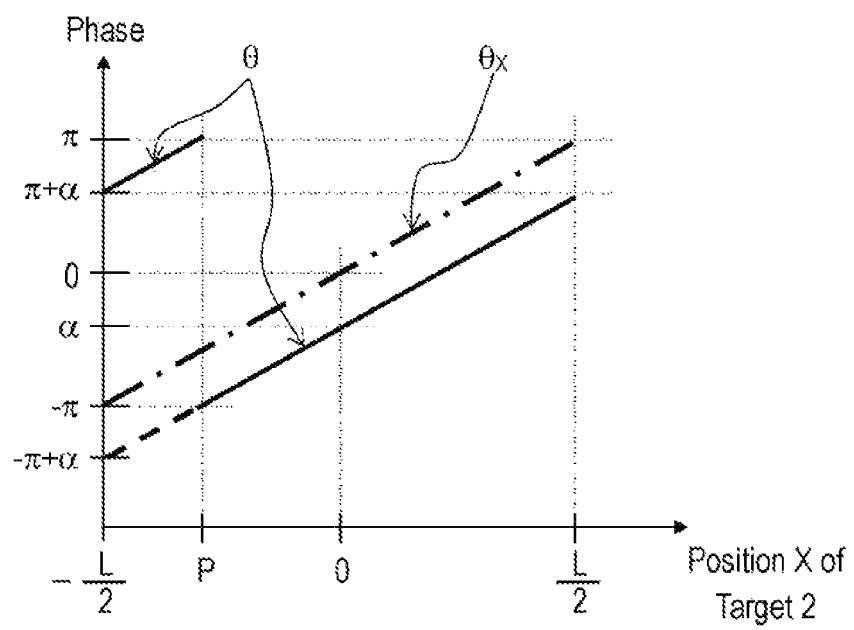
FIG. 4B illustrates the relationship between the position of the target and the phase of the output signal of the position sensor according to the first exemplary embodiment.

FIG. 4A and FIG. 4B illustrate relationships between the position X of target 2 and the phase θ. In each of FIG. 4A and FIG. 4B, the vertical axis represents the phase θ, and the horizontal axis represents the position X of target 2 in coordinate $p_X$ of the coordinate axis $P_X$. The phase component $\theta_X$ corresponding to the position X in the horizontal axis is proportional to the position X of target 2. The phase component $\theta_X$ increases from −π to π in a range of the position X of target 2 from left end 302 (X=−L/2) to right end 301 (X=L/2) of the detection area $R_D$. The phase θ is a value obtained by adding the phase offset α to the phase component $\theta_X$. Therefore, when the phase offset α is a positive value, as illustrated in FIG. 4A, the phase θ increases from −π+α to t in a range of the position X of target 2 from left end 302 of the detection area $R_D$ to a periodic point P, and the phase θ increases from −π to −π+α in a range of the position X of target 2 from the periodic point P to right end 301 of the detection area $R_D$. In addition, when the phase offset $\theta_X$ is a negative value, as illustrated in FIG. 4B, the phase θ increases from π+α to α in a range of the position X of target 2 from left end 302 of the detection area $R_D$ to the periodic point P, and the phase θ increases from −π to π+α in a range of the position X of target 2 from the periodic point P to right end 301 of the detection area $R_D$.

When the phase offset α is a positive value, the periodic point P is obtained by P=L/2−(L/2π)×α. When the phase offset α is a negative value, the periodic point P is obtained by P=−L/2−(L/2π)×α. As the phase offset α decreases (closer to 0), the periodic point P approaches L/2 (right end 302 of the detection area $R_D$) or −L/2 (left end 301 of the detection area $R_D$) depending on the signature of the phase offset α.

Since the phase θ is expressed as θ=$\theta_X$+α, when the phase θ and the phase offset α are known, the phase component $\theta_X$ can be calculated from a relationship of θ=$\theta_X$+α, and the position X of target 2 can be calculated from a relationship of $\theta_X$=(2π/L)X.

A/D timing generator 33 transmits an A/D timing signal to A/D converter 34. The A/D timing signal is a signal that indicates timing of sampling the output signal V of receiver coil 5 (output of amplifier 32), that is, timing of A/D converting the output signal V of receiver coil 5. While the A/D timing signal is input from A/D timing generator 33, A/D converter 34 samples a potential value y of the output signal V of receiver coil 5 at timing at which the A/D timing signal is input, and then outputs the potential value y to phase measurement unit 35.

Figure 5:
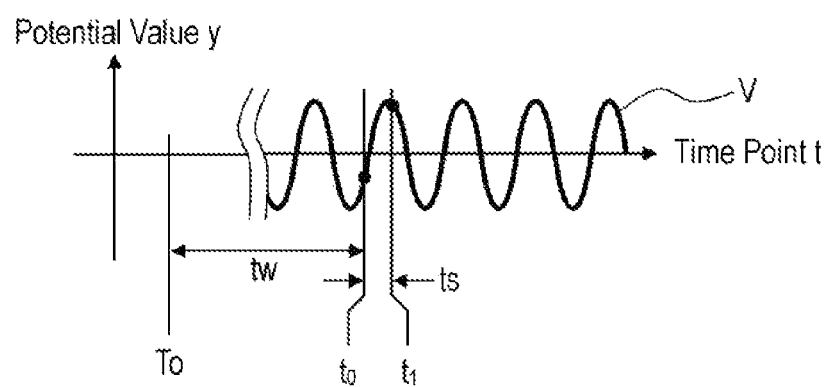
FIG. 5 illustrates the output signal of the receiver coil sampled by an A/D timing generator and an A/D converter of the position sensor according to the first exemplary embodiment.

FIG. 5 illustrates the output signal V of receiver coil 5 sampled by A/D timing generator 33 and A/D converter 34. A/D timing generator 33 transmits the A/D timing signal to A/D converter 34 at predetermined sampling period ts. The sampling period ts is a period different from an integer multiple of a half of a period of the input waves $Wi_1$ and $Wi_2$ that are input into sine coil 3 and cosine coil 4, respectively. That is, since the period of the input waves $Wi_1$ and $Wi_2$ is 1/f, the sampling period ts is expressed as ts=((1/f)/2)×I, where i is an arbitrary natural number (a positive integer). For example, the sampling period ts is expressed as ts=((1/f)/2)×($N_L$×h+$N_W$)/$N_L$, where $N_L$ is an arbitrary natural number not smaller than 2, h is 0 or an arbitrary natural number, and $N_W$ is an arbitrary natural number not larger than $N_L$−1. Since $N_L$×h+$N_W$ is not an integer multiple of $N_L$, ($N_L$×h+$N_W$)/$N_L$ is not an integer. Therefore, the sampling period ts expressed as ts=((1/f)/2)×($N_L$×h+$N_W$)/$N_L$ is a period different from an integer multiple of a half of the period of the input waves $Wi_1$ and $Wi_2$.

That is, A/D timing generator 33 transmits the A/D timing signal to A/D converter 34 at the sampling period ts expressed as ts=((1/f)/2)×($N_L$×h+$N_W$)/$N_L$. Accordingly, based on the A/D timing signal, A/D converter 34 samples the potential value y of the output signal V of receiver coil 5 at the sampling period ts expressed as ts=((1/f)/2)×($N_L$×h+$N_W$)/$N_L$ (a period different from an integer multiple of a half of the period of the input waves $Wi_1$ and $Wi_2$). Then, A/D converter 34 outputs the sampled potential value y to phase measurement unit 35. According to the present exemplary embodiment, $N_L$=3, h=0, $N_W$=1, and ts=(1/f)/6 (60 degrees expressed in phase).

Based on the output of A/D converter 34, that is, based on the output signal V obtained from receiver coil 5, phase measurement unit 35 measures the phase component $\theta_X$ that corresponds to the position X of target 2 and that is included in the phase of the output signal V obtained from receiver coil 5.

The potential value y of the output of receiver coil 5 may be expressed as y=A sin(2πft−θ)+B as a function of time t if distortion and the like do not occur in the waveform. Here, A is amplitude, B is a central voltage of oscillation, and θ is a phase (a phase delay if θ>0). The central voltage B of oscillation is a value that may be arbitrarily determined based on circuit design. According to the present exemplary embodiment, B is known, and is B=0. Therefore, the potential value y of the output signal V of receiver coil 5 may be expressed as y=A sin(2πft−θ)+B according to the present exemplary embodiment.

The potential value y (=A sin(2πft−θ)) includes two unknown coefficients, A and θ. Accordingly, values of A and θ may be calculated from values of two different sets of (t, y), that is, ($t_0$, $y_0$) and ($t_1$, $y_1$). In other words, the values of A and θ may be calculated by simultaneous formulas expressed as Formula 4 below.

$$y_0 = A\sin(2\pi f t_0 - \theta)$$
$$y_1 = A\sin(2\pi f t_1 - \theta)$$

where $$t_1 \neq t_0 + \left(\frac{1}{2f}\right) \times i$$

[Formula 4]

(i is an arbitrary integer).

That is, a time interval ($t_1$-$t_0$) between time point to and time point $t_1$ is a time interval different from ((1/f)/2)×i (an integer multiple of a half of the period of the input waves $Wi_1$ and $Wi_2$). This is because ($t_0$, $y_0$) and ($t_1$, $y_1$) need to be values of two different sets of (t, y) in consideration that y=A sin(2πft−θ)+B has periodicity of 1/f. A/D converter 34 samples the potential value y at the sampling period is (=((1/f)/2)×($N_L$×h+$N_W$)/$N_L$ (a period different from an integer multiple of a half of the period of the input waves $Wi_1$ and $Wi_2$). Therefore, the potential value y is sampled by A/D converter 34 at time points $t_0$ and $t_1$.

The potential values $y_0$ and $y_1$ measured at time points $t_0$ and $t_1$, respectively, provide the values of the two different sets of (t, y), that is, ($t_0$, $y_0$) and ($t_1$, $y_1$). Then, by using those values to solve the simultaneous formulas (Formula 4), the value of the phase θ may be calculated. Solving the simultaneous formulas (Formula 4) provides the phase θ of Formula 5 below.

$$\theta = 2\pi f t_0 - \tan^{-1}\left(\frac{y_0 \sin(2\pi f(t_1 - t_0))}{y_1 - y_0 \cos(2\pi f(t_1 - t_0))}\right)$$

[Formula 5]

The phase θ calculated by Formula 5 is the phase θ of the output signal V of receiver coil 5 with respect to reference time point (time point 0) of time points $t_0$ and $t_1$ (phase reference time point Tc).

Formula 5 is derived as follows. Formula 6 below is obtained from the second formula of Formula 4.

$$y_1 = A\sin(2\pi f t_1 - \theta)$$
$$= A\sin(2\pi f t_0 + 2\pi f(t_1 - t_0) - \theta)$$
$$= A\sin(2\pi f t_0 - \theta)\cos(2\pi f(t_1 - t_0)) +$$
$$A\cos(2\pi f t_0 - \theta)\sin(2\pi f(t_1 - t_0))$$

[Formula 6]

Formula 7 below is obtained from Formula 6 and the first formula of Formula 4.

$$\frac{\sin(2\pi f t_0 - \theta)}{\cos(2\pi f t_0 - \theta)} = \frac{y_0 \sin(2\pi f(t_1 - t_0))}{y_1 - y_0 \cos(2\pi f(t_1 - t_0))}$$

[Formula 7]

Formula 8 below is obtained from Formula 7.

$$2\pi f t_0 - \theta = \tan^{-1}\left(\frac{y_0 \sin(2\pi f(t_1 - t_0))}{y_1 - y_0 \cos(2\pi f(t_1 - t_0))}\right)$$

[Formula 8]

Therefore, Formula 5 is obtained from Formula 8. The phase θ may also be expressed as Formula 9 below.

$$\theta = \tan^{-1}\left(\frac{y_1 \sin(2\pi f t_0) - y_0 \sin(2\pi f t_1)}{y_1 \cos(2\pi f t_0) - y_0 \cos(2\pi f t_1)}\right)$$

[Formula 9]

Phase measurement unit 35 measures the phase component $\theta_X$ that corresponds to the position X of target 2 and that is included in the phase θ of the output signal V obtained from receiver coil 5 based on output of A/D converter 34, that is, based on the output signal V obtained from receiver coil 5.

Phase measurement unit 35 executes the phase measurement operation for measuring the phase component $\theta_X$ corresponding to the position X of target 2 in response to the reference time signal that is input from reference timing generator 31. In the phase measurement operation, phase measurement unit 35 measures the phase θ of the output signal V obtained from receiver coil 5 based on the output of A/D converter 34, and then, stores the measured value in measurement value storage unit 36 as a measurement value θ* of the phase θ. Then, in the phase measurement operation, based on the measurement value θ* and a reference value α0 of the phase offset α, phase measurement unit 35 calculates the phase component $\theta_X$ corresponding to the position X of target 2. That is, phase measurement unit 35 calculates the measurement value $\theta_X$*(=θ*−$\alpha_0$) as the phase component $\theta_X$. The reference value $\alpha_0$ is a value of the phase θ measured when the position X of target 2 is at the origin O (when target 2 is positioned at the origin O which is a center of the detection area $R_D$). The reference value $\alpha_0$ is measured, for example, in a manufacturing process of position sensor 1a and is stored in phase measurement unit 35.

Phase measurement unit 35 measures the phase θ as follows. Phase measurement unit 35 acquires the potential value y of the output signal V of receiver coil 5 sampled by A/D converter 34 (output from A/D converter 34), numbers the acquired potential value y sequentially, and stores the potential value y in measurement value storage unit 36. However, until the predetermined waiting time tw elapses from input time point To of the reference time signal, phase measurement unit 35 does not acquire the potential value y of the output signal V of receiver coil 5. This operation prevents wrong detection while the output signal V of receiver coil 5 is not stable. The waiting time tw is a time interval for waiting for amplitude of the output signal V of receiver coil 5 to become stable, and is a predetermined time interval. The time point when the waiting time tw ends coincides with a time point at which the potential value y is sampled by A/D converter 34.

At this moment, phase measurement unit 35 stores, in measurement value storage unit 36, the potential value y sampled twice by A/D converter 34. That is, phase measurement unit 35 stores, in measurement value storage unit 36, the potential value y sampled when the waiting time tw elapses from the input time point To of the reference time signal as a potential value $y_0$. Then, phase measurement unit 35 stores, in measurement value storage unit 36, the potential value y sampled next time as a potential value $y_1$. Accordingly, measurement value storage unit 36 stores the potential values $y_0$ and $y_1$ sampled twice at the sampling period ts (=((1/f)/2)×($N_L$×h+$N_W$)/$N_L$), which is different from an integer multiple of a half of the period of the input waves $Wi_1$ and $Wi_2$.

Then, based on the two potential values $y_0$ and $y_1$ stored in measurement value storage unit 36, phase measurement unit 35 calculates the phase θ of the output signal V of receiver coil 5. That is, phase measurement unit 35 calculates the phase θ by Formula 5 described above.

In this case, time points $t_0$ and $t_1$ are time points when the input time point To of the reference time signal is used as reference time (time 0). The potential values $y_0$ and $y_1$ are the potential value y at time points $t_0$ and $t_1$, respectively. The phase θ thus calculated is the phase θ of the output signal V of receiver coil 5 when the input time point To of the reference time signal is used as a reference (phase reference time point Tc). Phase measurement unit 35 defines the phase θ thus calculated as the phase measurement value θ* of the output signal V of receiver coil 5. The reference value $α_0$ of the phase offset α is a value calculated by a method identical to this method.

Since the input time point To of the reference time signal is the reference time point Tc of the phase θ, and a time difference between the input time point Ti of the transmission start signal and the input time point To of the reference time signal is constant (delay time ta) in each measurement, the phase offset component γ is constant in each measurement. That is, unless the phase offset component δ changes due to a factor, such as a temperature, the phase offset α (the phase θ when the position X of target 2 is 0) is constant, i.e., $α=α_0$. Therefore, the measurement value $θ_X*(=θ*-α_0)$ calculated in the phase measurement operation is the phase component $θ_X$ corresponding to the position X of target 2 under a condition that the offset component δ does not change due to a factor, such as a temperature.

Output converter 37 converts the phase component $θ_X$ (measurement value $θ_X*$) measured by phase measurement unit 35 into the position X of target 2. That is, output converter 37 calculates $θ_X×(L/2π)$ as the position X of target 2 based on a relationship of $θ_X=(2π/L)X$. Then, output converter 37 outputs calculated position X of target 2.

In the entire operation of position detector 22, position detector 22 measures the phase θ of the output signal V obtained from receiver coil 5 based on the potential value y obtained by samplings the output signal V obtained from receiver coil 5 two times at the sampling period is different from an integer multiple of a half of the period of the input waves $Wi_1$ and $Wi_2$. Then, based on the phase θ and the reference value $α_0$ of the phase offset α, position detector 22 calculates the phase component $θ_X$ corresponding to the position X of target 2 to detect the position X of target 2.

An entire operation of position sensor 1a will be described below. First, reference timing generator 31 transmits the transmission start signal to transmission waveform generator 21. Transmission waveform generator 21 receives the transmission start signal, and to start inputting the input wave $Wi_1$ and the input wave $Wi_2$ into sine coil 3 and cosine coil 4, respectively. This causes receiver coil 5 to output the output signal V.

In addition, reference timing generator 31 transmits the reference time signal to phase measurement unit 35. Phase measurement unit 35 receives the reference time signal, starts the phase measurement operation, and stores, in measurement value storage unit 36, the measurement value θ* obtained by measuring the phase θ. Then, based on the measurement value θ* of the phase θ and the reference value $α_0$ of the phase offset α stored in measurement value storage unit 36, phase measurement unit 35 calculates the phase component $θ_X*$ corresponding to the position X of target 2 by $θ*-α_0$. Then, output converter 37 calculates and outputs the position X of target 2 by $θ_X*×(L/2π)$.

After that, reference timing generator 31 repeats transmission of the transmission start signal to transmission waveform generator 21, and transmission of the reference time signal to phase measurement unit 35. Accordingly, the aforementioned operation is repeated, and the position X of target 2 is calculated and output continuously.

Figure 6A:
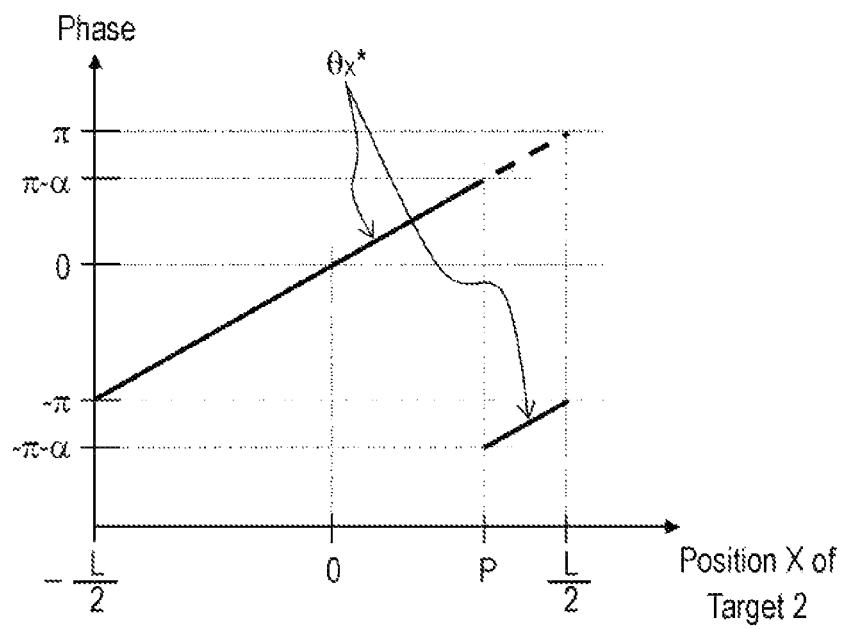
FIG. 6A illustrates a measurement value of a phase component corresponding to the position of the target included in the output signal of the receiver coil of the position sensor according to the first exemplary embodiment.
Figure 6B:
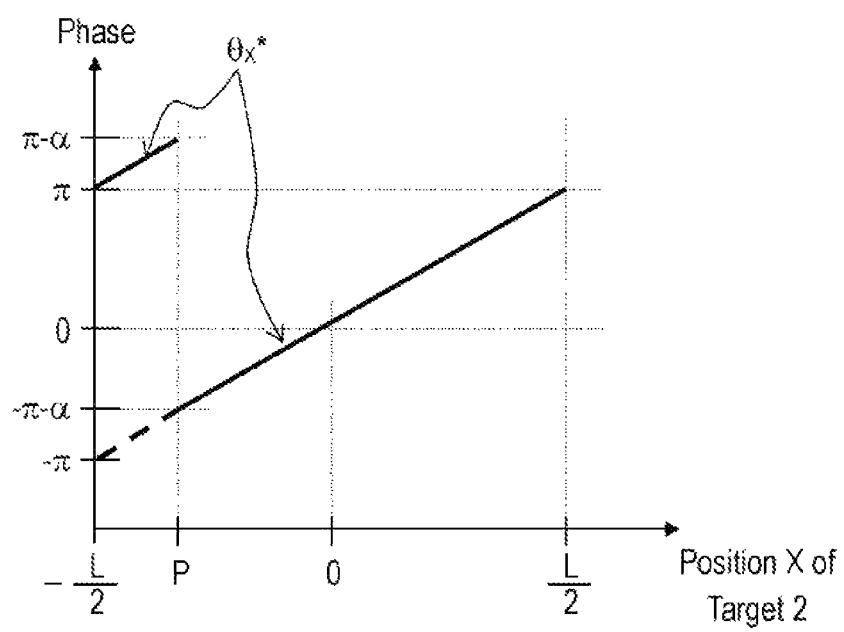
FIG. 6B illustrates the measurement value of the phase component corresponding to the position of the target included in the output signal of the receiver coil of the position sensor according to the first exemplary embodiment.

FIG. 6A and FIG. 6B illustrate a relationship between the position X of target 2 and the measurement value $θ_X*$ of the phase component $θ_X$. In FIG. 6A and FIG. 6B, the vertical axis represents the measurement value θ* of the phase θ, and the horizontal axis represents the position X of target 2 in coordinate $p_X$ of the coordinate axis $P_X$. In the case that the phase offset α is a positive value, as illustrated in FIG. 6A, when the position X of target 2 ranges from left end 302 (X=-L/2) of the detection area $R_D$ to the periodic point P, the measurement value $θ_X*$ is proportional to the position X of target 2, and increases from $-π$ to $π-α$ in the range from left end 302 of the detection area $R_D$ to the periodic point P. In addition, in the case that the phase offset α is a positive value, the measurement value $θ_X*$ increases from $-π-α$ to $-π$ in a range from the periodic point P to right end 301 (X=L/2) of the detection area $R_D$. That is, in the case where the phase offset α is a positive value, in the range from left end 302 of the detection area $R_D$ to the periodic point P, the measurement value $θ_X*$ is identical to the actual phase component $θ_X$ (refer to the phase component $θ_X$ shown in FIG. 4A and FIG. 4B). In the other range, the measurement value $θ_X*$ is a value shifted from the actual phase component $θ_X$ by $2π$. In addition, in the case that the phase offset α is a negative value, as illustrated in FIG. 6B, when the position X of target 2 ranges from the periodic point P to right end 301 (X=L/2) of the detection area $R_D$, the measurement value $θ_X*$ is proportional to the position X of target 2, and increases from $-π-α$ to $π$ in the range from the periodic point P to right end 301 of the detection area $R_D$. In addition, in the case where the phase offset α is a negative value, the measurement value $θ_X*$ increases from $π$ to $π-α$ in the range from left end 302 (X=-/2) of the detection area $R_D$ to the periodic point P. That is, in the case where the phase offset α is a negative value, the measurement value $θ_X*$ is identical to the actual phase component $θ_X$ in the range from the periodic point P to right end 301 of the detection area $R_D$. In the other range, that is, in the range from left end 302 of the detection area $R_D$ to the periodic point P, the measurement value $θ_X*$ is shifted from the actual phase component $θ_X$ by $2π$.

For example, by limiting a movable range of target 2 to a range from the periodic point P for the phase offset α as a positive value to the periodic point P for the phase offset α as a negative value, and by calculating the measurement value $θ_X*$ only in this range, the position X of target 2 may be detected and output in this range.

In addition, for example, when $θ_X>π$, and when $θ_X<-π$, measurement value $θ_X*$ may be corrected by $2π$. That is, when $θ_X*>π$, measurement value $θ_X*$ may be corrected to $θ_X*-2π$, and when $θ_X*<-π$, measurement value $θ_X*$ may be corrected to $θ_X*+2π$. The measurement value $θ_X*$ thus calculated is identical to the actual phase component $θ_X$ in a range of $-L/2≤px≤L/2$ (the entire range of the detection area $R_D$) unless the phase offset α (phase offset component δ) changes from the reference value $α_0$ due to a factor, such as a temperature. Therefore, the position X of target 2 may be detected and output in the range of $-L/2≤X≤L/2$.

Conventional position sensors disclosed in PTL 1 and PTL 2 require a modulation circuit for generating a sine wave and a cosine wave to be input into a sine coil and a cosine coil, respectively, and require a demodulation circuit for demodulating an output signal of a receiver coil, thus having complicated circuitry.

In contrast, position sensor 1a according to the present exemplary embodiment measures the phase θ of the output signal V of receiver coil 5 based on the potential value y obtained by sampling the output of receiver coil 5. Then, based on the measured phase θ, position sensor 1a detects the position X of target 2. Position sensor 1a can detect the position X of target 2 based on the output signal V of receiver coil 5 even if the output signal V of receiver coil 5 is small.

Therefore, in generation of the input waves $Wi_1$ and $Wi_2$ that are input into sine coil 3 and cosine coil 4, respectively, a modulation circuit for modulating a high-frequency wave is unnecessary. In addition, in detection of the position X of target 2 based on the output signal V of receiver coil 5, a demodulation circuit for demodulating the output of receiver coil 5 is unnecessary. That is, the position X of target 2 may be detected without the modulation circuit and the demodulation circuit, thus simplifying circuitry of position sensor 1a.

Conventional position sensors use a low pass filter for demodulating the output signal of the receiver coil. Accordingly, measurement of the phase needs to wait for an output waveform of the low pass filter to become stable. The low pass filter which is used for extracting a slow wave has a large time constant, and it takes a long time until the output waveform of the low pass filter becomes stable. Therefore, a long time is needed for phase measurement, and a long time is needed for detection of a target position.

In addition, since the conventional position sensors use the low pass filter, an adverse effect arises by the low pass filter when the position sensors are switched from a first mode to a second mode. That is, when the position sensors are switched from the first mode to the second mode, the phase measurement value changes under influence of the low pass filter. Therefore, in order to avoid this adverse effect caused by the low pass filter, an initial phase in the second mode is adjusted so that a phase gap is not made, that is, so that the waveform continues when the position sensors are switched from the first mode to the second mode. That is, the phase of the sine wave and the cosine wave that are input into the sine coil and the cosine coil, respectively, is adjusted in the second mode. The conventional position sensors make this adjustment by feeding back a previous phase measurement value, and based on the previous phase measurement value, by calculating and setting the initial phase in the second mode so as to prevent the phase gap. This requires a circuit for adjusting the initial phase in the second mode (such as a circuit for feeding back the previous phase measurement value and a circuit for calculating the initial phase in the second mode), which complicates circuitry.

In contrast, position sensor 1a according to the present exemplary embodiment, which does not demodulate the output signal of receiver coil 5, does not need a low pass filter for demodulation, and does not use the low pass filter. Therefore, although phase measurement needs to wait for the output wave of the low pass filter to become stable in the conventional position sensors, position sensor 1a according to the present exemplary embodiment does not have a measurement delay caused by the low pass filter. This may shorten a time necessary for phase measurement, and may shorten a time necessary for detection of the position X of target 2. In addition, the phase measurement value may change when the position sensor is switched from the first mode to the second mode under influence of the low pass filter as in the conventional position sensors. That is, it is not necessary to adjust the initial phase in the second mode, and the circuit for adjusting the initial phase in the second mode is unnecessary (such as the circuit for feeding back the previous phase measurement value and the circuit for calculating the initial phase in the second mode). This may simplify circuitry of position sensor 1a according to the present exemplary embodiment.

In addition, position sensor 1a according to the present exemplary embodiment can set the fundamental frequency f (drive frequency) of the input waves $Wi_1$ and $Wi_2$ that are input into sine coil 3 and cosine coil 4, respectively, and that are higher than a frequency of the conventional position sensors without lowering measurement accuracy of the phase θ.

This is for the following reason. That is, it is assumed that the conventional position sensor and position sensor 1a according to the present exemplary embodiment have identical output waveforms of receiver coil 5 and identical time resolution of phase measurement unit 35. In this case, phase measurement performed by position sensor 1a according to the present exemplary embodiment by sampling a voltage value (measurement of the voltage value at the sampling) provides higher resolution than phase measurement performed by the conventional position sensor by measuring time until a sign of the voltage value changes. This is the aforementioned reason. That is, the reason is that an error of phase measurement caused by resolution of voltage value measurement is smaller than an error of phase measurement caused by resolution of time measurement. For example, in a conventional configuration, in the case that the fundamental frequency f of the input waves $Wi_1$ and $Wi_2$ is 2 MHz, that time resolution is 24 MHz, and that the phase θ is measured by time measurement by the conventional position sensor, measurement resolution of the phase θ is 30 degrees. Meanwhile, in position sensor 1a in accordance with the present exemplary embodiment, In the case that time resolution is identical, 24 MHz, that voltage value resolution is not larger than 1/30 of amplitude, and that the phase θ is measured by sampling the voltage value, measurement resolution of the phase θ becomes higher than measurement resolution of the conventional position sensor. This allows position sensor 1a in accordance with the present exemplary embodiment to measure the phase θ with higher resolution than the conventional position sensor. Therefore, position sensor 1a in accordance with the present exemplary embodiment can set higher fundamental frequency f (drive frequency) of the input waves that are input to the sine coil and the cosine coil than the conventional position sensor without lowering measurement accuracy of the phase θ.

Higher fundamental frequency f of the input waves $Wi_1$ and $Wi_2$ provides a faster voltage change speed, larger amplitude and higher S/N ratio of the output signal V of receiver coil 5. Therefore, higher fundamental frequency f of the input waves $Wi_1$ and $Wi_2$ provides the output signal V of receiver coil 5 with large amplitude and high S/N ratio. That is, higher fundamental frequency f of the input waves $Wi_1$ and $Wi_2$, which provides larger amplitude and higher S/N ratio of the output signal V of receiver coil 5, allows higher fundamental frequency f of the input waves $Wi_1$ and $Wi_2$ while measurement accuracy of the phase θ is maintained or measurement accuracy of the phase θ is increased. Moreover, higher fundamental frequency f of the input waves $Wi_1$ and $Wi_2$ allows shorter measurement time of the phase θ. In addition, consumption current of position sensor 1a may be decreased because of shorter measurement time of the phase θ.

In accordance with the present exemplary embodiment, target 2 is not necessarily made of metal (conductor), but may be a dielectric substance, magnetic substance, or an LC resonator. In addition, movable body 8 is not necessarily made of nonmetallic material (insulator), but may be made of metallic (conductive) material, dielectric substance, magnetic substance, or an LC resonator, and may be formed unitarily with target 2.

In addition, in accordance with the present exemplary embodiment, reference timing generator 31 may transmit the reference time signal and the transmission start signal simultaneously, and may transmit the transmission start signal after transmitting the reference time signal. In the case that the transmission start signal is transmitted after transmitting the reference time signal, reference timing generator 31 transmits the transmission start signal when a certain time elapses from the transmission of the reference time signal. Even in this case, when the input time point To of the reference time signal is used as a phase reference, the phase offset component γ is constant at each measurement. Unless the phase offset component δ changes due to a factor, such as temperature, the phase offset α is constant ($α_0$). Therefore, even in this way, the phase component $θ_X$ corresponding to the position X may be calculated similarly to the aforementioned exemplary embodiment.

In addition, in accordance with the present exemplary embodiment, transmission waveform generator 21 may generate the input wave $Wi_1$ that changes E>Ec from E<Ec when a certain time elapses from the input time point Ti of the transmission start signal. However, a time interval from the input time point Ti of the transmission start signal to time when the input wave $Wi_1$ changes E>Ec from E<Ec is constant at each measurement. Even in this way, when the input time point To of the reference time signal is used as a phase reference, the phase offset component γ is constant in each measurement. Unless the phase offset component δ Changes due to a factor such as temperature, the phase offset α is constant ($α_0$). Therefore, even in this way, the phase component $θ_X$ may be calculated similarly to the aforementioned exemplary embodiment.

In addition, in accordance with the present exemplary embodiment, the input waves $Wi_1$ and $Wi_2$ that are input into sine coil 3 and cosine coil 4, respectively, may have a phase relationship in which the phase of the input wave $Wi_2$ input into cosine coil 4 is delayed by π/2 with respect to the phase of the input wave $Wi_1$ input into sine coil 3. In this case, the output signal V obtained from receiver coil 5 is expressed as Formula 10.

$$V = \sin\left(2\pi ft - \left(-\frac{2\pi}{L}X + α\right)\right)$$ [Formula 10]

Therefore, in this case, since the phase θ is expressed as θ=−$θ_X$+α, the phase component $θ_X^*$(=−$θ_X^*$+$α_0$) is calculated as the phase component $θ_X$. In this case, the output signal V may be expressed as Formula 10 for a reason similar to a reason why the output signal V is expressed as Formula 1 in accordance with the aforementioned exemplary embodiment. That is, the output signal V expressed as Formula 10 is obtained by superimposition and addition of the signal output from receiver coil 5 in response to the input wave $Wi_1$ input into sine coil 3, and the signal output from receiver coil 5 in response to the input wave $Wi_2$ input into cosine coil 4.

In addition, in accordance with the present exemplary embodiment, the sampling period is may be longer than (1/f)/2 (a half of the period of the input waves $Wi_1$ and $Wi_2$). That is, the natural number h may be not smaller than 1. In addition, the natural number $N_W$ is not necessarily one, but may be another integer not larger than ($N_L$−1). For example, I the case that the natural number $N_L$ is 3, the natural number $N_W$ may be 2. In addition, the end of the waiting time tw may not coincide with sampling timing of the potential value y.

Second Exemplary Embodiment

Figure 7:
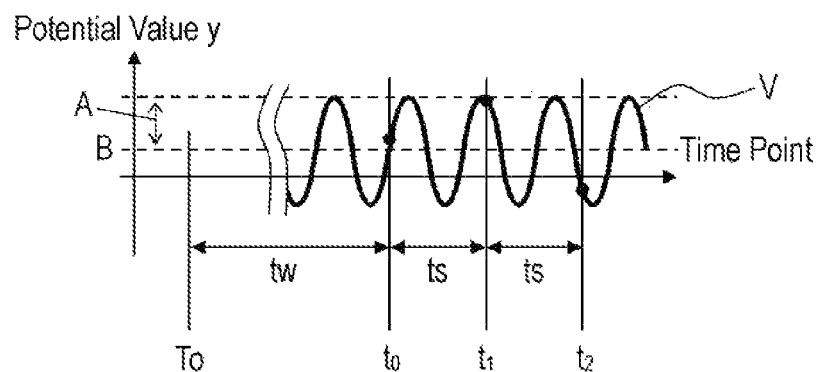
FIG. 7 illustrates the output signal of the receiver coil sampled by an A/D timing generator and an A/D converter of a position sensor according to a second exemplary embodiment.

FIG. 7 illustrates an output signal V of receiver coil 5 to be sampled in position sensor 1*a* according to a second exemplary embodiment. Position sensor 1*a* according to the present exemplary embodiment is different from position sensor 1*a* according to the first exemplary embodiment in a method for sampling the output signal V of receiver coil 5 and a method for measuring a phase θ of the output signal V of receiver coil 5. That is, position sensor 1*a* according to the present exemplary embodiment is different from position sensor 1*a* according to the first exemplary embodiment in A/D timing generator 33, A/D converter 34, and phase measurement unit 35 of position detector 22. The other components in the present exemplary embodiment are similar to components of the first exemplary embodiment.

Similarly to the first exemplary embodiment, A/D timing generator 33 transmits an A/D timing signal in a sampling period ts=((1/f)/2)×($N_L$×h+$N_W$)/$N_L$ (a period different from an integer multiple of a half of a period of input waves $Wi_1$ and $Wi_2$). Similarly to the first exemplary embodiment, A/D converter 34 samples a potential value y of the output signal V of receiver coil 5 at the sampling period ts, and then, A/D converter 34 outputs the sampled potential value y to phase measurement unit 35. In accordance with the present exemplary embodiment, unlike the first exemplary embodiment, $N_L$=3, h=2, $N_W$=1, and the sampling period ts is ts=(1/f)×(⅞).

As described in the first exemplary embodiment, the potential value y of the output signal V of receiver coil 5 is expressed as y=A sin(2πft−θ)+B as a function of time point t with amplitude A of an oscillation of the voltage, a central voltage B of the oscillation, and the phase θ of the potential value y at a frequency f. When θ>0, the phase θ is the amount of a phase delay. Unlike the first exemplary embodiment, the central voltage B is unknown in the present exemplary embodiment.

The potential value y(=A sin(2πft−θ)+B) includes three unknown coefficients, the amplitude A, the central voltage B, and the phase θ. Therefore, values of the amplitude A, the central voltage B, and the phase θ may be calculated from values of three different sets of (t, y): ($t_0$, $y_0$); ($t_1$, $y_1$); and ($t_2$, $y_2$). In other words, the values of the amplitude A, the central voltage B, and the phase θ may be calculated by solving simultaneous formulas expressed as Formula 11 below.

$$y_0 = A\sin(2\pi ft_0 - θ) + B$$ [Formula 11]
$$y_1 = A\sin(2\pi ft_1 - θ) + B$$
$$y_2 = A\sin(2\pi ft_2 - θ) + B$$

where $$t_1 \neq t_0 + \left(\frac{1}{2f}\right) \times i$$

$$t_2 \neq t_0 + \left(\frac{1}{2f}\right) \times i$$

$$t_2 \neq t_1 + \left(\frac{1}{2f}\right) \times i$$

(i is an arbitrary integer).

That is, each of a time interval ($t_1$−$t_0$) between time points $t_0$ and $t_1$, a time interval ($t_2$−$t_1$) between time points $t_1$ and $t_2$, and a time interval ($t_2$−$t_0$) between time points $t_0$ and $t_2$ is different from ((1/f)/2)×i (where i is an integer), that is, each time interval is different from an integer multiple of a half of the period of the input waves $Wi_1$ and $Wi_2$. This is because the time intervals ($t_0$, $y_0$), ($t_1$, $y_1$), ($t_2$, $y_2$) need to be the values of three different sets of (t, y) in consideration that the potential value y (=A sin(2πft−θ)+B) has periodicity of 1/f. A/D converter 34 samples the potential value y at a period of the sampling period is $(=((1/f)/2) \times (N_L \times h + N_W)/N_L$: a period different from an integer multiple of a half of the period of the input waves $Wi_1$ and $Wi_2$). Therefore, A/D converter 34 samples the potential value y at time points $t_0$, $t_1$, and $t_2$.

The potential values $y_0$, $y_1$, and $y_2$ at time points $t_0$, $t_1$, and $t_2$, respectively, provides the values of the three different sets of (t, y): $(t_0, y_0)$; $(t_1, y_1)$; and $(t_2, y_2)$. Then, by using these values to solve the simultaneous formulas (Formula 11), the value of the phase θ may be calculated. The simultaneous formulas (Formula 11) are solved to provide the phase θ of Formula 12 below.

$$\theta = G_1 - 2\pi f t_0 - \tan^{-1}\left(\frac{\frac{y_1 - y_0}{F_1}\sin(-G_1 + G_2)}{\frac{y_2 - y_0}{F_2} - \frac{y_1 - y_0}{F_1}\cos(-G_1 + G_2)}\right) \quad \text{[Formula 12]}$$

where $$F_1 = \sqrt{(\cos(2\pi f(t_1 - t_0)) - 1)^2 + (\sin(2\pi f(t_1 - t_0)))^2}$$

$$\cos G_1 = \frac{\cos(2\pi f(t_1 - t_0)) - 1}{F_1}$$

$$\sin G_1 = \frac{\sin(2\pi f(t_1 - t_0))}{F_1}$$

$$F_2 = \sqrt{(\cos(2\pi f(t_2 - t_0)) - 1)^2 + (\sin(2\pi f(t_2 - t_0)))^2}$$

$$\cos G_2 = \frac{\cos(2\pi f(t_1 - t_0)) - 1}{F_2}$$

$$\sin G_2 = \frac{\sin(2\pi f(t_1 - t_0))}{F_2}$$

The phase θ calculated by Formula 12 is the phase θ of the output signal V of receiver coil 5 with respect to the reference time point (time point 0) of time points $t_0$, $t_1$, and $t_2$ (phase reference time point Tc).

Formula 12 is derived as follows. That is, Formula 13 below is obtained from the first formula and the second formula of Formula 11.

$$\begin{aligned}y_1 - y_0 &= A\sin(2\pi f t_0 - 2\pi f(t_1 - t_0) - \theta) - \\ &\quad A\sin(2\pi f t_0 - \theta) \\ &= A\sin(2\pi f t_0 - \theta)\cos(2\pi f(t_1 - t_0)) + \\ &\quad A\cos(2\pi f t_0 - \theta)\sin(2\pi f(t_1 - t_0)) - \\ &\quad A\sin(2\pi f t_0 - \theta) \\ &= A\sin(2\pi f t_0 - \theta)(\cos(2\pi f(t_1 - t_0)) - 1) + \\ &\quad A\cos(2\pi f t_0 - \theta)\sin(2\pi f(t_1 - t_0))\end{aligned} \quad \text{[Formula 13]}$$

Formula 14 below is obtained from Formula 13.

$$\frac{y_1 - y_0}{F_1} = A\sin(2\pi f t_0 + G_1 - \theta) \quad \text{[Formula 14]}$$

where $$F_1 = \sqrt{(\cos(2\pi f(t_1 - t_0)) - 1)^2 + (\sin(2\pi f(t_1 - t_0)))^2}$$

$$\cos G_1 = \frac{\cos(2\pi f(t_1 - t_0)) - 1}{F_1}$$

$$\sin G_1 = \frac{\sin(2\pi f(t_1 - t_0))}{F_1}$$

Formula 15 below is similarly obtained from the first formula and the third formula of Formula 11.

$$\frac{y_2 - y_0}{F_2} = A\sin(2\pi f t_0 + G_2 - \theta) \quad \text{[Formula 15]}$$

where $$F_2 = \sqrt{(\cos(2\pi f(t_2 - t_0)) - 1)^2 + (\sin(2\pi f(t_2 - t_0)))^2}$$

$$\cos G_2 = \frac{\cos(2\pi f(t_2 - t_0)) - 1}{F_2}$$

$$\sin G_2 = \frac{\sin(2\pi f(t_2 - t_0))}{F_2}$$

Formula 16 and Formula 17 below are obtained from Formula 14 and Formula 15.

$$\frac{y_1 - y_0}{F_1} = A\sin(2\pi f t_0 + \theta') \quad \text{[Formula 16]}$$

where $$\theta' = G_1 - \theta$$

$$\frac{y_2 - y_0}{F_2} = A\sin(2\pi f t_0 - G_1 + G_2 + \theta') \quad \text{[Formula 17]}$$

Formula 16 and Formula 17 have a form identical to a form of Formula 4 according to the first exemplary embodiment. Therefore, Formula 18 below is obtained from Formula 16 and Formula 17 by a process similar to a process of Formula 6, Formula 7, and Formula 8 according to the first exemplary embodiment.

$$2\pi f t_0 + \theta' = \tan^{-1}\left(\frac{\frac{y_1 - y_0}{F_1}\sin(-G_1 + G_2)}{\frac{y_2 - y_0}{F_2} - \frac{y_1 - y_0}{F_1}\cos(-G_1 + G_2)}\right) \quad \text{[Formula 18]}$$

In Formula 16 and Formula 17, $\theta' = G_1 - \theta$. Therefore, based on $\theta = G_1 - \theta'$ and Formula 18, the phase θ is expressed as Formula 12. The phase θ may be expressed as Formula 19 below.

$$\theta' = \tan^{-1}\left(\frac{(y_1 - y_0)(\sin(2\pi f t_2) - \sin(2\pi f t_1)) - }{(y_2 - y_1)(\sin(2\pi f t_1) - \sin(2\pi f t_0))} \over {(y_1 - y_0)(\cos(2\pi f t_2) - \sin(2\pi f t_1)) - \atop (y_2 - y_1)(\cos(2\pi f t_1) - \cos(2\pi f t_0))}\right) \quad \text{[Formula 19]}$$

Similarly to the first exemplary embodiment, based on the output signal V of A/D converter 34, phase measurement unit 35 measures a phase component $\theta_X$ which corresponds to a position X of target 2 and which is included in the phase θ of the output signal V obtained from receiver coil 5. That is, in a phase measurement operation, similarly to the first exemplary embodiment, phase measurement unit 35 measures the phase θ of the output signal V of receiver coil 5 based on output of A/D converter 34, and calculates the phase component $\theta_X$ corresponding to the position X of target 2 based on a measurement value θ* of the phase θ and a reference value $\alpha_0$ of a phase offset α. That is, phase measurement unit 35 calculates a measurement value $\theta_X^*$ (=θ*−$\alpha_0$ as the phase component $\theta_X$. However, the present exemplary embodiment is different from the first exemplary embodiment in a method for measuring the phase θ.

That is, phase measurement unit 35 measures the phase $\theta$ as follows. Unlike the first exemplary embodiment, phase measurement unit 35 stores, in measurement value storage unit 36, the potential value y sampled three times by A/D converter 34. That is, phase measurement unit 35 stores, in measurement value storage unit 36, the potential value y sampled when waiting time tw elapses from the input time point To of a reference time signal as potential value $y_0$, and stores, in measurement value storage unit 36, the potential value y sampled thereafter in order as potential values $y_1$, and $y_2$. Accordingly, measurement value storage unit 36 stores the potential values $y_0$, $y_1$, and $y_2$ sampled three times at the sampling period ts $(=((1/f)/2)\times(N_L\times h+N_W)/N_L)$. The sampling period ts is different from an integer multiple of a half of the period of the input waves $Wi_1$ and $Wi_2$).

Then, based on these three potential values $y_0$, $y_1$, and $y_2$ stored in measurement value storage unit 36, phase measurement unit 35 calculates the phase $\theta$ of the output signal V of receiver coil 5 by Formula 12 above.

In this case, time points $t_0$, $t_1$, and $t_2$ are time when the input time point To of the reference time signal is used as a reference time (time 0). The potential values $y_0$, $y_1$, and $y_2$ are the potential values y at time points $t_0$, $t_1$, and $t_2$, respectively. The phase $\theta$ calculated in this way is the phase of the output signal V of receiver coil 5 by using the input time point To of the reference time signal as a reference (phase reference time point Tc). Phase measurement unit 35 defines the phase $\theta$ calculated in this way as the phase measurement value $\theta^*$ of the output signal V of receiver coil 5. In accordance with the present exemplary embodiment, phase measurement unit 35 thus measures the phase $\theta$.

Position detector 22 as a whole measures the phase $\theta$ of the output signal V obtained from receiver coil 5 based on the potential value y obtained by sampling the output signal V obtained from receiver coil 5 three times at the sampling period ts different from an integer multiple of a half of the period of the input waves $Wi_1$ and $Wi_2$. Then, based on the phase $\theta$ and the reference value $\alpha_0$ of the phase offset $\alpha$, position detector 22 calculates the phase component $\theta_X$ corresponding to the position X of target 2 to detect the position X of target 2.

By sampling the output signal V N times (where N is an integer not smaller than 3) to calculate the phase $\theta$, position sensor 1a according to the present exemplary embodiment can calculate the phase $\theta$ to detect the position X of target 2 while not being affected by a change in the central voltage B of the oscillation of the output signal V of receiver coil 5 caused by, e.g. a temperature change.

In accordance with the present exemplary embodiment, the sampling period is may be shorter than (1/f) (the period of the input waves $Wi_1$ and $Wi_2$), and may be shorter than (1/f)/2 (a half of the period of the input waves $Wi_1$ and $Wi_2$). That is, a natural number h may be one and may be zero. Natural number $N_W$ is not necessarily one, but may be another integer not larger than $N_L-1$. For example, when natural number $N_L$ is 3, natural number $N_W$ may be 2. In addition, the end of waiting time tw may not coincide with sampling timing of the potential value y.

In accordance with the present exemplary embodiment, in consideration that an output waveform of receiver coil 5 may contain distortion and the like, and that the measurement value of the potential value y may contain an error, the phase $\theta$ may be calculated by a least square method instead of Formula 12 above. The phase $\theta$ calculated by a least square method is expressed as by Formula 20 below.

$$\theta = \frac{Q_{11}H_2Q_{33} + H_1Q_{23}Q_{31} + Q_{13}Q_{21}H_3 - Q_{13}H_2Q_{31} - H_1Q_{21}Q_{33} - Q_{11}Q_{23}H_3}{H_1Q_{22}Q_{33} + Q_{12}Q_{23}H_3 + Q_{13}H_2Q_{32} - Q_{13}Q_{22}H_3 - Q_{12}H_2Q_{33} - H_1Q_{23}Q_{32}} \quad \text{[Formula 20]}$$

where $$Q_{11} = \sum_{n=0}^{N^*-1} \sin^2(2\pi f t_n) \qquad Q_{12} = -\sum_{n=0}^{N^*-1} \sin(2\pi f t_n)\cos(2\pi f t_n)$$

$$Q_{21} = -\sum_{n=0}^{N^*-1} \sin(2\pi f t_n)\cos(2\pi f t_n) \qquad Q_{22} = \sum_{n=0}^{N^*-1} \cos^2(2\pi f t_n)$$

$$Q_{31} = \sum_{n=0}^{N^*-1} \sin(2\pi f t_n) \qquad Q_{32} = \sum_{n=0}^{N^*-1} \cos(2\pi f t_n)$$

$$Q_{33} = \sum_{n=0}^{N^*-1} 1 \qquad H_1 = \sum_{n=0}^{N^*-1} y_n \sin(2\pi f t_n)$$

$$H_2 = -\sum_{n=0}^{N^*-1} y_n \cos(2\pi f t_n) \qquad H_3 = \sum_{n=0}^{N^*-1} y_n$$

In this case, time point $t_n$ is a time when the input time point To of the reference time signal is used as reference time point (time point 0). The potential value $y_n$ is the potential value y at time point $t_n$. The phase $\theta$ thus calculated is the phase $\theta$ of the output signal V of receiver coil 5 with respect to the input time point To of the reference time signal (phase reference time point Tc).

Formula 20 is derived as follows. That is, phase $\theta$ calculated by the least square method is phase $\theta$ provided when the sum of squares of errors of the potential value $y_n$ (n=0, 1, 2, ..., N*−1) takes a minimum value. The potential value $y_n$ is the (n+1)th-sampled potential value y, and N* is the number of sampled potential values y.

The sum D of squares which is the sum of squares of errors of the potential value $y_n$ is expressed as by Formula 21 below.

$$D = \sum_{n=0}^{N^*-1} (y_n - A\sin(2\pi f t_n - \theta) - B)^2 \quad \text{[Formula 21]}$$

$$= \sum_{n=0}^{N^*-1} (y_n - A\sin(2\pi f t_n)\cos\theta + A\cos(2\pi f t_n)\sin\theta - B)^2$$

Here, variables u and v are defined as u=A cos $\theta$ and v=A sin $\theta$. The sum D of squares is expressed as Formula 22 below.

$$D = \sum_{n=0}^{N^*-1} (y_n - u\sin(2\pi f t_n) + v\cos(2\pi f t_n) - B)^2 \quad \text{[Formula 22]}$$

The condition that the sum D of squares takes a minimum value is that a derivative $\partial D/\partial u$ obtained by partial differentiation of the sum D of squares with respect to the variable u is 0, a derivative $\partial D/\partial v$ obtained by partial differentiation of the sum D of squares with respect to the variable v is 0, and a derivative $\partial D/\partial B$ obtained by partial differentiation of the sum D of squares with respect to the central voltage B are all 0. That is, the phase $\theta$ that satisfies $\partial D/\partial u=0$, ∂D/∂v=0, and ∂D/∂B=0 is the phase θ when the sum D of squares takes a minimum value, and is the phase θ calculated by the least square method.

The partial differentials ∂D/∂u, ∂D/∂v, and ∂D/∂B are obtained by partial differentiation of Formula 22 with respect to the variable u, variable v, and central voltage B, respectively. The partial differentials ∂D/∂u, ∂D/∂v, and ∂D/∂B are expressed as Formula 23, Formula 24, Formula 25 below, respectively.

$$\frac{\partial D}{\partial u} = -2\sum_{n=0}^{N^*-1}((y_n - u\sin(2\pi f t_n) + v\cos(2\pi f t_n) - B)\sin(2\pi f t_n))$$ [Formula 23]

$$\frac{\partial D}{\partial v} = 2\sum_{n=0}^{N^*-1}((y_n - u\sin(2\pi f t_n) + v\cos(2\pi f t_n) - B)\cos(2\pi f t_n))$$ [Formula 24]

$$\frac{\partial D}{\partial B} = -2\sum_{n=0}^{N^*-1}(y_n - u\sin(2\pi f t_n) + v\cos(2\pi f t_n) - B)$$ [Formula 25]

From ∂D/∂u=0, ∂D/∂v=0, and ∂D/∂B=0, Formula 23, Formula 24, and Formula 25 are expanded under the condition of ∂D/∂u=0, ∂D/∂v=0, and ∂D/∂B=0, and are organized about the variables u, v, central voltage B, Formula 26 below is obtained.

$$\begin{pmatrix}u\\v\\B\end{pmatrix} = \begin{pmatrix}Q_{11} & Q_{12} & Q_{13}\\Q_{21} & Q_{22} & Q_{23}\\Q_{31} & Q_{32} & Q_{33}\end{pmatrix}^{-1}\begin{pmatrix}H_1\\H_2\\H_3\end{pmatrix}$$

$$= \frac{1}{\begin{vmatrix}Q_{11} & Q_{12} & Q_{13}\\Q_{21} & Q_{22} & Q_{23}\\Q_{31} & Q_{32} & Q_{33}\end{vmatrix}}\begin{pmatrix}\begin{vmatrix}H_1 & Q_{12} & Q_{13}\\H_2 & Q_{22} & Q_{23}\\H_3 & Q_{32} & Q_{33}\end{vmatrix}\\\begin{vmatrix}Q_{11} & H_1 & Q_{13}\\Q_{21} & H_2 & Q_{23}\\Q_{31} & H_3 & Q_{33}\end{vmatrix}\\\begin{vmatrix}Q_{11} & Q_{12} & H_1\\Q_{21} & Q_{22} & H_2\\Q_{31} & Q_{32} & H_3\end{vmatrix}\end{pmatrix}$$

$$= \begin{pmatrix}\frac{H_1 Q_{22}Q_{33} + Q_{12}Q_{23}H_3 + Q_{13}H_2Q_{32} - H_1Q_{23}Q_{32} - Q_{12}H_2Q_{33} - Q_{13}Q_{22}H_3}{Q_{11}Q_{22}Q_{33} + Q_{12}Q_{23}Q_{31} + Q_{13}Q_{21}Q_{32} - Q_{11}Q_{23}Q_{32} - Q_{12}Q_{21}Q_{33} - Q_{13}Q_{22}Q_{31}}\\\frac{Q_{11}H_2Q_{33} + H_1Q_{23}Q_{31} + Q_{13}Q_{21}H_3 - Q_{11}Q_{23}H_3 - H_1Q_{21}Q_{33} - Q_{13}H_2Q_{31}}{Q_{11}Q_{22}Q_{33} + Q_{12}Q_{23}Q_{31} + Q_{13}Q_{21}Q_{32} - Q_{11}Q_{23}Q_{32} - Q_{12}Q_{21}Q_{33} - Q_{13}Q_{22}Q_{31}}\\\frac{Q_{11}Q_{22}H_3 + Q_{21}H_2Q_{31} + H_1Q_{21}Q_{32} - Q_{11}H_2Q_{32} - Q_{12}Q_{21}H_3 - H_1Q_{22}Q_{31}}{Q_{11}Q_{22}Q_{33} + Q_{12}Q_{23}Q_{31} + Q_{13}Q_{21}Q_{32} - Q_{11}Q_{23}Q_{32} - Q_{12}Q_{21}Q_{33} - Q_{13}Q_{22}Q_{31}}\end{pmatrix}$$ [Formula 26]

where $$Q_{11} = \sum_{n=0}^{N^*-1}\sin^2(2\pi f t_n) \quad Q_{12} = -\sum_{n=0}^{N^*-1}\sin(2\pi f t_n)\cos(2\pi f t_n)$$

$$Q_{13} = \sum_{n=0}^{N^*-1}\sin(2\pi f t_n) \quad Q_{21} = -\sum_{n=0}^{N^*-1}\sin(2\pi f t_n)\cos(2\pi f t_n)$$

$$Q_{22} = \sum_{n=0}^{N^*-1}\cos^2(2\pi f t_n) \quad Q_{23} = -\sum_{n=0}^{N^*-1}\cos(2\pi f t_n)$$

$$Q_{31} = \sum_{n=0}^{N^*-1}\sin(2\pi f t_n) \quad Q_{32} = -\sum_{n=0}^{N^*-1}\cos(2\pi f t_n)$$

$$Q_{33} = \sum_{n=0}^{N^*-1}1 \quad H_1 = \sum_{n=0}^{N^*-1}y_n\sin(2\pi f t_n)$$

$$H_2 = -\sum_{n=0}^{N^*-1}y_n\cos(2\pi f t_n) \quad H_3 = \sum_{n=0}^{N^*-1}y_n$$

v/u=(A sin θ)/(A cos θ)=tan θ provides θ=tan$^{-1}$(v/u), and Formula 20 described above is obtained.

Third Exemplary Embodiment

Figure 8:
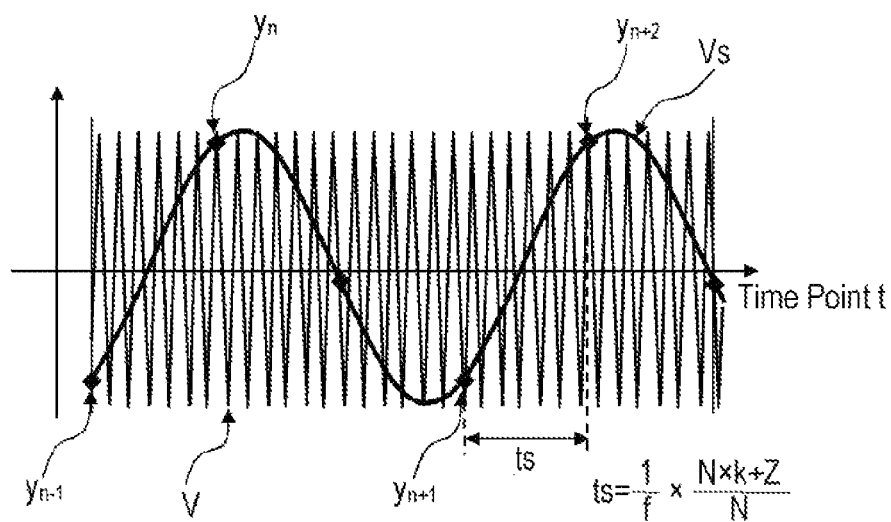
FIG. 8 illustrates the output signal of the receiver coil sampled by an A/D timing generator and an A/D converter of a position sensor according to a third exemplary embodiment.

FIG. 8 illustrates an output signal V of receiver coil 5 sampled in position sensor 1a according to a third exemplary embodiment. Position sensor 1a according to the present exemplary embodiment is different from position sensor 1a according to the first exemplary embodiment in a method for sampling the output signal V of receiver coil 5 and a method for measuring a phase θ of the output signal V of receiver coil 5. That is, position sensor 1a according to the present exemplary embodiment is different from position sensor 1a according to the first exemplary embodiment in A/D timing generator 33, A/D converter 34, and phase measurement unit 35 of position detector 22. The other components in accordance with the present exemplary embodiment are similar to components of the first exemplary embodiment.

Similarly to the first exemplary embodiment, A/D timing generator 33 transmits an A/D timing signal at a sampling period ts (=((1/f)/2)×($N_L$×h+$N_W$)/$N_L$; a period different from an integer multiple of a half of a period of input waves $Wi_1$ and $Wi_2$).

In accordance with the present exemplary embodiment, the sampling period ts is a period obtained by dividing, by N, of the period obtained by multiplying the period (=1/f) of the input waves $Wi_1$ and $Wi_2$ by R, where an integer N not smaller than 3 and an integer R which is larger than the integer N and which is not an integer multiple of the integer N. That is, the sampling period ts is a period obtained by multiplying the period of the input waves $Wi_1$ and $Wi_2$ by R/N. That is, the sampling period ts is expressed as ts=((1/f)/2)×(N×k+Z)/N. N is an arbitrary natural number not smaller than 3, k is an arbitrary natural number, and Z is an arbitrary natural number not larger than N−1. N×k+Z is an integer which is larger than N and is not an integer multiple of N. Therefore, the sampling period ts (=((1/f)/2)×(N×k+Z)/N) is a period obtained by dividing, by N, the value obtained by multiplying the period (1/f) of the input waves $Wi_1$ and $Wi_2$ by R.

The sampling period ts is expressed as ts=(1/f)/2)×(N×k+Z)/N=((1/f)/2)×(2N×k+2Z)/N. For 2Z<N, providing $2Z=N_W$ and $2k=h$, the sampling period ts is expressed as $ts=((1/f)/2) \times (N_L \times h + N_W)/N_L$. In addition, for $2Z \geq N$, providing $2Z=N+N_W$ and $2k+1=h$, the sampling period ts is expressed as $ts=((1/f)/2) \times (N_L \times h + N_W)/N_L$. Therefore, similarly to the first exemplary embodiment, the sampling period ts is a period different from an integer multiple of a half of the period of the input waves $Wi_1$ and $Wi_2$. In addition, since $k \geq 1$ and $Z \geq 1$, $(N \times k + Z)/N$ is greater than 1. Therefore, the sampling period ts is a period longer than the period of the input waves $Wi_1$ and $Wi_2$. $N \times k + Z$ is an integer, and N is a natural number not smaller than 3. Therefore, the sampling period ts is a period obtained by dividing, by N, of an integer multiple of the period of the input waves $Wi_1$ and $Wi_2$ (N is not smaller than 3).

That is, the sampling period ts is different from an integer multiple of a half of the period of the input waves $Wi_1$ and $Wi_2$, is longer than the period of the input waves $Wi_1$ and $Wi_2$, and is a period obtained by dividing an integer multiple of the period of the input waves $Wi_1$ and $Wi_2$ by a value not smaller than three.

A/D converter 34 samples the potential value y of the output signal V of receiver coil 5 at the sampling period ts $(=(1/f) \times (N \times k + Z)/N)$. Since the sampling period ts is longer than the period of the input waves $Wi_1$ and $Wi_2$, downsampling of the output signal V of receiver coil 5 is performed. Then, a virtual waveform Vs obtained by frequency-dividing the output signal V of receiver coil 5 by $(N \times k + Z)$ is sampled in the sampling period ts obtained by dividing the period $(=(1/f) \times N \times k + Z)$ of the waveform Vs by N. A/D converter 34 outputs the sampled potential value y to phase measurement unit 35. In accordance with the present exemplary embodiment, $N=3$ ($N_L=3$), $k=6$ ($h=12$), $Z=1$ ($N_W=2$), and $ts=(1/f) \times 19/3 = (1/f) \times 6 + (1/f) \times \frac{1}{3}$.

The potential value y of output of receiver coil 5 is expressed as $y = A \sin(2\pi ft - \theta) + B$ as a function of time point t, as in accordance with the first exemplary embodiment. Here, A is amplitude, B is the central voltage of the oscillation of the output voltage, and $\theta$ is the phase (phase delay if $\theta > 0$). Unlike the first exemplary embodiment, B is unknown in accordance with the present exemplary embodiment.

The potential value y $(=A \sin(2\pi ft - \theta) + B$ includes three unknown coefficients, A, B, and $\theta$. Therefore, a value of the phase $\theta$ can be calculated by measuring the $N^*$ ($N^* \geq 3$) potential values $y_n$ ($n=0, 1, \ldots, N^*-1$) and using the least square method. Assuming that the voltage is sampled N times for one period, A/D converter 34 samples the voltage when the potential value y sampled for one period has values different from one another.

When the sampling period ts for measuring the potential value y is ts $(=(1/f) \times (N \times k + Z)/N)$ and the number $N^*$ of potential value y to be measured is $N^* = N \times m$ (m is an arbitrary natural number), the value of the phase $\theta$ calculated by the least square method is expressed as Formula 27 below.

$$\theta = \tan^{-1} \left( \frac{-\sum_{n=0}^{N^*-1} y_n \cos(2\pi ft_n)}{\sum_{n=0}^{N^*-1} y_n \sin(2\pi ft_n)} \right) \quad [\text{Formula 27}]$$

The phase $\theta$ calculated by Formula 27 is the phase of the output signal of receiver coil 5 with respect to the reference time point (time point 0) of time point $t_n$ at which the potential value $y_n$ is measured (phase reference time point Tc).

Formula 27 is derived as follows. That is, the phase $\theta$ calculated by the least square method is a value when the sum of squares of errors of the potential value $y_n$ ($n=0, 1, 2, \ldots, N^*-1$) takes a minimum value, and the phase $\theta$ is expressed as Formula 20 above, as in the second exemplary embodiment.

Assuming that M is an integer not smaller than 2 and j is an integer not smaller than 0 and smaller than M, the sine function and cosine function satisfy a relationship of Formula 28 and Formula 29 below.

$$\sum_{j=0}^{M-1} \sin\left(2\pi \frac{j}{M}\right) = 0 \quad [\text{Formula 28}]$$

$$\sum_{j=0}^{M-1} \cos\left(2\pi \frac{j}{M}\right) = 0 \quad [\text{Formula 29}]$$

When the sampling period ts is expressed as $ts = (1/f) \times (N \times k + Z)/N$ and the number $N^*$ of potential values $y_n$ is $N^* = N \times m$, in consideration of Formula 28 and Formula 29, the relationship of Formula 30 below is satisfied.

$$\sum_{n=0}^{N^*-1} \sin^2(2\pi ft_n) = \frac{N^*}{2} \quad [\text{Formula 30}]$$

$$\sum_{n=0}^{N^*-1} \cos^2(2\pi ft_n) = \frac{N^*}{2}$$

$$\sum_{n=0}^{N^*-1} \sin(2\pi ft_n) = 0$$

$$\sum_{n=0}^{N^*-1} \cos(2\pi ft_n) = 0$$

$$\sum_{n=0}^{N^*-1} \sin(2\pi ft_n)\cos(2\pi ft_n) = 0$$

Therefore, Formula 27 above is obtained from Formula 20 and Formula 30.

Similarly to the first exemplary embodiment, based on output of A/D converter 34, phase measurement unit 35 measures the phase component $\theta_X$ which corresponds to the position X of target 2 and which is included in the phase $\theta$ of the output signal V obtained from receiver coil 5. That is, in a phase measurement operation, similarly to the first exemplary embodiment, based on output of A/D converter 34, phase measurement unit 35 calculates the phase component $\theta_X$ corresponding to the position X of target 2 based on a measurement value $\theta^*$ obtained by measuring the phase $\theta$ of the output signal V of receiver coil 5 and a reference value $\alpha_0$ of a phase offset $\alpha$. That is, phase measurement unit 35 calculates the measurement value $\theta_X^*$ ($=\theta^* - \alpha_0$) as the phase component $\theta_X$. The present exemplary embodiment is different from the first exemplary embodiment in the method for measuring the phase $\theta$.

That is, in accordance with the third exemplary embodiment, phase measurement unit 35 measures the phase $\theta$ as follows. Unlike the first exemplary embodiment, phase measurement unit 35 stores, in measurement value storage unit 36, the potential value y sampled N*(=N×m) times by A/D converter 34 (m is an arbitrary natural number). That is, phase measurement unit 35 stores, in measurement value storage unit 36, the potential value y sampled when the waiting time tw elapses from an input time point To of a reference time signal as potential value $y_0$, and then, phase measurement unit 35 stores the n-th-sampled potential value y as potential value $y_n$ in measurement value storage unit 36. Measurement value storage unit 36 thus stores the potential values $y_n$ (n=0, 1, 2, . . . , N*−1) that sampled N*(=N×m) times at the sampling period is (=(1/f)×(N×k+Z)/N).

Then, based on the N*(=N×m) potential values $y_n$ stored in measurement value storage unit 36, phase measurement unit 35 calculates the phase θ of the output signal V of receiver coil 5 by Formula 27 above.

In this case, time point $t_n$ is the time point when the input time point To of the reference time signal is used as a reference time point (time point 0). The potential value $y_n$ is a potential value y at time point $t_n$. The phase θ thus calculated is the phase θ of the output signal V of receiver coil 5 by using the input time point To of the reference time signal as a reference (phase reference time point Tc). Phase measurement unit 35 defines the phase θ thus calculated as the phase measurement value θ* of the output signal V of receiver coil 5. In accordance with the present exemplary embodiment, phase measurement unit 35 thus measures the phase θ.

In an entire operation of position detector 22, position detector 22 samples the potential value y of the output signal V obtained from receiver coil 5 N*(=N×m) times at a period obtained by dividing, by N, a value obtained by multiplying the period of the input waves $Wi_1$ and $Wi_2$ by R (an integer different from an integer multiple of N). That is, position detector 22 samples the potential value y of the output signal V obtained from receiver coil 5 N*(=N×m) times at the sampling period is obtained by multiplying of the period of the input waves $Wi_1$ and $Wi_2$ by R/N. Then, based on the potential values $y_n$ sampled N*(=N×m) times (n is an integer that is not smaller than 0 and is smaller than N*), position detector 22 measures the phase θ of the output signal V obtained from receiver coil 5. Then, based on the phase θ and the reference value $α_0$ of the phase offset α, position detector 22 calculates the phase component $θ_X$ corresponding to the position X of target 2 to detect the position X of target 2.

In other words, position detector 22 downsamples the output signal V of receiver coil 5, and samples the virtual waveform Vs obtained by frequency-dividing the output signal V of receiver coil 5 by R (=N×k+Z) at the sampling period ts obtained by dividing, by N, the period (=(1/f)×R) of the waveform Vs. Then, position detector 22 detects the position X of target 2 based on values of the potential value $y_n$ sampled N*(=N×m) times (n is an integer that is not smaller than 0 and is smaller than N*).

For m=1 (N*=N), position detector 22 samples the potential value y N times at the sampling period ts obtained by dividing, by N, a value obtained by multiplying the period of the input waves $Wi_1$ and $Wi_2$ by R. Then, position detector 22 detects the position X of target 2 based on the potential value y sampled N (=N*) times. In addition, for m=1, assuming that the output voltage is sampled N times for one period, position detector 22 samples N: (=N) times for one period, and detects the position X of target 2 based on the potential value y that sampled for one period. For m≥2, assuming that the output voltage is sampled N times for one period, position detector 22 samples the voltage N*(=N×m) times for plural periods, and detects the position X of target 2 based on the potential value y sampled for the plural periods.

The above method for measuring the phase θ has higher accuracy as the number N*(=N×m) of potential values $y_n$ to be sampled increases, and as m increases. In accordance with the present exemplary embodiment, N=3, k=6, and m=5. That is, in accordance with the present exemplary embodiment, the period that is 19 times 1/f is one period, the number of sampled potential value y for one period is three, and the phase θ is measured by using the potential value y for five periods.

Position sensor 1a according to the present exemplary embodiment can calculate the phase θ to detect the position of target 2 by performing three or more samplings (N samplings) to calculate the phase θ while not being affected by a change in a central voltage B of the oscillation of the output signal V of receiver coil 5 caused by, e.g. a temperature change.

In addition, position sensor 1a calculates the phase θ by dividing, by N, a value obtained by multiplying the period (1/f) of the input waves $Wi_1$ and $Wi_2$ by R (R is an integer which is not an integer multiple of N), and by sampling the output signal V of receiver coil 5 N*(=N×m) times at the sampling period is obtained by multiplying the period (1/f) by R/N. Position sensor 1a according to the present exemplary embodiment can thus calculate the phase θ efficiently with a small amount of calculation to detect the position X of target 2. In addition, by considering N samplings as samplings for one period, and by performing samplings for plural periods (m periods, m≥2) to calculate the phase θ, position sensor 1a according to the present exemplary embodiment can improve measurement accuracy of the phase θ, and can improve detection accuracy of the position X of target 2.

In accordance with the present exemplary embodiment, a natural number Z is not necessarily 1, but may be another integer not larger than N−1. For example, when N is 3, Z may be 2. In addition, a natural number m may be 1. That is, the number N* may be 3. In addition, the end of the waiting time tw may not coincide with sampling timing of the potential value y.

Fourth Exemplary Embodiment

Figure 9:
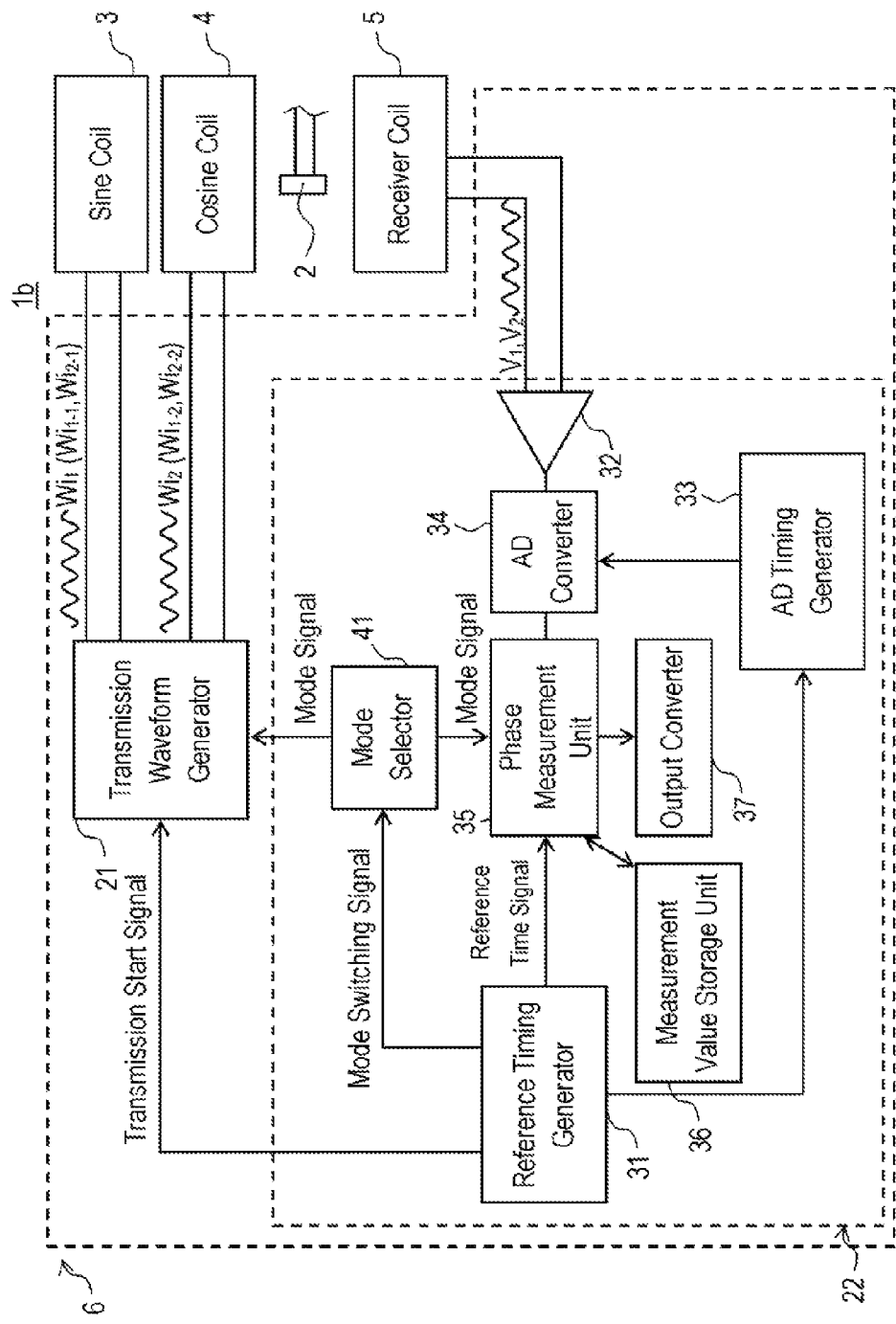
FIG. 9 is a circuit block diagram of a position sensor according to a fourth exemplary embodiment.

FIG. 9 is an electric block diagram of position sensor 1b according to a fourth exemplary embodiment. In FIG. 9, components identical to those of position sensor 1a according to the first exemplary embodiment illustrated in FIG. 2 are denoted by the same reference numerals. Position sensor 1b according to the fourth exemplary embodiment is different from position sensor 1a according to the first exemplary embodiment in a method for measuring a phase θ of an output signal of receiver coil 5 and a method for measuring a phase component $θ_X$ which corresponds to the position X of target 2 and which is included in the phase θ. That is, position sensor 1b according to the fourth exemplary embodiment is different from position sensor 1a according to the first exemplary embodiment in transmission waveform generator 21 and position detector 22. The other components in the present exemplary embodiment are similar to the first exemplary embodiment.

In addition to the components of the first exemplary embodiment, position detector 22 further includes mode selector 41 that selects one mode from plural modes regarding a phase relationship of input waves $Wi_1$ and $Wi_2$. Reference timing generator 31 and phase measurement unit 35 are different from reference timing generator 31 and phase measurement unit 35 of the first exemplary embodiment. The other components of position detector 22 are similar to components of position detector 22 according to the first exemplary embodiment.

Reference timing generator 31 transmits a mode switching signal to mode selector 41. The mode switching signal is a signal that indicates mode switching timing, that is, a signal that makes mode switching instructions. After transmitting the mode switching signal, similarly to the first exemplary embodiment, reference timing generator 31 transmits a transmission start signal to transmission waveform generator 21. After transmitting the transmission start signal, reference timing generator 31 transmits a reference time signal to phase measurement unit 35.

Reference timing generator 31 repetitively transmits the mode switching signal, the transmission start signal, and the reference time signal in a predetermined operation period. Reference timing generator 31 transmits the reference time signal when delay time ta elapses from the transmission of the transmission start signal, and transmits the mode switching signal when measurement operation time tb elapses from the transmission of the reference time signal. The delay time ta and measurement operation time tb are similar to the delay time ta and measurement operation time tb of the first exemplary embodiment.

Upon having the mode switching signal input to, mode selector 41 switches the mode and transmits a mode signal that indicates the selected mode to transmission waveform generator 21 and phase measurement unit 35. That is, when mode selector 41 receives the mode switching signal during a first mode, mode selector 41 switches the first mode to a second mode, and transmits the mode signal that indicates the second mode to transmission waveform generator 21 and phase measurement unit 35. In addition, when mode selector 41 receives the mode switching signal during the second mode, mode selector 41 switches the second mode to the first mode, and transmits the mode signal that indicates the first mode to transmission waveform generator 21 and phase measurement unit 35.

Transmission waveform generator 21 has a first input mode and a second input mode for inputting the input waves $Wi_1$ and $Wi_2$ sine coil 3 and cosine coil 4, respectively. In the first input mode, the input waves $Wi_1$ and $Wi_2$ that have a first predetermined phase relationship between them are input to sine coil 3 and cosine coil 4. The first predetermined phase relationship is a phase relationship in which the phase of the input wave $Wi_2$ input into cosine coil 4 is delayed by $3\pi/2$ with respect to the phase of the input wave $Wi_1$ input into sine coil 3, respectively. In the second input mode, the input waves $Wi_1$ and $Wi_2$ that have a second predetermined phase relationship between different from the first predetermined phase relationship are input into sine coil 3 and cosine coil 4, respectively. In the second predetermined phase relationship, the phase of the input wave $Wi_2$ input into cosine coil 4 is delayed by $\pi/2$ with respect to the phase of the input wave $Wi_1$ input into sine coil 3. The input waves $Wi_1$ and $Wi_2$ that are input into sine coil 3 and cosine coil 4 are sine waves, similarly to the first exemplary embodiment. In addition, a fundamental frequency f of the input waves $Wi_1$ and $Wi_2$ input into sine coil 3 and cosine coil 4 is 2 MHz, similarly to the first exemplary embodiment.

Transmission waveform generator 21 sets the input mode in response to the mode signal input from mode selector 41. That is, when the mode signal that indicates the first mode is input, transmission waveform generator 21 sets the input mode to the first input mode. When the mode signal that indicates the second mode is input, transmission waveform generator 21 sets the input mode to the second input mode.

Transmission waveform generator 21 starts inputting the input waves $Wi_1$ and $Wi_2$ to sine coil 3 and cosine coil 4, respectively, in response to the transmission start signal input from reference timing generator 31. That is, when the transmission start signal is input while the input mode is set to the first input mode, transmission waveform generator 21 starts inputting the input waves $Wi_1$ and $Wi_2$ in the first input mode. When the transmission start signal is input while the input mode is set to the second input mode, transmission waveform generator 21 starts inputting the input waves $Wi_1$ and $Wi_2$ in the second input mode.

In the first input mode input waves $Wi_{1-1}$ and $Wi_{1-2}$ that have the first predetermined phase relationship between them are input into sine coil 3 and cosine coil 4, respectively. In the first predetermined phase relationship, the phase of the input wave $Wi_{1-2}$ input into cosine coil 4 is delayed by $3\pi/2$ with respect to the phase of the input wave $Wi_{1-1}$ input into sine coil 3. In the second input mode, input waves $Wi_{2-1}$, $Wi_{2-2}$ that have the second predetermined phase relationship between them different from the first predetermined phase relationship are input into sine coil 3 and cosine coil 4, respectively. In the second predetermined phase relationship, the input wave $Wi_{2-2}$ input into cosine coil 4 is delayed by $\pi/2$ with respect to the phase of the input wave $Wi_{2-1}$ input into sine coil 3. Thus, the phase difference between the input wave $Wi_{1-1}$ input into sine coil 3 and the input wave $Wi_{1-2}$ input into cosine coil 4 in the first phase relationship in the first mode is different from the phase difference between the input wave $Wi_{2-1}$ input into sine coil 3 and the input wave $Wi_{2-2}$ input into cosine coil 4 in the second phase relationship in the second mode. The input waves $Wi_{1-1}$, $Wi_{2-1}$, $Wi_{1-2}$, and $Wi_{2-2}$ input into sine coil 3 and cosine coil 4 are sine waves, similarly to the first exemplary embodiment. The fundamental frequency f of the input waves $Wi_{1-1}$, $Wi_{2-1}$, $Wi_{1-2}$, and $Wi_{2-2}$ input into sine coil 3 and cosine coil 4 is 2 MHz, similarly to the first exemplary embodiment.

Figure 10A:
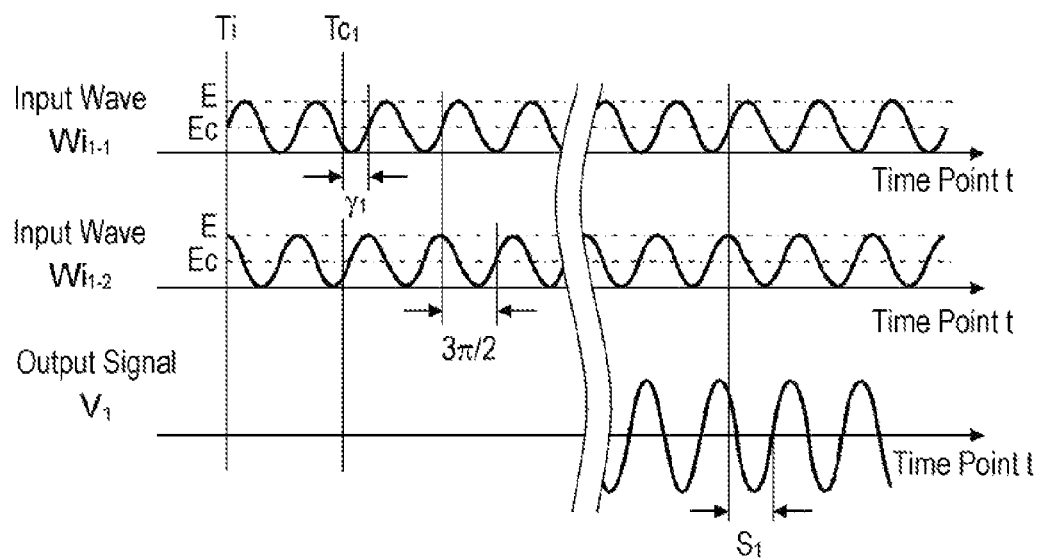
FIG. 10A illustrates input waves that are input into a sine coil and a cosine coil, and an output signal of a receiver coil of the position sensor according to the fourth exemplary embodiment.

The input waves in the first input mode are input as follows. FIG. 10A is a waveform diagram illustrating the input waves $Wi_{1-1}$, and $Wi_{1-2}$ input into sine coil 3 and cosine coil 4 in the first mode, respectively, and an output signal V1 of receiver coil 5 of position sensor 1b according to the fourth exemplary embodiment. In FIG. 10A, a horizontal axis represents time t, and a vertical axis represents a voltage value E of the input waves $Wi_{1-1}$ and $Wi_{1-2}$ and a value of the output signal V1 of receiver coil 5. As illustrated in FIG. 10A, the input wave $Wi_{1-1}$ is a sine wave that has the fundamental frequency f and has a relationship between the voltage value E and a central voltage Ec, the relationship of changing to E>Ec from E<Ec at input time point Ti of the transmission start signal. The input wave $Wi_{1-2}$ is a sine wave that has the fundamental frequency f and has a relationship between the voltage value E and central voltage Ec of changing into E>Ec from E<Ec at a time point delayed by $(1/f) \times (3/4)$ from the input time point Ti of the transmission start signal. The fundamental frequency f of the input wave $Wi_{1-1}$ is identical to the fundamental frequency f of the input wave $Wi_{1-3}$. The input wave $Wi_{1-1}$ is input into sine coil 3, and the input wave $Wi_{1-2}$ is input into cosine coil 4.

The input wave $Wi_{1-1}$ input into sine coil 3 is a sine wave with an amount of phase delay of $\gamma_1$ ($\gamma_1 > 0$) with respect to certain reference time point Tc1. The input wave $Wi_{1-2}$ input into cosine coil 4 is a sine wave with the amount of phase delay of $\gamma_1 + 3\pi/2$ with respect to the certain reference time point Tc1. The reference time point Tc1 may be arbitrarily determined, and $\gamma^1$ is a phase offset component that is generated depending on how to choose the reference time point Tc1. If the time when the voltage value E of the input wave $Wi_{1-1}$ changes to E>Ec from E<Ec (for example, the input time point Ti of the transmission start signal) is determined as the reference time point Tc1, then $\gamma_1=0$, the phase of the input wave $Wi_{1-1}$ is 0, and the phase of the input wave $Wi_{1-2}$ is $3\pi/2$. In the first mode, the phase relationship between the input wave $Wi_{1-1}$ and the input wave $Wi_{1-2}$ is a phase relationship in which the phase of the input wave $Wi_{1-2}$ is delayed by $3\pi/2$ with respect to the phase of the input wave $Wi_{1-1}$.

When the input wave $Wi_{1-1}$ and the input wave $Wi_{1-2}$ are input into sine coil 3 and cosine coil 4, respectively, the output signal V1 (first output signal) is output from receiver coil 5. The output signal V1 oscillates at the fundamental frequency f identical to the fundamental frequency f of the input waves $Wi_{1-1}$ and $Wi_{1-2}$, and the output signal V1 is delayed by a phase difference S1 with respect to the input wave $Wi_{1-1}$.

Figure 10B:
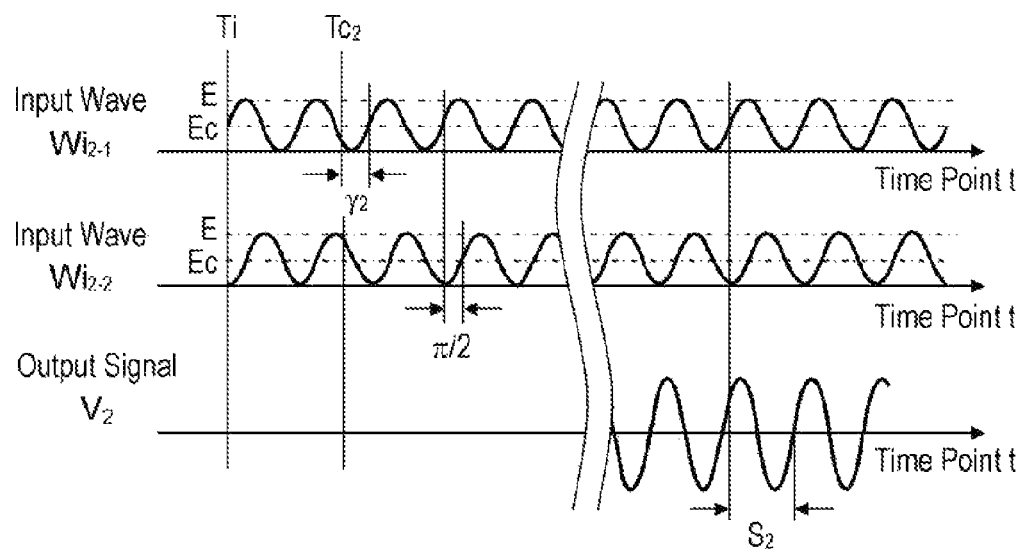
FIG. 10B illustrates the input waves that are input into the sine coil and the cosine coil, and the output signal of the receiver coil of the position sensor according to the fourth exemplary embodiment.

The input waves in the second input mode are input as follows. FIG. 10B is a waveform diagram illustrating the input waves $Wi_{2-1}$ and $Wi_{2-2}$ input into sine coil 3 and cosine coil 4 in the second mode, respectively, and an output signal V2 of receiver coil 5 of position sensor 1b according to the fourth exemplary embodiment. In FIG. 10A, a horizontal axis represents time point t, and a vertical axis represents a voltage value E of the input waves $Wi_{2-1}$ and $Wi_{2-2}$, and the value of an output signal V2 of receiver coil 5. As illustrated in FIG. 10B, the input wave $Wi_{2-1}$ is a sine wave that has the fundamental frequency f and has a relationship between the voltage value E and central voltage Ec of changing into E>Ec from E<Ec at the input time point Ti of the transmission start signal. The input wave $Wi_{2-2}$ is a sine wave that has the fundamental frequency f and has a relationship between the voltage value E and the central voltage Ec changing into E>Ec from E<Ec at the time delayed by $(1/f) \times (\frac{1}{4})$ from the input time point Ti of the transmission start signal. The fundamental frequency f of the input wave $Wi_{2-1}$ is identical to the fundamental frequency f of the input wave $Wi_{2-2}$. The input wave $Wi_{2-1}$ is input into sine coil 3, and the input wave $Wi_{2-2}$ is input into cosine coil 4.

The input wave $Wi_{2-1}$ that is input into sine coil 3 is a sine wave with an amount of phase delay of $\gamma_2$ ($\gamma_2 > 0$) with respect to certain reference time point Tc2. The input wave $Wi_{2-2}$ input into cosine coil 4 is an input wave with the amount of phase delay of $\gamma_2 + \pi/2$ with respect to the certain reference time point Tc2. $\gamma_2$ is a phase offset component that is generated depending on how to choose the reference time point Tc2. If the time when the voltage value E of the input wave $Wi_{2-1}$ changes to E>Ec from E<Ec (for example, the input time point Ti of the transmission start signal) is determined as the reference time point Tc2, then $\gamma_2=0$, the phase of the input wave $Wi_{2-1}$ is 0, and the phase of the input wave $Wi_{2-2}$ is $\pi/2$. In the second mode, the phase relationship between the input wave $Wi_{2-1}$ and the input wave $Wi_{2-2}$ is a phase relationship in which the phase of the input wave $Wi_{2-2}$ is delayed by $\pi/2$ with respect to the phase of the input wave $Wi_{2-1}$.

When the input wave $Wi_{2-1}$ and the input wave $Wi_{2-2}$ are input into sine coil 3 and cosine coil 4, respectively, the output signal V2 (second output signal) is output from receiver coil 5. The output signal V2 oscillates at the fundamental frequency f identical to the fundamental frequency f of the input waves $Wi_{2-1}$ and $Wi_{2-2}$, and the output signal V2 is delayed by a phase difference S2 with respect to the input wave $Wi_{2-1}$.

When transmission waveform generator 21 inputs the input wave $Wi_{1-1}$ and the input wave $Wi_{1-2}$ into sine coil 3 and cosine coil 4 in the first input mode, respectively, the output signal $V_1$ which is a voltage obtained from receiver coil 5 at time point t is expressed as Formula 31 below.

$$V_1 = \sin\left(2\pi ft - \left(\frac{2\pi}{L}X + \alpha_1\right)\right) \qquad \text{[Formula 31]}$$

Here, $\alpha_1$ is a phase offset expressed as $\alpha_1 = \gamma_1 + \delta - \pi/2$. $\gamma_1$ is a phase offset component generated depending on how to choose the reference time point Tc1, and is a component corresponding to the phase (the amount of phase delay) of the input wave $Wi_{1-1}$ with respect to the reference time point Tc1 (the amount of phase delay). $\delta$ is a phase offset component (phase delay) generated by a factor, such as temperature.

When transmission waveform generator 21 inputs the input wave $Wi_{2-1}$ and the input wave $Wi_{2-2}$ into sine coil 3 and cosine coil 4 in the second input mode, respectively, the output signal $V_2$ obtained from receiver coil 5 at time point t is expressed as Formula 32 below.

$$V_2 = \sin\left(2\pi ft - \left(-\frac{2\pi}{L}X + \alpha_2\right)\right) \qquad \text{[Formula 32]}$$

Here, $\alpha_2$ is a phase offset obtained by $\alpha_2 = \gamma_2 + \delta - \pi/2$. $\gamma_2$ is a phase offset component generated depending on how to choose the reference time point Tc2, and a component corresponding to the phase (the amount of phase delay) of the input wave $Wi_{2-1}$ with respect to the reference time point Tc2.

The output signals $V_1$ and $V_2$ are expressed as Formula 32 for a reason similar to a reason that the output signal V is expressed as Formula 1 and Formula 10 in accordance with the first exemplary embodiment.

As shown in Formula 31, the output signal $V_1$ changes at the fundamental frequency f identical to the fundamental frequency f of the input waves $Wi_{1-1}$ and $Wi_{1-2}$. The phase $\theta_1$ of the output signal $V_1$ is expressed as $\theta_1 = (2\pi/L)X + \delta - \pi/2 + \gamma_1$. The phase $\theta_1$ is a phase with respect to the reference time point Tc1. When $\theta_1 > 0$, the phase $\theta_1$ is the amount of phase delay with respect to the reference time point Tc1. That is, the output signal $V_1$ is delayed by the phase difference S1 $(=(2\pi/L)X+\delta-\pi/2)$ with respect to the input wave $Wi_{1-1}$.

As shown in Formula 32, the output signal $V_2$ changes at the fundamental frequency f identical to the fundamental frequency f of the input waves $Wi_{2-1}$ and $Wi_{2-2}$. The phase $\theta_2$ of the output signal $V_2$ is expressed as $\theta_2 = -(2\pi/L)X+\delta-\pi/2+\gamma_2$. The phase $\theta_2$ is a phase with respect to the reference time point Tc2. When $\theta_2 > 0$, the phase $\theta_2$ is the amount of phase delay with respect to the reference time point Tc2. That is, the output signal $V_2$ is delayed by the phase difference S2 $(=-(2\pi/L)X+\delta-\pi/2)$ with respect to the input wave $Wi_{2-1}$.

The phase $\theta_1$ includes the phase component $\theta_X$ $(=(2\pi/L)X)$ corresponding to the position X of target 2 and the phase offset $\alpha_1$ $(=\delta+\gamma_1-\pi/2)$. The phase $\theta_2$ includes the phase component $\theta_X$ $(=(2\pi/L)X)$ and the phase offset $\alpha_2$ $(=\delta+\gamma_2-\pi/2)$. The phases $\theta_1$ and $\theta_2$ are expressed as $\theta_1 = \theta_X + \alpha_1$ and $\theta_2 = \theta_X + \alpha_2$, respectively, by using the phase component $\theta_X$ and the phase offsets $\alpha_1$ and $\alpha_2$. The phases $\theta_1$ and $\theta_2$ have values that changes depending on the position X of target 2.

Both of the input waves $Wi_{1-1}$ and $Wi_{2-1}$ are signals having the voltage value E that changes from E<Ec to E>Ec at the input time point Ti of the transmission start signal. That is, the input waves $Wi_{1-1}$ and $Wi_{2-1}$ are signals having the voltage value E that changes from E<Ec to E>Ec at identical timing with respect to the input time point Ti of the transmission start signal. Therefore, the phase offset components $\gamma_1$ and $\gamma_2$ satisfy a relationship of $\gamma_1 = \gamma_2$ when the difference between the input time point Ti of the transmission start signal and the reference time point Tc1 of the phase of the input wave $Wi_{1-1}$ is identical to the difference between the input time point Ti of the transmission start signal and the reference time point Tc2 of the phase of the input wave $Wi_{2-1}$.

That is, the phase offset components $\gamma_1$ and $\gamma_2$ satisfy the relationship of $\gamma_1 = \gamma_2$ when both of the reference time point Tc1 and reference time point Tc2 are determined to be the time point when the same time elapses from the input time point Ti of the transmission start signal (for example, input time point To of the reference time signal). When $\gamma_1 = \gamma_2$, then $\alpha_1 = \alpha_2$, and the phase offset $\alpha_1$ of the phase $\theta_1$ is identical to the phase offset $\alpha_2$ of the phase $\theta_2$, and the phases $\theta_1$ and $\theta_2$ are expressed as $\theta_1 = \theta_X + \alpha$ and $\theta_2 = \theta_X + \alpha$, respectively ($\alpha = \alpha_1 = \alpha_2$).

Figure 11A:
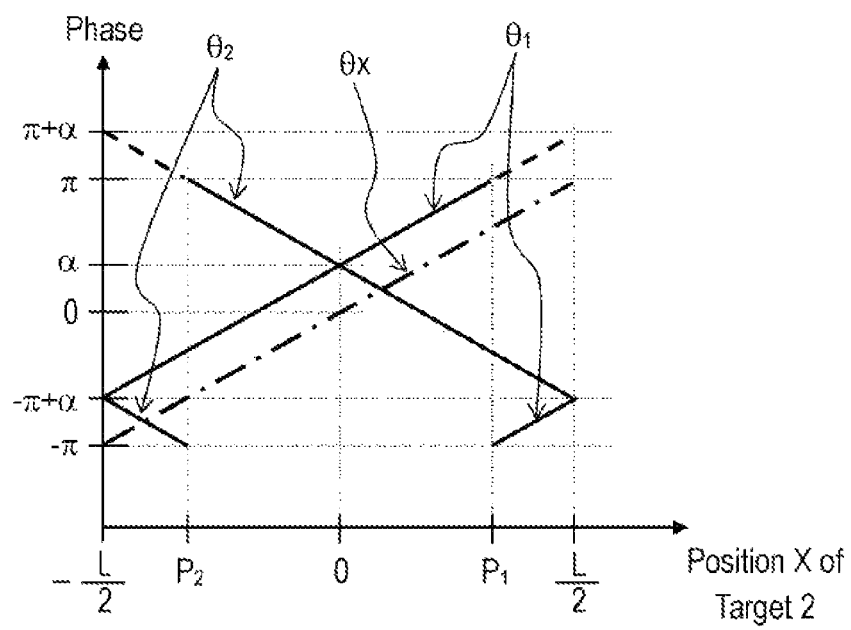
FIG. 11A illustrates a relationship between a position of a target and a phase of the output signal of the position sensor of the fourth exemplary embodiment.

FIG. 11A illustrates a relationship among the position X of target 2 and the phases $\theta_1$ and $\theta_2$ when the phase offsets $\alpha_1$ and $\alpha_2$ are identical to each other ($\alpha_1 = \alpha_2 = \alpha$). In FIG. 11A, a vertical axis represents the value of the phases $\theta_1$ and $\theta_2$, and a horizontal axis represents the position X of target 2. FIG. 11A illustrates a case where the phase offset $\alpha$ is a positive value. The phase component $\theta_X$ is a value proportional to the position X of target 2, and increases from $-\pi$ to $\pi$ in a range of the position X of target 2 from left end 302 (X=-L/2) to right end 301 (X=L/2) of a detection area $R_D$. The phase $\theta_1$ is expressed as $\theta_1 = \theta_X + \alpha$, and the phase $\theta_2$ is expressed as $\theta_2 = \theta_X + \alpha$.

Therefore, in a case where the phase offset $\alpha$ is a positive value, the phase $\theta_1$ increases from $-\pi + \alpha$ to $\pi$ in a range of the position X of target 2 from left end 302 (X=-L/2) of the detection area $R_D$ to a periodic point $P_1$, and the phase $\theta_1$ increases from $-\pi$ to $-\pi + \alpha$ in a range of the position X of target 2 from the periodic point $P_1$ to right end 301 (X=L/2) of the detection area $R_D$. In addition, in a case where the phase offset $\alpha$ is a positive value, the phase $\theta_2$ decreases from $-\pi + \alpha$ to $-\pi$ in a range of the position X of target 2 from left end 302 of the detection area $R_D$ to a periodic point $P_2$, and the phase $\theta_2$ decreases from $\pi$ to $-\pi + \alpha$ in a range of the position X of target 2 from the periodic point $P_2$ to right end 301 of the detection area $R_D$.

Figure 11B:
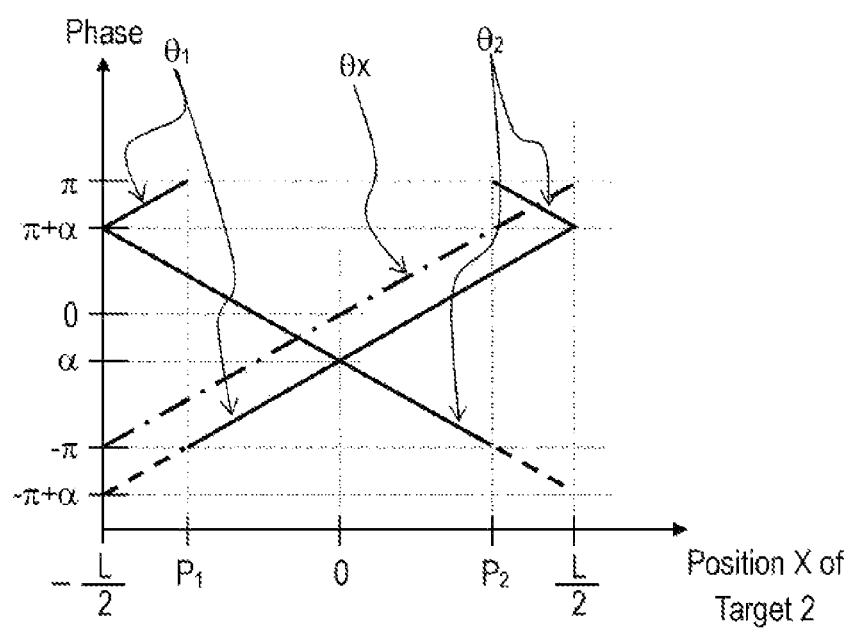
FIG. 11B illustrates the relationship between the position of the target and the phase of the output signal of the position sensor of the fourth exemplary embodiment.

FIG. 11B illustrates the relationship among the position X of target 2 and the phases $\theta_1$ and $\theta_2$ when the phase offsets $\alpha_1$ and $\alpha_2$ are identical to each other ($\alpha_1 = \alpha_2 = \alpha$). In FIG. 11B, a vertical axis represents the value of the phases $\theta_1$ and $\theta_2$, and a horizontal axis represents the position X of target 2. FIG. 11B illustrates a case where the phase offset $\alpha$ is a negative value. In a case where the phase offset $\alpha$ is a negative value, the phase $\theta_1$ increases from $\pi + \alpha$ to $\pi$ in a range of the position X of target 2 from left end 302 (X=-L/2) of the detection area $R_D$ to the periodic point $P_1$, and the phase $\theta_1$ increases from $-\pi$ to $\pi + \alpha$ in a range of the position X of target 2 from the periodic point $P_1$ to right end 301 (X=L/2) of the detection area $R_D$. In a case where the phase offset $\alpha$ is a negative value, the phase $\theta_2$ decreases from $\pi + \alpha$ to $-\pi$ in a range of the position X of target 2 from left end 302 (X=-L/2) of the detection area $R_D$ to the periodic point $P_2$, and the phase $\theta_2$ decreases from t to $\pi + \alpha$ in a range of the position X of target 2 from the periodic point $P_2$ to right end 301 (X=L/2) of the detection area $R_D$.

The periodic point $P_1$ is expressed as $P1 = L/2 - (L/2\pi) \times \alpha$ when $\alpha$ is a positive value, and expressed as $P_1 = -L/2 - (L/2\pi) - \alpha$ when $\alpha$ is a negative value. The periodic point $P_2$ is expressed as $P_2 = -P_1$. As an absolute value of the phase offset $\alpha$ decreases (closer to 0), the periodic points $P_1$ and $P_2$ approach L/2 (right end 301 of the detection area $R_D$) and $-L/2$ (left end 302 of the detection area $R_D$), respectively. That is, when the phase offset $\alpha$ is a positive value, the periodic points $P_1$ and $P_2$ approach L/2 (right end 301 of the detection area $R_D$) and $-L/2$ (left end 302 of the detection area $R_D$), respectively, as the absolute value of the phase offset $\alpha$ decreases (closer to 0). When the phase offset $\alpha$ is a negative value, the periodic points $P_1$ and $P_2$ approach $-L/2$ (left end 302 of the detection area $R_D$) and L/2 (right end 301 of the detection area $R_D$), respectively, as the absolute value of the phase offset $\alpha$ decreases (closer to 0).

In the case that the phase offsets $\alpha_1$ and $\alpha_2$ are identical to each other, the phases $\theta_1$ and $\theta_2$ satisfy the relationship of $\theta_X = (\theta_1 - \theta_2)/2$ and $\alpha = (\theta_1 + \theta_2)/2$. Therefore, in a case where the phases $\theta_1$ and $\theta_2$ may be calculated when the phase offsets $\alpha_1$ and $\alpha_2$ are identical to each other, the phase component $\theta_X$ may be calculated based on the relationship of $\theta_X = (\theta_1 - \theta_2)/2$, and the position X of target 2 may be calculated from the relationship of $\theta_X = (2\pi/L)X$.

A/D timing generator 33 transmits an A/D timing signal to A/D converter 34 at a sampling period ts ($= ((1/f)/2) \times (N_L \times h + N_W)/N_L$), that is, at the sampling period ts different from an integer multiple of a half of the period of the input waves $Wi_{1-1}$, $Wi_{1-2}$, $Wi_{2-1}$, and $Wi_{2-25}$, similarly to the first exemplary embodiment. A/D converter 34 outputs, to phase measurement unit 35, the potential values $y_n$ (n=0, 1, 2, ..., N*-1) obtained by sampling the potential value y of the output signal V of receiver coil 5 at the sampling period ts similarly to the first exemplary embodiment.

Phase measurement unit 35 calculates the phase component $\theta_X$ which corresponds to the position X of target 2 and which is included in the phase $\theta$ of the output signal V obtained from receiver coil 5, based on output of A/D converter 34, that is, based on the output signal V obtained from receiver coil 5.

Phase measurement unit 35 has a first measurement mode and a second measurement mode as a phase measurement operation for measuring the phase component $\theta_X$ corresponding to the position X of target 2.

Phase measurement unit 35 sets the measurement mode in response to the mode signal that is input from mode selector 41. That is, upon having the mode signal indicating the first mode input to, phase measurement unit 35 is set to the first measurement mode. Upon having the mode signal indicating the second mode input to, phase measurement unit 35 is set to the second measurement mode. The mode signal from mode selector 41 is input into both transmission waveform generator 21 and phase measurement unit 35. Therefore, when transmission waveform generator 21 is in the first input mode, phase measurement unit 35 is set to the first measurement mode, and when transmission waveform generator 21 is in the second input mode, phase measurement unit 35 is set to the second measurement mode.

In response to the reference time signal that is input from reference timing generator 31, phase measurement unit 35 starts an operation in the measurement mode that is set at this time That is, when the reference time signal is input while phase measurement unit 35 is in the first measurement mode, phase measurement unit 35 starts the operation in the first measurement mode. When the reference time signal is input while phase measurement unit 35 is in the second measurement mode, phase measurement unit 35 starts the operation in the second measurement mode.

In the first measurement mode, phase measurement unit 35 stores, in measurement value storage unit 36, a measurement value $\theta_1^*$ obtained by measuring the phase $\theta_1$ of the output signal $V_1$ obtained from receiver coil 5 in the first mode by a method similar to the first exemplary embodiment.

In the second measurement mode, phase measurement unit 35 stores, in measurement value storage unit 36, a measurement value $\theta_2^*$ obtained by measuring the phase $\theta_2$ of the output signal $V_2$ obtained from receiver coil 5 in the second mode by a method similar to the first exemplary embodiment. In addition, in the second measurement mode, phase measurement unit 35 calculates the phase component $\theta_X$ corresponding to the position X of target 2 based on the measurement values $\theta_1^*$ and $\theta_2^*$. That is, phase measurement unit 35 calculates the measurement value $\theta_X^*(=(\theta_1^*-\theta_2^*)/2)$ as the phase component $\theta_X$.

When phase measurement unit 35 is in the first measurement mode, transmission waveform generator 21 is in the first input mode. When phase measurement unit 35 is in the second measurement mode, transmission waveform generator 21 is in the second input mode. Therefore, the output signal of receiver coil 5 output when the phase $\theta$ is measured in the first measurement mode is the first output signal $V_1$. The output signal of receiver coil 5 output when the phase $\theta$ is measured in the second measurement mode is the second output signal $V_2$.

Therefore, the phase $\theta$ measured in the first measurement mode is the measurement value $\theta_1^*$ of the phase $\theta_1$ of the first output signal $V_1$ with respect to the input time point To of the reference time signal. In addition, the phase $\theta$ measured in the second measurement mode is the measurement value $\theta_2^*$ of the phase $\theta_2$ of the second output signal $V_2$ with respect to the input time point To of the reference time signal.

Since the input time point To of the reference time signal is the reference time point Tc1 and Tc2 of the phases $\theta_1$ and $\theta_2$, respectively, the relation of $\gamma_1=\gamma_2$ and $\alpha_1=\alpha_2$ is satisfied. That is, the phases $\theta_1$ and $\theta_2$, the phase component $\theta_X$, and the phase offset $\alpha$ $(=\alpha_1=\alpha_2)$ provide $\theta_1=\theta_X+\alpha$, $\theta_2=-\theta_X+\alpha$, and $\theta_X=(\theta_1-\theta_2)/2$. Therefore, the measurement value $\theta_X^*$ $(=(\theta_1^*-\theta_2^*)/2)$ calculated in the second measurement mode is the phase component $\theta_X$ corresponding to the position X of target 2.

Output converter 37 converts the phase component $\theta_X$ measured by phase measurement unit 35 (the measurement value $\theta_X^*$) into the position X of target 2. That is, similarly to the first exemplary embodiment, output converter 37 calculates the position X of target 2 with $X=\theta_X^*\times(L/2\pi)$. Then, output converter 37 outputs the calculated position X of target 2.

Next, an entire operation of position sensor 1b will be described below. It is assumed that, in an initial state, mode selector 41 is in the second mode. First, reference timing generator 31 transmits the mode switching signal to mode selector 41. Upon receiving the mode switching signal, mode selector 41 switches from the second mode to the first mode, and then, transmits the mode signal indicating the first mode to transmission waveform generator 21 and phase measurement unit 35. Upon receiving the mode signal indicating the first mode, transmission waveform generator 21 sets the input mode to the first input mode. Upon receiving the mode signal indicating the first mode, phase measurement unit 35 sets the measurement mode to the first measurement mode.

Subsequently, reference timing generator 31 transmits the transmission start signal to transmission waveform generator 21. Upon receiving the transmission start signal, transmission waveform generator 21 starts inputting the input wave $Wi_{1-1}$ and the input wave $Wi_{1-3}$ to sine coil 3 and cosine coil 4, respectively, in the first input mode. Accordingly, the first output signal $V_1$ is output from receiver coil 5.

Reference timing generator 31 transmits the reference time signal to phase measurement unit 35. Upon receiving the reference time signal, phase measurement unit 35 starts the operation in the first measurement mode to measure the phase $\theta$, and then, store the measured phase $\theta$ in measurement value storage unit 36 as the phase $\theta_1$ of the first output signal $V_1$.

Subsequently, reference timing generator 31 transmits the mode switching signal to mode selector 41. Upon receiving the mode switching signal, mode selector 41 switches the first mode to the second mode, and then transmits the mode signal indicating the second mode to transmission waveform generator 21 and phase measurement unit 35. Upon receiving the mode signal indicating the second mode, transmission waveform generator 21 sets the input mode to the second input mode. Upon receiving the mode signal indicating the second mode, phase measurement unit 35 sets the measurement mode to the second measurement mode.

Subsequently, reference timing generator 31 transmits the transmission start signal to transmission waveform generator 21. Upon receiving the transmission start signal, transmission waveform generator 21 starts inputting the input wave $Wi_{2-1}$ and input wave $Wi_{2-2}$ to sine coil 3 and cosine coil 4, respectively, in the second input mode. Accordingly, the second output signal $V_2$ is output from receiver coil 5.

Reference timing generator 31 transmits the reference time signal to phase measurement unit 35. Upon receiving the reference time signal, phase measurement unit 35 starts the operation in the second measurement mode to measure the phase $\theta$, and then store the measured phase $\theta$ in measurement value storage unit 36 as the phase $\theta_2$ of the second output signal $V_2$. Then, based on the phases $\theta_1$ and $\theta_2$ stored in measurement value storage unit 36, phase measurement unit 35 calculates the phase component $\theta_X$ corresponding to the position X of target 2 based on $\theta_X=(\theta_1-\theta_2)/2$. Then, output converter 37 calculates and outputs the position X of target 2 based on $X=\theta_X\times(L/2\pi)$.

After that, reference timing generator 31 repetitively transmits the mode switching signal to mode selector 41, transmits the transmission start signal to transmission waveform generator 21, and transmits the reference time signal to phase measurement unit 35. Accordingly, the aforementioned operations are repeated, and the position X of target 2 is calculated and output continuously.

Figure 12:
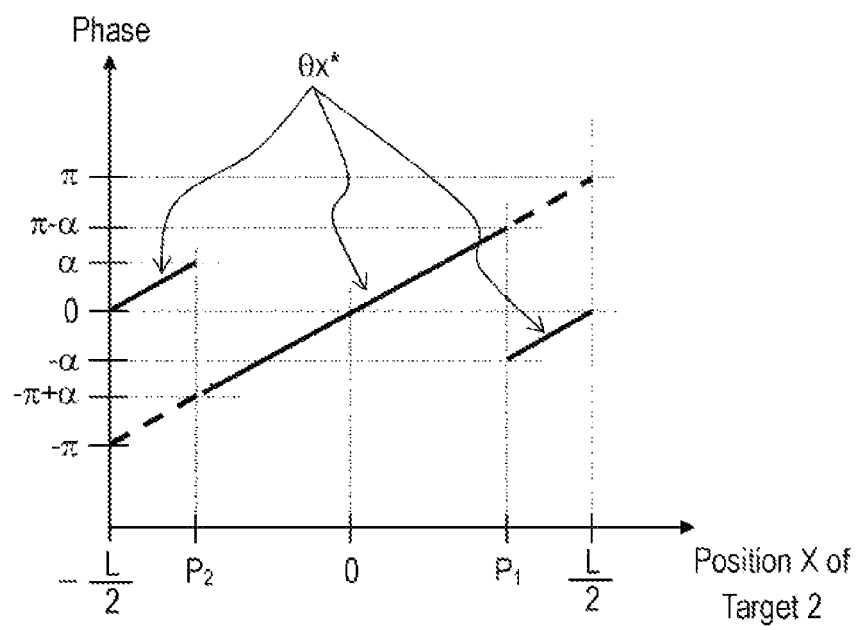
FIG. 12 illustrates a measurement value of a phase component corresponding to the position of the target included in the output signal of the receiver coil of the position sensor of the fourth exemplary embodiment position sensor.

FIG. 12 illustrates a relationship between the position X of target 2 and the measurement value $\theta_X^*$ of the phase component $\theta_X$. In FIG. 12, a vertical axis represents the value of the measurement value $\theta^*$ of the phase $\theta$, and a horizontal axis represents the position X of target 2. Regardless of whether the phase offset $\alpha$ is a positive value or a negative value, the measurement value $\theta_X^*$ is a value proportional to the position X of target 2 when the position X of target 2 is in a range from the periodic point $P_2$ to the periodic point $P_1$ of the detection area $R_D$, and the measurement value $\theta_X^*$ increases from $-\pi+\alpha$ to $\pi-\alpha$ in the range from the periodic point $P_2$ to the periodic point $P_1$. In addition, regardless of whether the phase offset α is a positive value or a negative value, the measurement value $\theta_X^*$ increases from 0 to α in a range from left end 302 (X=-L/2) of the detection area $R_D$ to the periodic point $P_2$, and increases from -α to 0 in a range from the periodic point $P_1$ to right end 301 (X=L/2) of the detection area $R_D$. That is, regardless of whether the phase offset α is a positive value or a negative value, the measurement value $\theta_X^*$ becomes a value identical to the actual phase component $\theta_X$ (refer to the phase component $\theta_X$ illustrated in FIG. 4A and FIG. 4B) in a range from the periodic point $P_2$ to the periodic point $P_1$, and the measurement value $\theta_X^*$ becomes a value deviated by π from the actual phase component $\theta_X$ in the other range.

For example, by limiting a movement range of target 2 to the range from the periodic point $P_1$ to the periodic point $P_2$ and calculating the measurement value $\theta_X^*$ only in the range from the periodic point $P_1$ to the periodic point $P_2$, the position X of target 2 may be detected and output in the range from the periodic point $P_1$ to the periodic point $P_2$.

Even if the phase offset α is unknown or the phase offset α changes due to a factor, such as temperature, position sensor 1b according to the present exemplary embodiment can measure the phase component $\theta_X$ to detect the position X of target 2.

In accordance with the present exemplary embodiment, the phase θ ($\theta_1$, $\theta_2$) of output obtained from receiver coil 5 may be measured by a method similar to the second or third exemplary embodiment. That is, A/D timing generator 33, A/D converter 34, and phase measurement unit 35 of position detector 22 may be configured similarly to the second or third exemplary embodiment.

In accordance with the present exemplary embodiment, reference timing generator 31 may transmit the reference time signal and the transmission start signal simultaneously, and reference timing generator 31 may transmit the transmission start signal after transmitting the reference time signal. When transmitting the transmission start signal after transmitting the reference time signal, reference timing generator 31 may transmit the transmission start signal when a certain time elapses from the transmission of the reference time signal. Even in this way, when the input time point To of the reference time signal is used as a phase reference, the phase offset components $\theta_1$ and $\theta_2$ satisfy $\theta_1 = \theta_2$, and the phases $\theta_1$ and $\theta_2$, phase component $\theta_X$, and phase offset α ($=\alpha_1=\alpha_2$) satisfy $\theta_1=\theta_X+\alpha$ and $\theta_2=\theta_X+\alpha$. Therefore, even in this way, the phase component $\theta_X$ may be calculated similarly to the aforementioned exemplary embodiments.

In accordance with the present exemplary embodiment, transmission waveform generator 21 may generate the input wave $Wi_{1-1}$ and input wave $Wi_{2-1}$ having the voltage value E that changes to E>Ec from E<Ec when a certain time elapses from the input time point Ti of the transmission start signal. The time from the input time point Ti of the transmission start signal until the voltage value E of the input wave $Wi_{1-1}$ changes to E>Ec from E<Ec is identical to the time from the input time point Ti of the transmission start signal until the voltage value E of the input wave $Wi_{2-1}$ changes to E>Ec from E<Ec. Even in this way, since $\theta_1=\theta_2$ when the input time point To of the reference time signal is used as a phase reference, the phase component $\theta_X$ may be calculated similarly to the aforementioned exemplary embodiments.

Fifth Exemplary Embodiment

Figure 13:
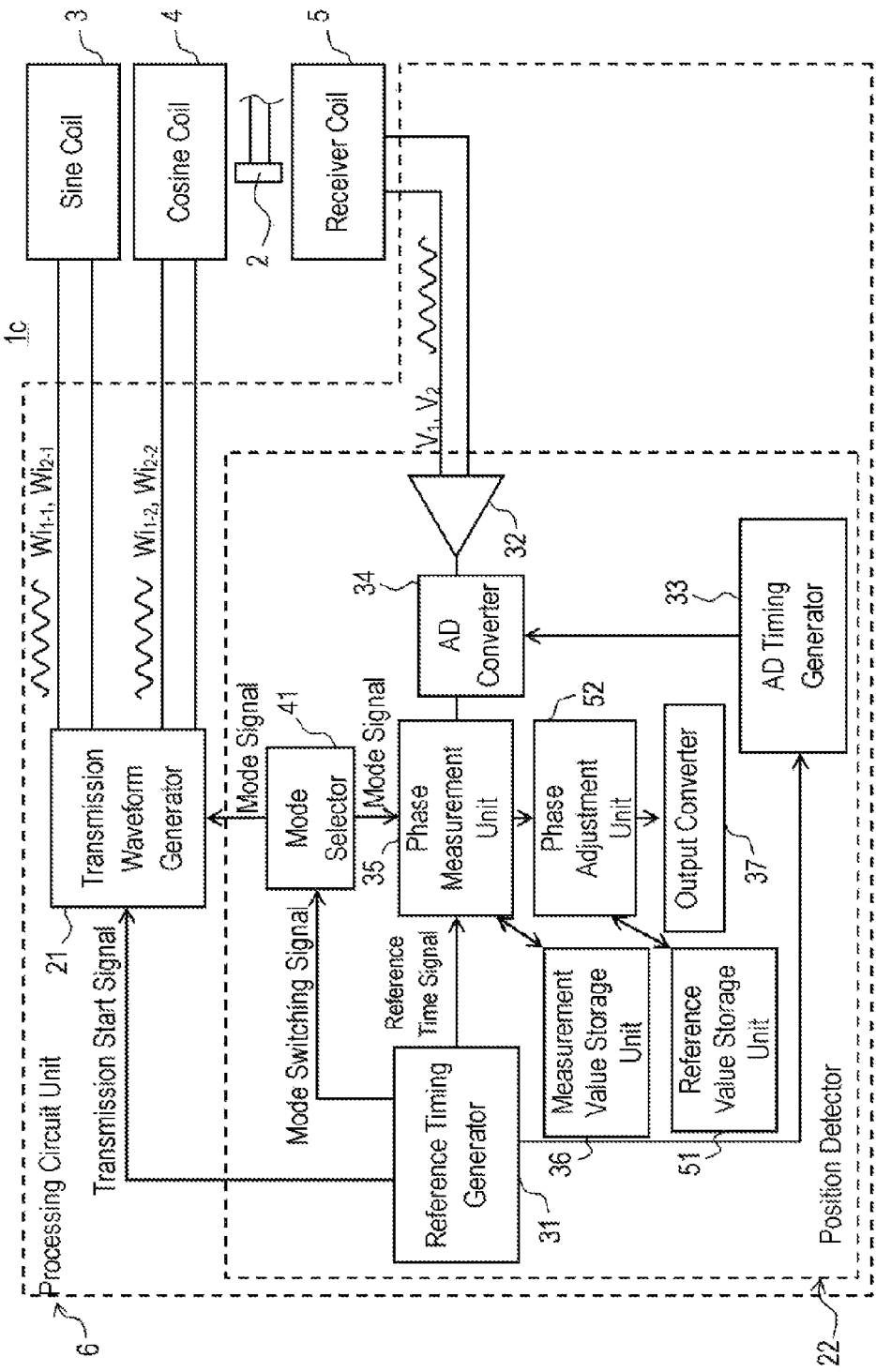
FIG. 13 is a circuit block diagram of a position sensor according to a fifth exemplary embodiment.

FIG. 13 is an electric block diagram of position sensor 1c according to a fifth exemplary embodiment. In FIG. 13, components identical to those of position sensor 1b according to the fourth exemplary embodiment illustrated in FIG. 9 are denoted by the same reference numerals. Position sensor 1c according to the fifth exemplary embodiment is different from position sensor 1b according to the fourth exemplary embodiment in a method for measuring a phase component $\theta_X$ corresponding to a position X of target 2. That is, position sensor 1c according to the present exemplary embodiment is different from position sensor 1b according to the fourth exemplary embodiment in position detector 22. The other components in accordance with the present exemplary embodiment are similar to components of the fourth exemplary embodiment.

In addition to the components of the fourth exemplary embodiment, position detector 22 further includes reference value storage unit 51 that stores a reference value $\alpha_0$ of a phase offset α, and phase adjustment unit 52 that adjusts the phase component $\theta_X$ corresponding to the position X of target 2 based on the phase offset α. In addition, phase measurement unit 35 is different from phase measurement unit 35 of the fourth exemplary embodiment. The other components of position detector 22 are similar to components of the fourth exemplary embodiment.

Phase measurement unit 35 measures phase $\theta_1$ of a first output signal $V_1$ and phase $\theta_2$ of second output signal $V_2$ based on output of A/D converter 34, that is, based on the output signals $V_1$ and $V_2$ obtained from receiver coil 5. In accordance with the present exemplary embodiment, unlike the fourth exemplary embodiment, phase measurement unit 35 does not calculate the phase component $\theta_X$ corresponding to the position X of target 2.

Phase measurement unit 35 has a first measurement mode and a second measurement mode as a phase measurement operation for measuring the phases $\theta_1$ and $\theta_2$. Set of each measurement mode and start of the phase measurement operation in each measurement mode are similar to the fourth exemplary embodiment.

In the first measurement mode, similarly to the first exemplary embodiment, phase measurement unit 35 stores, in measurement value storage unit 36, measurement value $\theta_1^*$ obtained by measuring the phase $\theta_1$ of the output signal $V_1$ obtained from receiver coil 5. In the second measurement mode, similarly to the first exemplary embodiment, phase measurement unit 35 stores, in measurement value storage unit 36, measurement value $\theta_2^*$ obtained by measuring the phase $\theta_2$ of the output signal $V_2$ obtained from receiver coil 5.

Similarly to the fourth exemplary embodiment, the phase θ measured in the first measurement mode is the measurement value $\theta_1^*$ of the phase $\theta_1$ of the first output signal $V_1$ with respect to an input time point To of a reference time signal. The phase θ measured in the second measurement mode is the measurement value $\theta_2^*$ of the phase $\theta_2$ of the second output signal $V_2$ with respect to the input time point To of the reference time signal.

Reference value storage unit 51 previously stores the reference value $\alpha_0$ of the phase offset α. The reference value $\alpha_0$ is a value of the phase $\theta_1$ or $\theta_2$ when the position X of target 2 is X=0 (when target 2 is positioned at an origin O, which is a center of a detection area $R_D$). For example, the reference value $\alpha_0$ is measured in a process for manufacturing position sensor 1c, and is stored in reference value storage unit 51.

Phase adjustment unit 52 calculates the phase offset α based on the phases $\theta_1$ and $\theta_2$ measured by phase measurement unit 35, and then phase adjustment unit 52 adjusts and calculates the phase component $\theta_X$ corresponding to the position X of target 2 based on the phase offset α and reference value $α_0$. That is, based on the phases $θ_1$ and $θ_2$, phase offset α, and reference value $α_0$, phase adjustment unit 52 calculates measurement value $θ_X^*$ of the phase component $θ_X$, so that the measurement value $θ_X^*$ may have a value identical to a value of the actual phase component $θ_X$ in a range from X=−L/2 to X=L/2 (in an entire range of the detection area $R_D$).

Output converter 37 converts the phase component $θ_X$ measured by phase adjustment unit 52 (measurement value $θ_X^*$) into the position X of target 2. That is, similarly to the first exemplary embodiment, output converter 37 calculates the position X of target 2 based on X=$θ_X^*$×(L/2π). Then, output converter 37 outputs the calculated position X of target 2.

Figure 14:
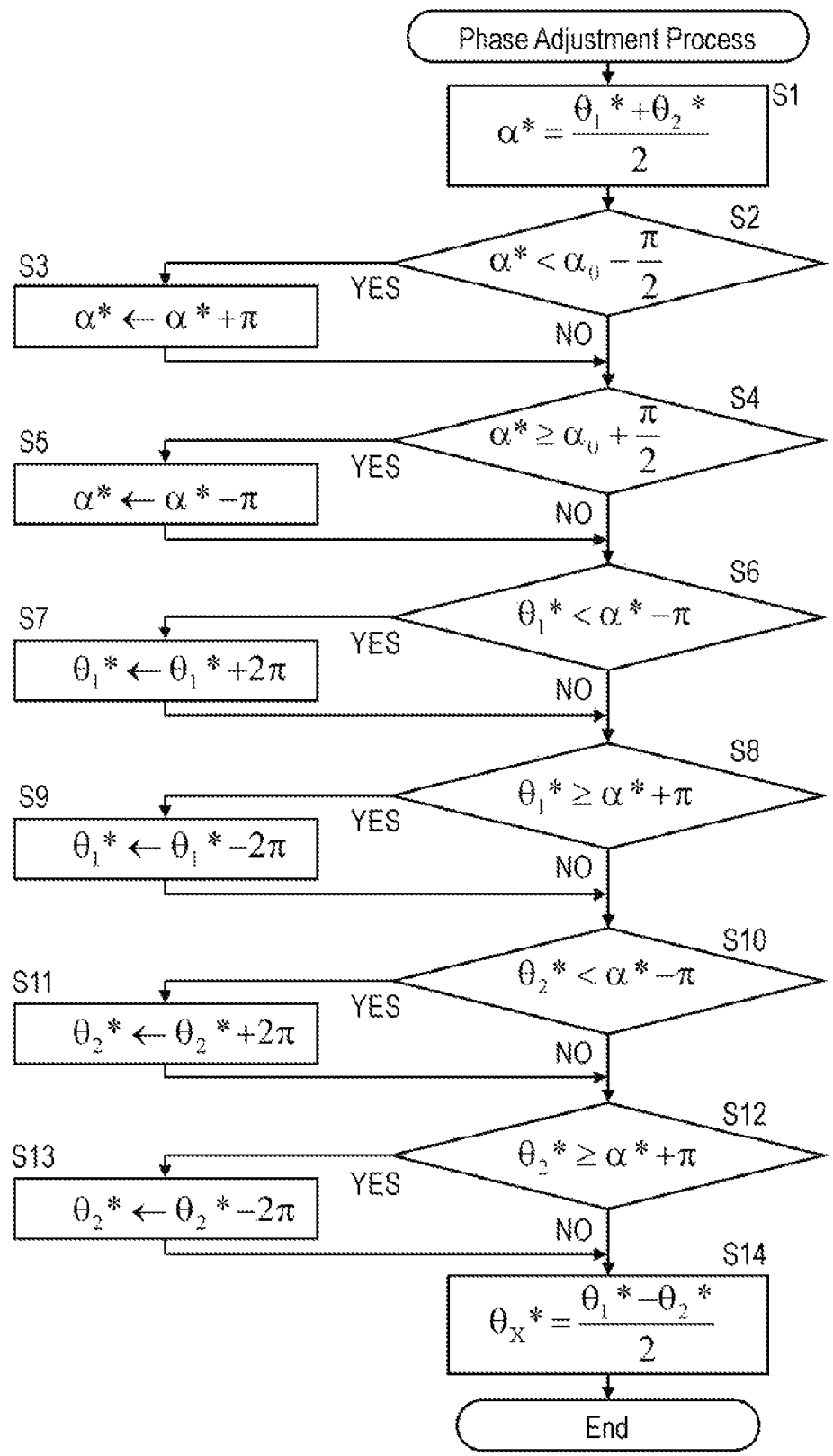
FIG. 14 is a flowchart illustrating an operation of a phase adjustment unit of the position sensor according to the fifth exemplary embodiment.
Figure 15A:
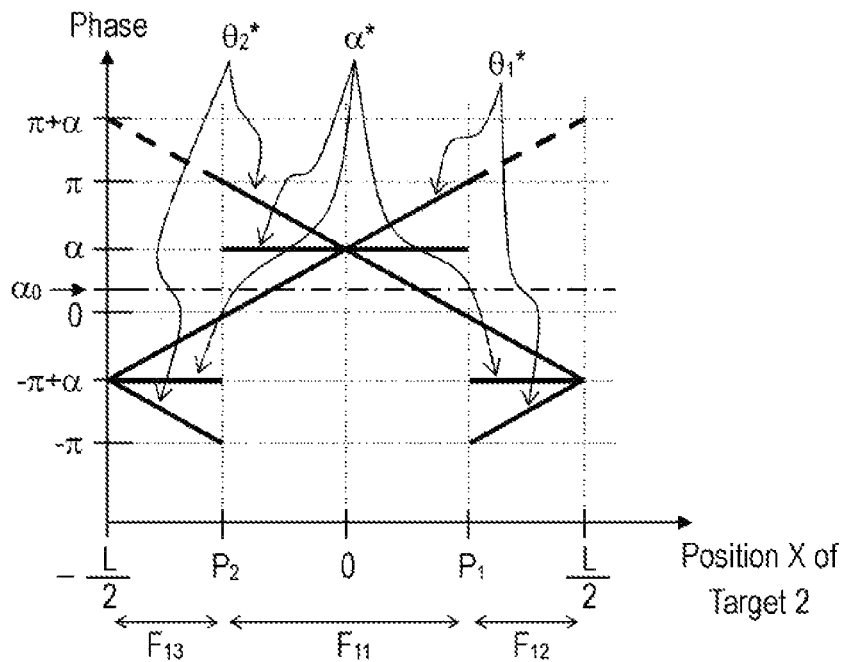
FIG. 15A illustrates a measurement value of a phase before adjustment of the position sensor according to the fifth exemplary embodiment.
Figure 15B:
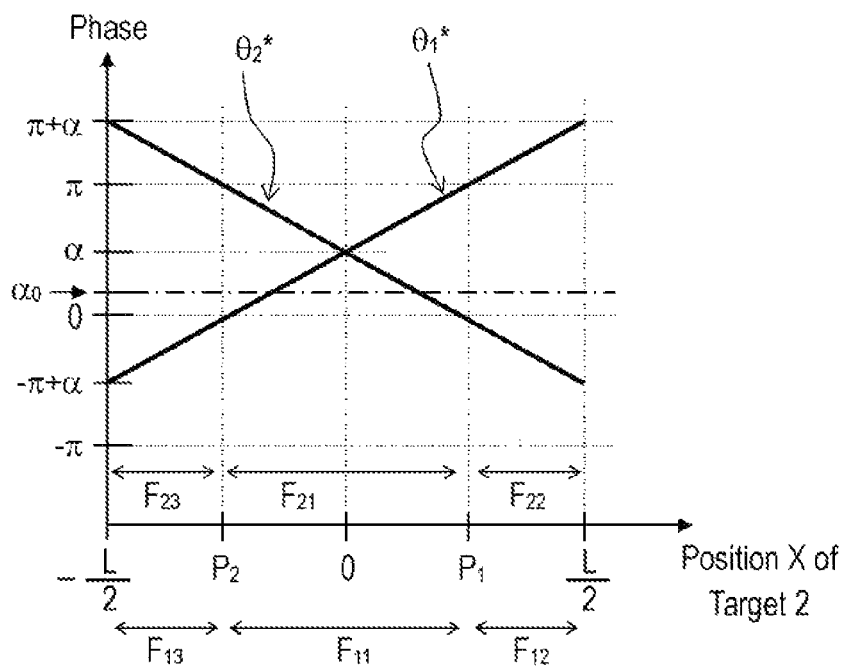
FIG. 15B illustrates the measurement value of the phase after adjustment of the position sensor according to the fifth exemplary embodiment.
Figure 16A:
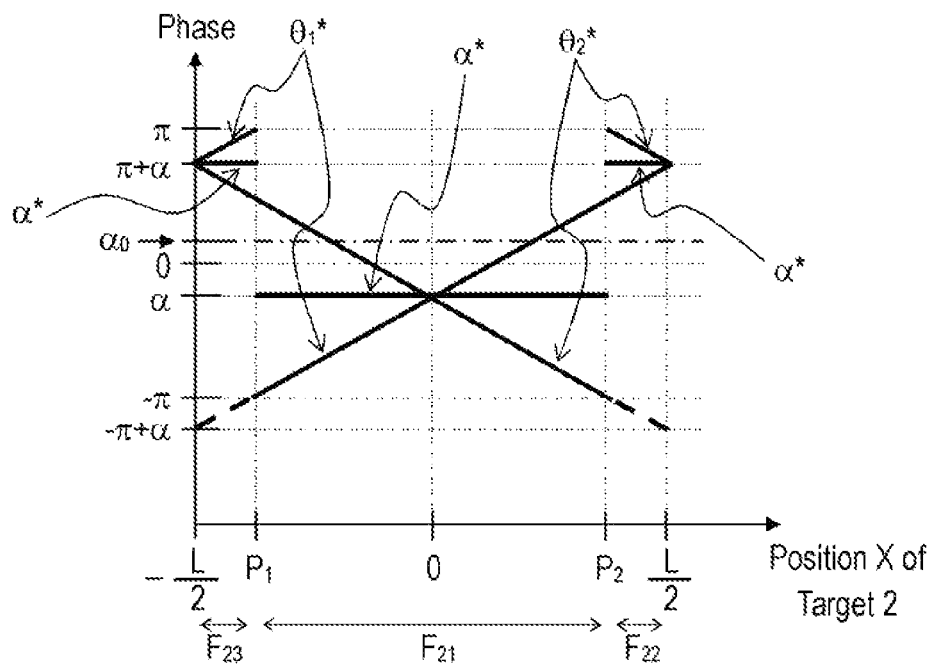
FIG. 16A illustrates the measurement value of the phase before adjustment of the position sensor according to the fifth exemplary embodiment.
Figure 16B:
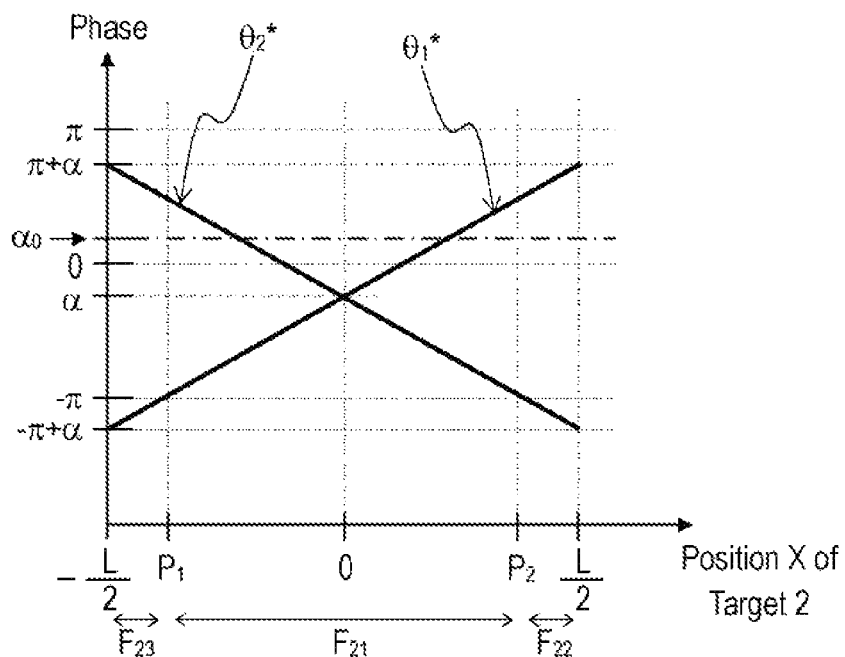
FIG. 16B illustrates the measurement value of the phase after adjustment of the position sensor according to the fifth exemplary embodiment.

FIG. 14 is a flowchart illustrating phase adjustment processes in phase adjustment unit 52. FIG. 15A and FIG. 15B illustrate the measurement values $θ_1^*$ and $θ_2^*$ of the phases $θ_1$ and $θ_2$ in a case where the phase offset α in the phase adjustment processing is a positive value. FIG. 16A and FIG. 16B illustrate the measurement values $θ_1^*$ and $θ_2^*$ of the phases $θ_1$ and $θ_2$ in a case where the phase offset α in the phase adjustment processing is a negative value. In each of FIG. 15A, FIG. 15B, FIG. 16A, and FIG. 16B, a vertical axis represents values of the measurement values $θ_1^*$ and $θ_2^*$ of the phases $θ_1$ and $θ_2$, and a horizontal axis represents the position X of target 2.

After phase measurement unit 35 measures the measurement value $θ_1^*$ of the phase $θ_1$ of the first output signal $V_1$ and the measurement value $θ_2^*$ of the phase $θ_2$ of the second output signal $V_2$, phase adjustment unit 52 calculates the measurement value $θ_X^*$ of the phase component $θ_X$ corresponding to the position X of target 2 as follows.

First, based on the measurement values $θ_1^*$ and $θ_2^*$ measured by phase measurement unit 35, phase adjustment unit 52 calculates the measurement value α* of the phase offset α based on α*=($θ_1^*$+$θ_2^*$)/2 (step S1).

In a case where the phase offset α is a positive value, as illustrated in FIG. 15A, when the position X of target 2 is in range $F_{11}$ from periodic point $P_2$ to periodic point $P_1$, the measurement value α* is the phase offset α (α=α*). When the position X is in ranges $F_{12}$ and $F_{13}$ other than range $F_{11}$, the measurement value α* is a value deviated by from the actual phase offset α (α*=α−π). Here, range $F_{12}$ is a range from the periodic point $P_1$ to right end 301 (X=L/2) of a detection range, and range $F_{13}$ is a range from left end 302 (X=−L/2) of the detection range to the periodic point $P_2$.

In a case where the phase offset α is a negative value, as illustrated in FIG. 16A, when the position X of target 2 is in range $F_{21}$ from the periodic point $P_2$ to the periodic point $P_1$, the measurement value c is identical to the phase offset α. When the position X is in ranges $F_{22}$ and $F_{23}$ other than range $F_{21}$, the measurement value c is a value deviated by π from the actual phase offset α (α*=α+π). Here, range $F_{22}$ is from the periodic point $P_2$ to right end 301 (X=L/2) of the detection range, and range $F_{23}$ is from left end 302 (X=−L/2) of the detection range to the periodic point $P_1$.

When the measurement value α* calculated in step S1 is smaller than ($α_0$−π/2) ("YES" in step S2), phase adjustment unit 52 adjusts the measurement value α*, and then, obtains (α*+π) as the measurement value α* (step S3). In step S2, when the measurement value α* calculated in step S1 is not smaller than ($α_0$−π/2) ("No" in step S2), phase adjustment unit 52 keeps and obtains the measurement value c as it is.

Subsequently, when the measurement value c obtained in steps S2 and S3 is not smaller than (α0+π/2) ("YES" in step S4), phase adjustment unit 52 adjusts the measurement value α* obtained in steps S2 and S3, and then, obtains (α*−π) as the measurement value α* (step S5). In step S4, when the measurement value e obtained in steps S2 and S3 is smaller than ($α_0$+π/2) ("No" in step S4), phase adjustment unit 52 keeps and obtains the measurement value α* obtained in steps S2 and S3 as it is.

Then, when the measurement value $θ_1^*$ is smaller than (α*−π) ("YES" in step S6), phase adjustment unit 52 adjusts the measurement value $θ_1^*$, and then, obtains $θ_1^*$+2π as the measurement value $θ_1^*$ (step S7). In step S6, when the measurement value $θ_1^*$ is not smaller than (α*−π) ("No" in step S6), phase adjustment unit 52 keeps and obtains the measurement value $θ_1^*$ as it is.

Subsequently, when the measurement value $θ_1^*$ obtained in steps S6 and S7 is not smaller than (α*+π) ("YES" in step S8), phase adjustment unit 52 adjusts the measurement value $θ_1^*$ obtained in steps S6 and S7, and then, obtains ($θ_1^*$−2π) as the measurement value $θ_1^*$ (step S9). In step S8, when the measurement value $θ_1^*$ obtained in steps S6 and S7 is smaller than (α*+π) ("NO" in step S8), phase adjustment unit 52 keeps and obtains the measurement value $θ_1^*$ obtained in steps S6 and S7 as it is.

When the measurement value $θ_2^*$ is smaller than (α*−π) ("YES" in step S10), phase adjustment unit 52 adjusts the measurement value $θ_2^*$, and then, obtains ($θ_2^*$+2π) as the measurement value $θ_2^*$ (step S11). In step S10, when the measurement value $θ_2^*$ is not smaller than (α*−π) ("NO" in step S10), phase adjustment unit 52 keeps and obtains the measurement value $θ_2^*$ as it is.

Subsequently, when the measurement value $θ_2^*$ obtained in steps S10 and S11 is not smaller than (α*+π) ("YES" in step S12), phase adjustment unit 52 adjusts the measurement value $θ_2^*$ obtained in steps S10 and S11, and then, obtains ($θ_2^*$−2π) as the measurement value $θ_2^*$ (step S13). In step S12, when the measurement value $θ_2^*$ obtained in steps S10 and S11 is smaller than (α*+π) ("NO" in step S12), phase adjustment unit 52 keeps and obtains the measurement value $θ_2^*$ obtained in steps S10 and S11 as it is.

In a case where the phase offset α is a positive value, when the position X of target 2 is in range $F_{12}$ from the periodic point $P_1$ to right end 301 (X=L/2) of the detection range, the operation illustrated in FIG. 14 passes through "YES" in step S2, "NO" in step S3, step S4, "YES" in step S6, "NO" in step S7, step S8, "NO" in step S10, and "NO" in step S12. Then, in the case where the phase offset α is a positive value, when the position X of target 2 is in range $F_{12}$ from the periodic point $P_1$ to right end 301 (X=L/2) of the detection range, 2π is added to the measurement value $θ_1^*$ of the phase $θ_1$ as illustrated in FIG. 15A and FIG. 15B, and then, ($θ_1^*$+2π) is output as the measurement value $θ_1^*$.

In the case where the phase offset α is a positive value, when the position X of target 2 is in range $F_{13}$ from left end 302 (X=−L/2) to the periodic point $P_2$, the operation illustrated in FIG. 14 passes through "YES" in step S2, "NO" in step S3, step S4, "NO" in step S6, "NO" in step S8, "YES" in step S10, and "NO" in step S11, step S12. Then, in the case where the phase offset α is a positive value, when the position X of target 2 is in range $F_{13}$ from end 302 (X=−L/2) to the periodic point $P_2$, 2π is added to the measurement value $θ_2^*$ of the phase $θ_2$ as illustrated in FIG. 15A and FIG. 15B, and then, ($θ_1^*$+2π) is output as the measurement value $θ_1^*$.

In a case where the phase offset α is a negative value, when the position X of target 2 is in range $F_{23}$ from left end 302 (X=−L/2) to the periodic point $P_1$, the operation illustrated in FIG. 14 passes through "NO" in step S2, "YES" in step S4, "NO" in step S5, step S6, "YES" in step S8, "NO"

in step S9, step S10, and "NO" in step S12. Then, in the case where the phase offset α is a negative value, when the position X of target 2 is in range $F_{23}$ from end 302 (X=−L/2) to the periodic point $P_1$, −2π is added to the measurement value $\theta_1^*$ of the phase 1 as illustrated in FIG. 16A and FIG. 16B, and then, $(\theta_1^*-2\pi)$ is output as the measurement value $\theta_1^*$.

In the case where the phase offset α is a negative value, when the position X of target 2 is in range $F_{22}$ from the periodic point $P_2$ to right bridge 301 (X=L/2) of the detection range, the operation illustrated in FIG. 14 passes through "NO" in step S2, "YES" in step S4, "NO" in step S5, step S6, "NO" in step S8, "NO" in step S10, "YES" in step S12, and step S13. Then, in the case where the phase offset α is a negative value, when the position X of target 2 is in the range from the periodic point $P_2$ to end 301 (X=L/2), −2π is added to the measurement value $\theta_2^*$ of the phase $\theta_2$ as illustrated in FIG. 16A and FIG. 16B, and then, $(\theta_2^*-2\pi)$ is output as the measurement value $\theta_2^*$.

Then, based on the measurement values $\theta_1^*$ and $\theta_2^*$ obtained by adjustment in steps S2 to S13, phase adjustment unit 52 calculates the measurement value $\theta_X^*$ of the phase component $\theta_X$ based on $\theta_X^*=(\theta_1^*-\theta_2^*)/2$ (step S14).

Figure 17:
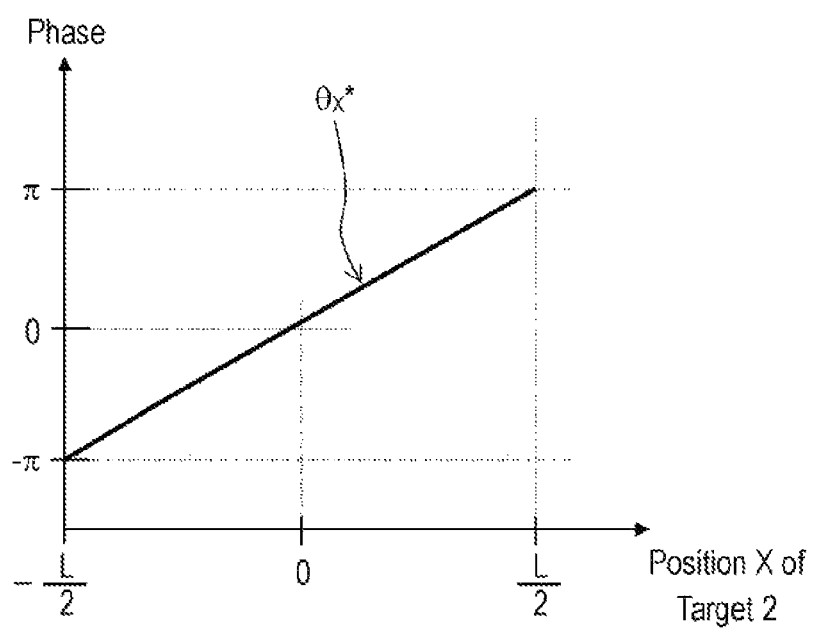
FIG. 17 illustrates a measurement value of a phase component corresponding to a position of a target included in the output signal of the receiver coil of the position sensor according to the fifth exemplary embodiment.

FIG. 17 illustrates a relationship between the position X of target 2 and the measurement value $\theta_X^*$ of the phase component $\theta_X$ calculated in this way. In FIG. 17, a vertical axis represents the measurement value $\theta^*$ of the phase component $\theta_X$, and a horizontal axis represents the position X of target 2. As illustrated in FIG. 17, regardless of whether the phase offset α is a positive value or a negative value, the measurement value $\theta_X^*$ is proportional to the position X of target 2 in the range from the left end (X=−L/2) to right end 301 (X=L/2) of the detection range, that is, in the entire range of the detection area $R_D$, and the measurement value $\theta_X^*$ increases from to t in the range from end 302 (X=−L/2) to end 301 (X=L/2). That is, regardless of whether the phase offset α is a positive value or a negative value, the measurement value $\theta_X^*$ is identical to the actual phase component Ox (refer to the phase component $\theta_X$ shown in FIG. 4A and FIG. 4B) in the range from end 302 (X=−L/2) to end 301 (X=L/2).

Position sensor 1c according to the present exemplary embodiment can measure the measurement value $\theta_X^*$ so that the measurement value $\theta_X^*$ may be identical to the actual phase component $\theta_X$ in the entire range of the detection area $R_D$ to detect the position X of target 2. Moreover, even when the phase offset α changes from the reference value $\alpha_0$ due to a factor, such as temperature, position sensor 1c according to the present exemplary embodiment can measure the measurement value $\theta_X^*$ so that the measurement value $\theta_X^*$ can be identical to the actual phase component $\theta_X$ in the entire range of the detection area $R_D$ to detect the position X of target 2. It is assumed that the phase offset α changes in a range of $-\pi/2<\alpha_1<\pi/2$. When the phase offset α does not change from the reference value $\alpha_0$, processes in steps S2 and S4 illustrated in FIG. 14 is unnecessary. In each of steps S6, S8, S10, and S12, processing may be performed with the measurement value $\alpha^*$ replaced with the reference value $\alpha_0$.

Figure 18:
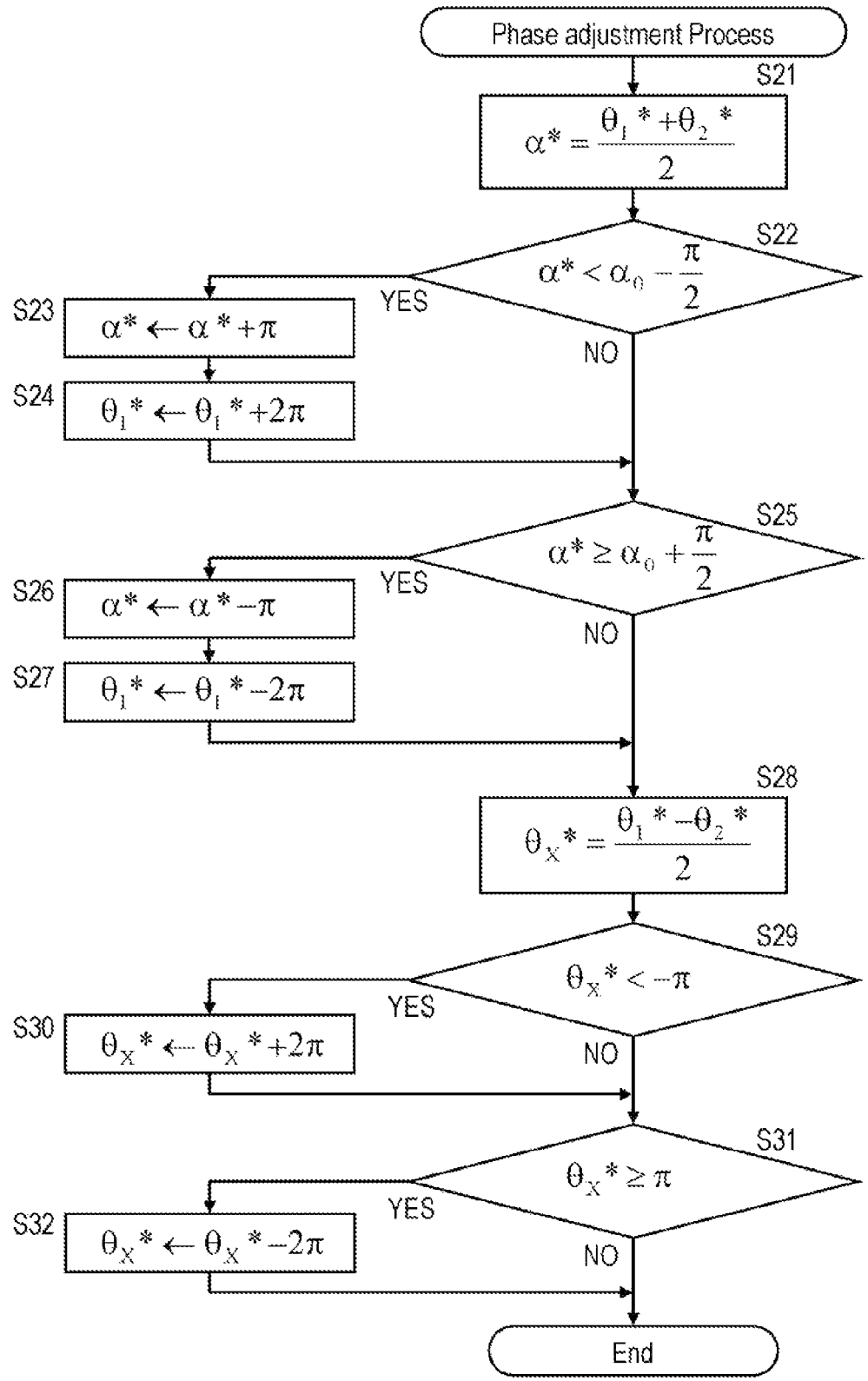
FIG. 18 is a flowchart illustrating another operation of the phase adjustment unit of the position sensor according to the fifth exemplary embodiment.

FIG. 18 is a flowchart of another phase adjustment processing in phase adjustment unit 52. In the phase adjustment processing illustrated in FIG. 18, phase adjustment unit 52 calculates the measurement value $\theta_X^*$ of the phase component $\theta_X$ corresponding to the position X of target 2 as follows.

First, phase adjustment unit 52 calculates the measurement value $a^*$ of the phase offset α based on $\alpha^*=(\theta_1^*+\theta_2^*)/2$ based on the measurement values $\theta_1^*$ and $\theta_2^*$ measured by phase measurement unit 35 (step S21).

Here, when the measurement value c calculated in step S21 is smaller than $(\alpha_0-\pi/2)$ ("YES" in step S22), phase adjustment unit 52 adjusts the measurement value $\alpha^*$ to obtain $(\alpha^*+\pi)$ as the measurement value $\alpha^*$ (step S23). Phase adjustment unit 52 adjusts the measurement value $\theta_1^*$ to obtain $(\theta^1{}^*+\pi_2)$ as the measurement value $\theta_1^*$ (step S24). In step S22, when the measurement value c obtained in step S21 is not smaller than $(\alpha_0-\pi/2)$ ("NO" in step S22), phase adjustment unit 52 keeps and obtains the measurement value $\alpha^*$ and the measurement value $\theta_1^*$ as they are.

Subsequently, when the measurement value c obtained in steps S22 and S23 is not smaller than $\alpha_0+\pi/2$ ("YES" in S25), phase adjustment unit 52 adjusts the measurement value c obtained in steps S22 and S23 to obtain $(\alpha^*-\gamma)$ as the measurement value $a^*$ (step S26), and adjusts the measurement value $\theta_1^*$ obtained in steps S22 and S24 to obtain $(01^*-27c)$ as the measurement value $\theta_1^*$ (step S27). In step S25, when the measurement value $\pi^*$ obtained in step S25 is smaller than $(\alpha_0+\pi/2)$ ("NO" in step S25), phase adjustment unit 52 keeps and obtains the measurement value $\alpha^*$ and the measurement value $\theta_1^*$ as they are.

Subsequently, phase adjustment unit 52 calculates the measurement value $\theta_X^*$ of the phase component $\theta_X$ based on $\theta_X^*=(\theta_1^*-\theta_2^*)/2$ based on the measurement values $\theta_2^*$ and $\theta_1^*$ obtained in steps S22 to S27 (step S28).

Then, when the measurement value $\theta_X^*$ calculated in step S28 is smaller than ("YES" in step S29), phase adjustment unit 52 adjusts the measurement value $\theta_X^*$ to obtain $(\theta_X^*+2\pi)$ as the measurement value $\theta_X^*$ (step S30). In step S29, when the measurement value $\theta_X^*$ calculated in step S28 is not smaller than ("NO" in step S29), phase adjustment unit 52 keeps and obtains the measurement value $\theta_X^*$ as it is.

Subsequently, when the measurement value $\theta_X^*$ obtained in steps S29 and S30 is not smaller than π("YES" in step S31), phase adjustment unit 52 adjusts the measurement value $\theta_X^*$ obtained in steps S29 and S30 to obtain $(\theta_X^*-2\pi)$ as the measurement value $\theta_X^*$ (step S32). In step S31, when the measurement value $\theta_X^*$ obtained in steps S29 and S30 is smaller than t ("NO" in step S31), phase adjustment unit 52 keeps and obtains the measurement value $\theta_X^*$ obtained in steps S29 and S30 as it is.

In a case where the phase offset α is a positive value, when the position X of target 2 is in range $F_{12}$ from the periodic point $P_1$ to right end 301 (X=L/2) of the detection area $R_D$, the operation illustrated in FIG. 18 passes through "YES" in step S22, "NO" in step S23, step S24, step S25, "NO" in step S28, step S29, and "NO" in step S31. In the case where the phase offset α is a positive value, when the position X of target 2 is in range $F_{13}$ from left end 302 (X=−L/2) of the detection range to the periodic point P2, the operation illustrated in FIG. 18 passes through "YES" in step S22, "NO" in step S23, step S24, step S25, "NO" in step S28, step S29, "YES" in step S31, and step S32.

In a case where the phase offset α is a negative value, when the position X of target 2 is in range $F_{23}$ from end 302 (X=−L/2) to the periodic point $P_1$, the operation illustrated in FIG. 18 passes through "NO" in step S22, "YES" in step S25, "NO" in step S26, step S27, step S28, step S29, and "NO" in steps S31. In the case where the phase offset α is a negative value, when the position X of target 2 is in range $F_{22}$ from the periodic point $P_2$ to end 301 (X=L/2), the operation illustrated in FIG. 18 passes through "NO" in step S22, "YES" in step S25, "YES" in step S26, step S27, step S28, step S29, and "NO" in step S30, step S31.

The above phase adjustment processing allows measurement of the measurement value $\theta_X{}^*$ so that the measurement value $\theta_X{}^*$ is identical to the actual phase component $\theta_X$ in the entire range of the detection area $R_D$, similarly to the phase adjustment processes shown in FIG. 14.

Sixth Exemplary Embodiment

Figure 19:
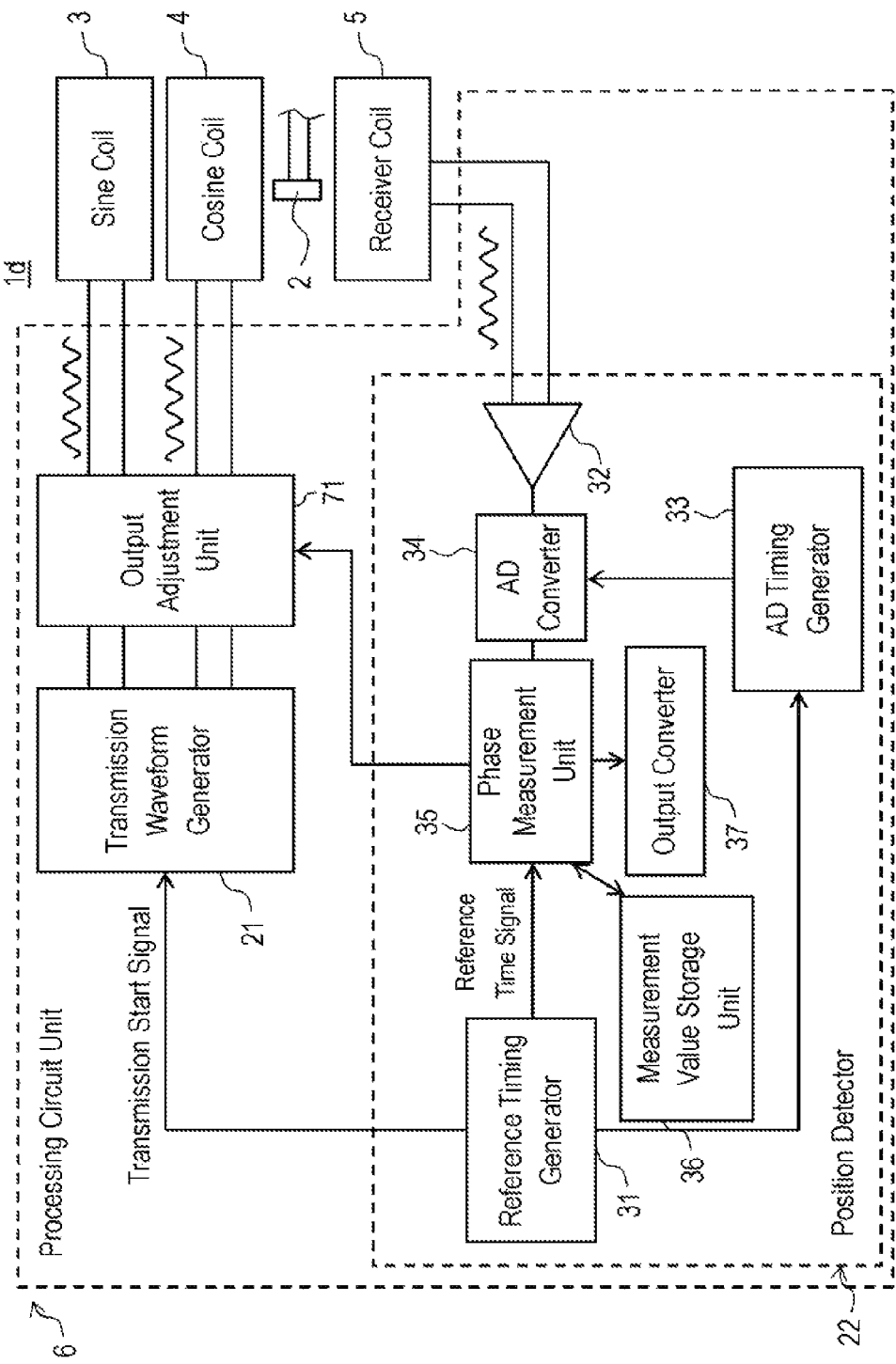
FIG. 19 is a circuit block diagram of a position sensor according to a sixth exemplary embodiment.

FIG. 19 illustrates an electric block diagram of position sensor 1d according to a sixth exemplary embodiment. In FIG. 19, components identical to those of position sensor 1a according to the third exemplary embodiment illustrated in FIG. 2 are denoted by the same reference numerals. In addition to components of the third exemplary embodiment, position sensor 1d according to the sixth exemplary embodiment further includes output adjustment unit 71 that adjusts amplitude of an output obtained from receiver coil 5. In addition, phase measurement unit 35 of position detector 22 is different from phase measurement unit 35 according to the third exemplary embodiment. The other components in accordance with the present exemplary embodiment are similar to components of the third exemplary embodiment.

Figure 20:
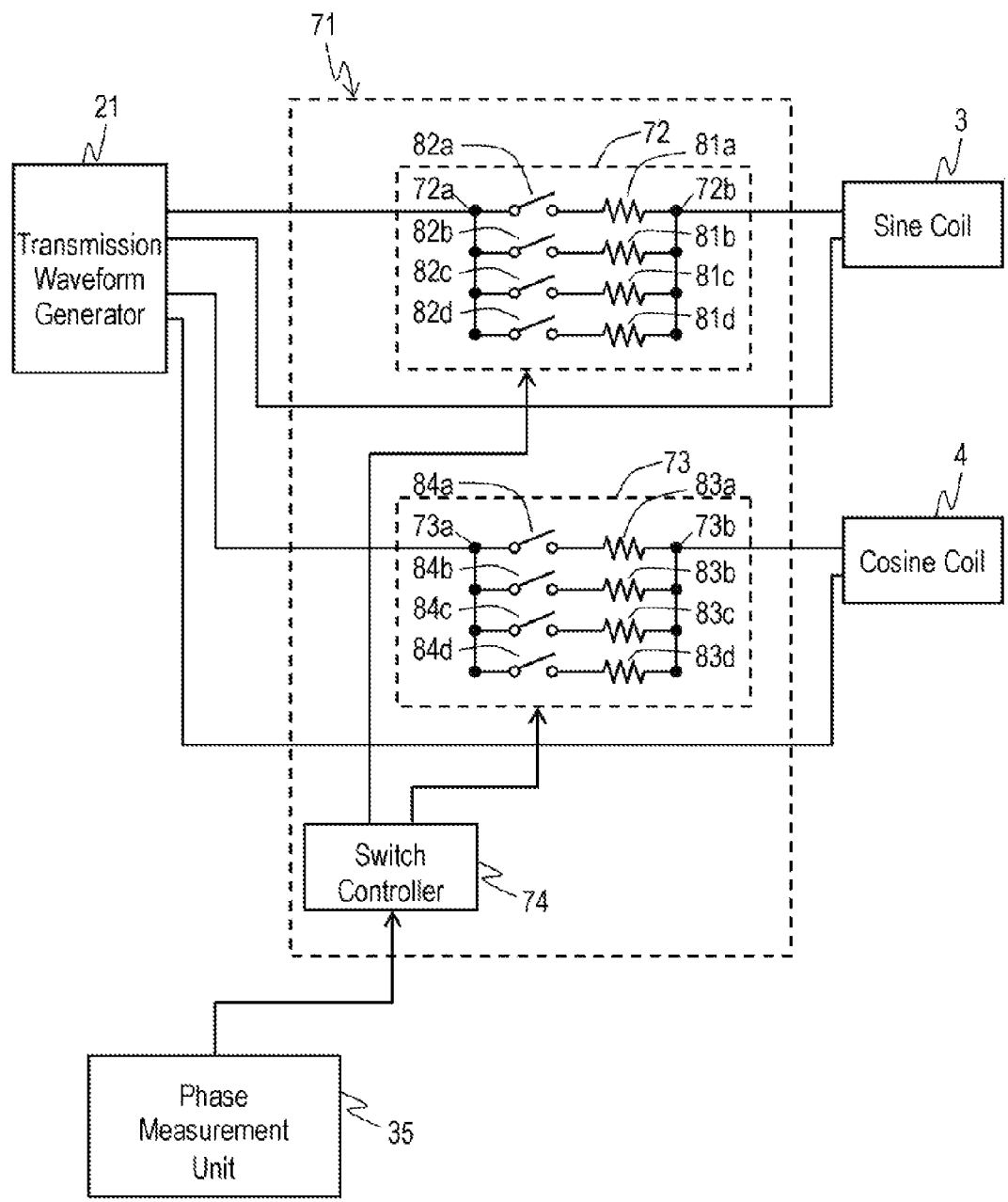
FIG. 20 is a schematic diagram of an output adjustment unit of the position sensor according to the sixth exemplary embodiment.

FIG. 20 is a schematic diagram of output adjustment unit 71. As illustrated in FIG. 20, output adjustment unit 71 includes sine switch unit 72 for adjusting an amount of electric current that flows into sine coil 3, cosine switch unit 73 for adjusting an amount of electric current that flows into cosine coil 4, and switch controller 74 that controls sine switch unit 72 and cosine switch unit 73.

Sine switch unit 72 is connected between transmission waveform generator 21 and sine coil 3, and includes plural resistors 81a to 81d and plural switches 82a to 82d. Resistors 81a to 81d are connected in parallel with one another. Each of resistors 81a to 81d is connected between sine coil 3 and respective one of switches 82a to 82d. Specifically, sine switch unit 72 includes node 72a connected to transmission waveform generator 21, and node 72b connected to sine coil 3. Resistors 81a to 81d are connected in parallel with each other between nodes 72a and 72b. Switches 82a to 82d are connected in series with resistors 81a to 81d, respectively, between nodes 72a, 72b. Resistance values of resistors 81a to 81d are different from one another. In accordance with the present exemplary embodiment, resistor 81a has a resistance value of r, resistor 81b has a resistance value of 2r, resistor 81c has a resistance value of 4r, and resistor 81d has a resistance value of 8r. Therefore, combinations of opening and closing of switches 82a to 82d allow a combined resistance value of resistors 81a to 81d to have sixteen resistance values, accordingly allows sixteen levels of amounts of electric current to flow into sine coil 3.

Cosine switch unit 73 is connected between transmission waveform generator 21 and cosine coil 4, and includes plural resistors 83a to 83d and plural switches 84a to 84d. Resistors 83a to 83d are connected in parallel with each other. Each of resistors 83a to 83d is connected between cosine coil 4 and respective one of switches 84a to 84d. Specifically, cosine switch unit 73 includes node 73a connected to transmission waveform generator 21, and node 73b connected to cosine coil 4. Resistors 83a to 83d are connected in parallel with one another between nodes 73a and 73b. Switches 84a to 84d are connected in series with resistors 83a to 83d, respectively, between nodes 73a and 73b. Resistance values of resistors 83a to 83d are different from one another. In accordance with the present exemplary embodiment, resistor 83a has a resistance value of r, resistor 83b has a resistance value of 2r, resistor 83c has a resistance value of 4r, and resistor 83d has a resistance value of 8r. Therefore, combinations of turning on and off of switches 84a to 84d allow a combined resistance value of resistors 83a to 83d to have sixteen resistance values, accordingly allowing sixteen levels of amounts of electric current to flow into cosine coil 4.

Switch controller 74 controls turning on and off of switches 82a to 82d of sine switch unit 72 and switches 84a to 84d of cosine switch unit 73 to adjust the amount of electric current that flows into sine coil 3 and the amount of electric current that flows into cosine coil 4, and to adjust amplitude of an output signal V of receiver coil 5.

Position detector 22 detects position X of target 2 based on the output signal V obtained from receiver coil 5, similarly to the third exemplary embodiment. That is, position detector 22 measures phase $\theta$ of the output signal V obtained from receiver coil 5 based on the output signal V obtained from receiver coil 5 by a method similar to the third exemplary embodiment. Then, based on the phase $\theta$, position detector 22 calculates a phase component $\theta_X$ corresponding to the position X of target 2 to detect the position X of target 2 by the method similar to the third exemplary embodiment.

In accordance with the present exemplary embodiment, in addition to measurement of the phase $\theta$ of output obtained from receiver coil 5, phase measurement unit 35 of position detector 22 measures amplitude A of the output signal V obtained from receiver coil 5. That is, phase measurement unit 35 measures the amplitude A of output obtained from receiver coil 5 by Formula 33 below.

$$A = \sqrt{u^2 + v^2} \qquad \text{[Formula 33]}$$

where $$u = \frac{2}{N^*} \sum_{n=0}^{N^*-1} \sin(2\pi f t_n)$$

$$v = \frac{2}{N^*} \sum_{n=0}^{N^*-1} \cos(2\pi f t_n)$$

Formula 33 is derived as follows. That is, variables u and v are defined as $u = A \cos \theta$ and $v = A \sin \theta$ in derivation of Formula 27 of the third exemplary embodiment (derivation of Formula 20 of the second exemplary embodiment). This provides $u^2 + v^2 = A^2$. Since the variables u and v are expressed as Formula 26 of the second exemplary embodiment and satisfy a relationship of Formula 30 of the third exemplary embodiment, Formula 33 described above is obtained.

Phase measurement unit 35 outputs a value of the measured amplitude A to switch controller 74. Based on the value of the amplitude A measured by phase measurement unit 35, switch controller 74 turns on and off switches 82a to 82d and switches 84a to 84d. At this moment, switch controller 74 turns on and off switches 82a to 82d and 84a to 84d, so that the amplitude A may be not smaller than a predetermined value within a predetermined range, that is, so that the amplitude A of the output signal V obtained from receiver coil 5 may be not smaller than a predetermined value within a predetermined range.

Even if a gap between target 2 and circuit board 7 (a gap between target 2, and sine coil 3, cosine coil 4, and receiver coil 5) changes, position sensor 1d according to the present exemplary embodiment automatically adjusts amplitude of the output signal V obtained from receiver coil 5 to appropriate amplitude. This operation allows position sensor 1d according to the present exemplary embodiment to always obtain the output signal V of receiver coil 5 with appropriate amplitude A, and to increase an S/N ratio of output of receiver coil 5, independently of the gap between target 2 and circuit board 7. This allows position sensor 1d according to the present exemplary embodiment to always measure the phase θ accurately, and to detect the position X of target 2 accurately, independently of the gap between target 2 and circuit board 7.

In accordance with the present exemplary embodiment, a microcomputer may be used instead of switches 82a to 82d and 84a to 84d. That is, instead of switches 82a to 82d and 84a to 84d, input/output ports of a microcomputer used for input/output may be switched. In addition, amplitude of the output signal V obtained from receiver coil 5 may be adjusted by controlling a gain of amplifier 32.

Position sensor 1d according to the present exemplary embodiment may include a variable resistor connected in series between nodes 72a and 72b, instead of switches 82a to 82d and resistors 81a to 81d which are fixed resistors. Position sensor 1d may include a variable resistor connected in series between nodes 73a and 73b instead of switches 84a to 84d and resistors 82a to 82d which are fixed resistors. By adjusting resistance values of these variable resistors, switch controller 74 can adjust amplitude of the input waves that are input into sine coil 3 and cosine coil 4 accurately, and can adjust the amplitude A of the output signal V from receiver coil 5 with high accuracy.

Position sensor 1d according to the present exemplary embodiment may measure the phase θ of the output signal V obtained from receiver coil 5 by a method similar to the first or second exemplary embodiment. That is, position detector 22 may be configured similarly to position detector 22 according to the first or second exemplary embodiment. In addition, position sensor 1d according to the present exemplary embodiment may calculate the phase component $\theta_X$ corresponding to the position X of target 2 by a method similar to the fourth or fifth exemplary embodiment. That is, transmission waveform generator 21 and position detector 22 may be configured similarly to transmission waveform generator 21 and position detector 22 according to the fourth or fifth exemplary embodiment.

Seventh Exemplary Embodiment

Figure 21:
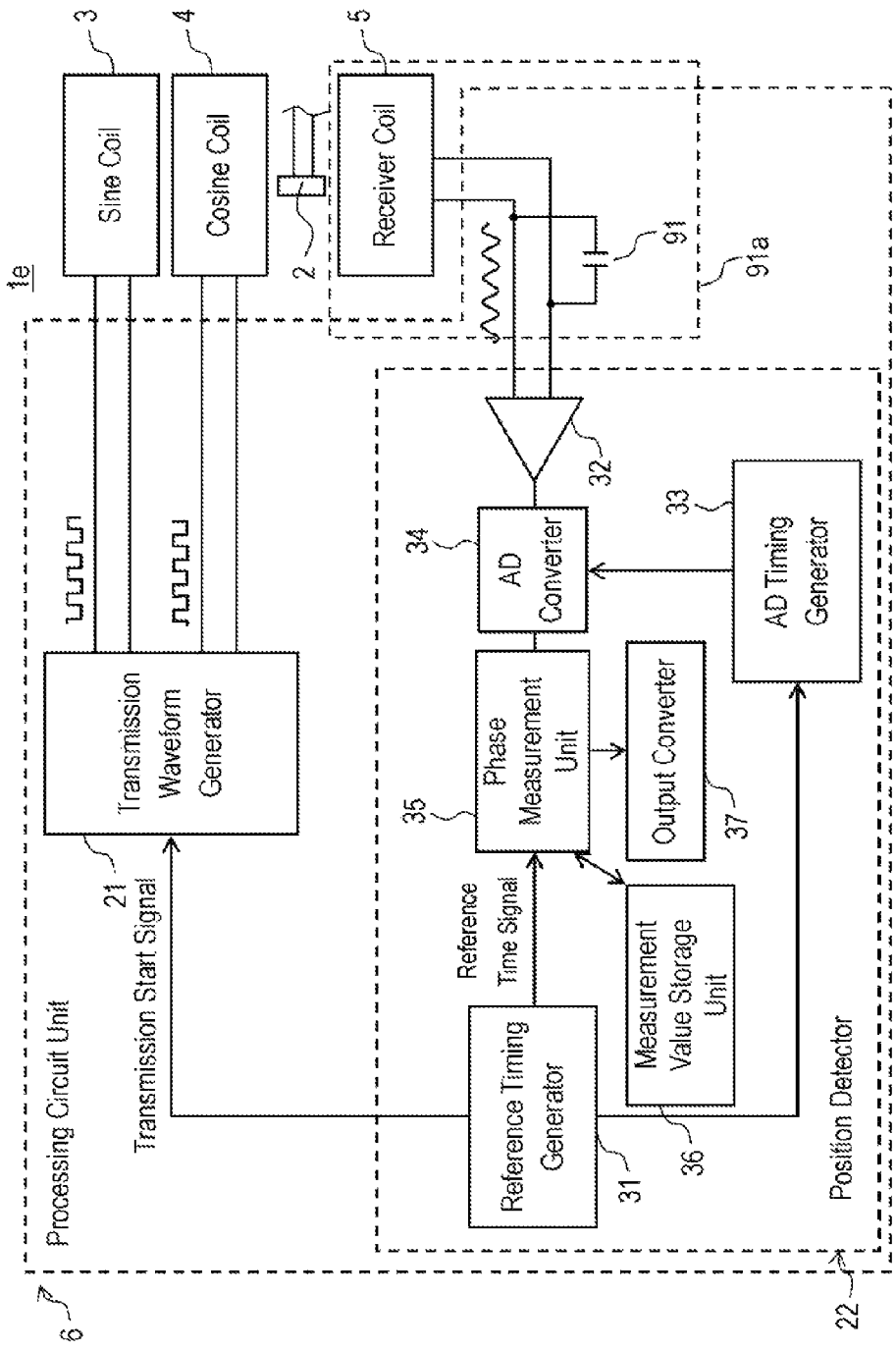
FIG. 21 is a circuit block diagram of a position sensor according to a seventh exemplary embodiment.

FIG. 21 is an electric block diagram of position sensor 1e according to a seventh exemplary embodiment. In FIG. 21, components identical to those of position sensor 1a according to the first exemplary embodiment illustrated in FIG. 2 are denoted by the same reference numerals. In addition to components of the first exemplary embodiment, position sensor 1e according to the seventh exemplary embodiment further includes capacitor 91 that forms resonant circuit 91a together with receiver coil 5. In addition, transmission waveform generator 21 is different from transmission waveform generator 21 according to the first exemplary embodiment. The other components in accordance with the present exemplary embodiment are similar to components of the first exemplary embodiment.

Resonant circuit 91a composed of receiver coil 5 and capacitor 91 so as to have a resonant frequency identical to a fundamental frequency f of input waves $Wi_1$ and $Wi_2$ that are input into sine coil 3 and cosine coil 4, respectively. That is, the capacitance of capacitor 91 is adjusted such that the resonant frequency of resonant circuit 91a is identical to the fundamental frequency f of the input waves $Wi_1$ and $Wi_2$. Resonant circuit 91a composed of receiver coil 5 and capacitor 91 is a parallel resonant circuit.

Transmission waveform generator 21 inputs, as the input waves $Wi_1$ and $Wi_2$, rectangular waves having the fundamental frequency f identical to the resonant frequency of resonant circuit 91a composed of receiver coil 5 and capacitor 91. That is, transmission waveform generator 21 inputs, as the input waves $Wi_1$ and $Wi_2$, the rectangular waves which have the fundamental frequency f identical to the resonant frequency of resonant circuit 91a and which have phases different from each other. In accordance with the present exemplary embodiment, similarly to the first exemplary embodiment, the input wave $Wi_1$ and the input wave $Wi_2$ have a phase relationship in which the phase of the input wave $Wi_2$ input into cosine coil 4 is delayed by $3\pi/2$ with respect to the phase of the input wave $Wi_1$ input into sine coil 3. In addition, in accordance with the present exemplary embodiment, unlike the first exemplary embodiment, the fundamental frequency f of the input waves $Wi_1$ and $Wi_2$ (resonant frequency of resonant circuit 91a) is 4 kHz.

Transmission waveform generator 21 starts inputting the input waves $Wi_1$ and $Wi_2$ to sine coil 3 and cosine coil 4, respectively, in response to a transmission start signal that is input from reference timing generator 31, similarly to the first exemplary embodiment.

The input waves $Wi_1$ and $Wi_2$, which are rectangular waves, into sine coil 3 and cosine coil 4, respectively, provide the output signal V that changes at a frequency identical to the fundamental frequency f of the input waves $Wi_1$ and $Wi_2$ from receiver coil 5, similarly to the first exemplary embodiment. The fundamental frequency of the output signal V of receiver coil 5, which is identical to the fundamental frequency f of the input waves $Wi_1$ and $Wi_2$, is identical to the resonant frequency of resonant circuit 91a composed of receiver coil 5 and capacitor 91. Therefore, the output signal V of receiver coil 5 resonates in resonant circuit 91a, and thus amplitude of the output signal V obtained from receiver coil 5 is increased by resonance. In addition, the output signal V of receiver coil 5 increased by resonance is amplified by amplifier 32.

Figure 22:
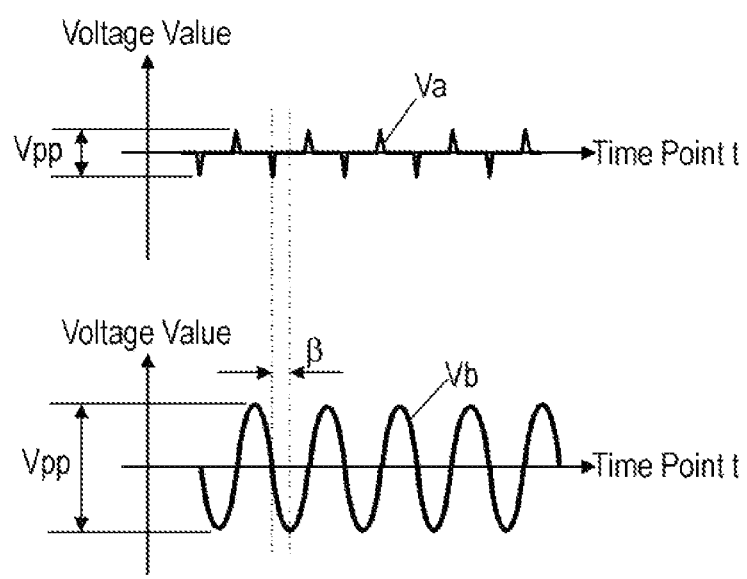
FIG. 22 illustrates an output signal of a receiver coil of the position sensor according to the seventh exemplary embodiment.

FIG. 22 illustrates an output signal Va that is the output signal V obtained from receiver coil 5 in a case where capacitor 91 is not included and resonant circuit 91a is not formed. FIG. 22 also illustrates an output signal Vb that is the output signal V obtained from receiver coil 5 in a case where capacitor 91 illustrated in FIG. 21 is included to form resonant circuit 91a. According to results of measurement of an amplitude voltage value Vpp of the output signals Va and Vb obtained from receiver coil 5 (a value after amplification by amplifier 32), the output signal Vb from receiver coil 5 of the position sensor of the present exemplary embodiment in which resonant circuit 91a is formed has the amplitude voltage value Vpp about several times higher than the output signal Vb from receiver coil 5 of the position sensor that does not include capacitor 91 to form resonant circuit 91a. Thus, since position sensor 1e in accordance with the present exemplary embodiment includes capacitor 91 to form resonant circuit 91a, the amplitude of the output signal V obtained from receiver coil 5 increased amplified by resonance.

In addition, since position sensor 1e in accordance with the present exemplary embodiment includes capacitor 91 to form resonant circuit 91a, the output obtained from receiver coil 5 has a high S/N ratio. This is for the following reason. In a case where the input waves $Wi_1$ and $Wi_2$ are rectangular waves, since a rectangular wave is generally superimposition of waves having frequencies of odd multiples of a fundamental frequency, a voltage that changes at the fundamental frequency f that is output from receiver coil 5 is superimposition of voltages that changes at frequencies of odd multiples of the fundamental frequency f. Therefore, only a frequency component out of frequency components of the output signal V of receiver coil 5 which has to the fundamental frequency f resonates and is increased by resonant circuit 91a. The frequency components of the output signal V that are three or higher times odd multiples of the fundamental frequency f do not resonate and are not increased by resonant circuit 91a. This eliminates high-frequency components, which are frequency components of odd multiples of the fundamental frequency f, and thus the output signal V obtained from receiver coil 5 has a higher S/N ratio. Thus, since position sensor 1e in accordance with the present exemplary embodiment includes capacitor 91 to form resonant circuit 91a, the output signal V obtained from receiver coil 5 has a higher S/N ratio because of resonance.

The fundamental frequency f of the output signal V of receiver coil 5 is preferably exactly identical to the resonant frequency (resonant point) of resonant circuit 91a composed of receiver coil 5 and capacitor 91. However, even if the fundamental frequency f of the output signal V of receiver coil 5 is slightly different from the resonant frequency of resonant circuit 91a, the output signal V of receiver coil 5 resonates in resonant circuit 91a. That is, even if the fundamental frequency f of the output signal V of receiver coil 5 is slightly different from the resonant frequency of resonant circuit 91a, amplitude of the output signal V of receiver coil 5 is increased by resonance, and the S/N ratio is increased by resonance. That is, the fundamental frequency f of the input waves $Wi_1$ and $Wi_2$ may be slightly different from the resonant frequency of the resonant circuit. In accordance with the present exemplary embodiment, the fundamental frequency f of the input waves $Wi_1$ and $Wi_2$ identical to the resonant frequency of resonant circuit 91a may be slightly different from the resonant frequency of resonant circuit 91a.

The phase of output signal V obtained from receiver coil 5 is shifted by a phase shift β due to resonance. The value of the phase shift β may be a positive value or a negative value according to connection of receiver coil 5. That is, the phase of the output signal V obtained from receiver coil 5 delays or advances by the absolute value |β| of the phase shift β according to the mode of connection of receiver coil 5. The absolute value |β| of the phase shift β is π/2 when the fundamental frequency f of the input waves $Wi_1$ and $Wi_2$ is exactly identical to the resonant frequency of resonant circuit 91a. When the fundamental frequency f of the input waves $Wi_1$ and $Wi_2$ is slightly different from the resonant frequency of the resonant circuit, the absolute value |β| of the phase shift β is different from π/2 according to the difference from the fundamental frequency f. FIG. 22 illustrates the measurement results of the amplitude voltage value Vpp when the value of the phase shift β caused by resonance is different from π/2, that is, when the fundamental frequency f of the output signal V of receiver coil 5 is slightly different from the resonant frequency of resonant circuit 91a.

The output signal V obtained from receiver coil 5 when transmission waveform generator 21 inputs the input waves $Wi_1$ and $Wi_2$ into sine coil 3 and cosine coil 4 is expressed as Formula 1, similarly the first exemplary embodiment. However, having the phase shift β caused by resonance, a phase offset α is expressed as α=β+γ+δ−π/2.

Position detector 22 detects the position X of target 2 based on the output signal V obtained from receiver coil 5, similarly to the first exemplary embodiment. That is, based on the output signal V obtained from receiver coil 5, position detector 22 measures the phase θ of the output signal V obtained from receiver coil 5, by a method similar to the first exemplary embodiment. Then, based on the measured phase θ, position detector 22 calculates the phase component $θ_X$ corresponding to the position X of target 2 to detect the position X of target 2 by a method similar to the first exemplary embodiment.

In position sensor 1e according to the present exemplary embodiment, the output signal V obtained from receiver coil 5 resonates in resonant circuit 91a composed of receiver coil 5 and capacitor 91. This resonance causes the output signal V obtained from receiver coil 5 to have large amplitude and high S/N ratio.

Accordingly, even if the input waves $Wi_1$ and $Wi_2$ input into sine coil 3 and cosine coil 4 are not waves obtained by modulation of a high-frequency wave, the output signal V of receiver coil 5 with large amplitude and high S/N ratio may be obtained, and the position X of target 2 may be detected based on the output signal V of receiver coil 5.

Therefore, position sensor 1e in accordance with the present exemplary embodiment does not necessarily include a modulation circuit for modulating a high-frequency wave to generate the input waves $Wi_1$ and $Wi_2$ input into sine coil 3 and cosine coil 4, and a demodulation circuit for demodulating the output signal V of receiver coil 5 to detect the position X of target 2 based on the output signal V of receiver coil 5. That is, position sensor 1e in accordance with the present exemplary embodiment can detect the position X of target 2 without the modulation circuit and the demodulation circuit. This may simplify circuitry of position sensor 1e. In addition, the input waves $Wi_1$ and $Wi_2$ input into sine coil 3 and cosine coil 4, which are rectangular waves and includes binary voltage values: low and high, may be easily generated with simple circuitry. This may simplify circuitry.

In addition, since resonant circuit 91a composed of receiver coil 5 and capacitor 91 is a parallel resonant circuit, the output signal V of receiver coil 5 with large amplitude and high S/N ratio may be obtained with a small current value.

In accordance with the present exemplary embodiment, the phase θ of the output signal V obtained from receiver coil 5 may be measured by a method similar to the second or third exemplary embodiment. That is, position detector 22 may be configured similarly to the second or third exemplary embodiment. In addition, the phase component $θ_X$ corresponding to the position X of target 2 may be calculated by a method similar to the fourth or fifth exemplary embodiment. That is, transmission waveform generator 21 and position detector 22 may be configured similarly to the fourth or fifth exemplary embodiment. In addition, position sensor 1e in accordance with the present exemplary embodiment may further include output adjustment unit 71 similar to output adjustment unit 71 of the sixth exemplary embodiment.

Figure 23:
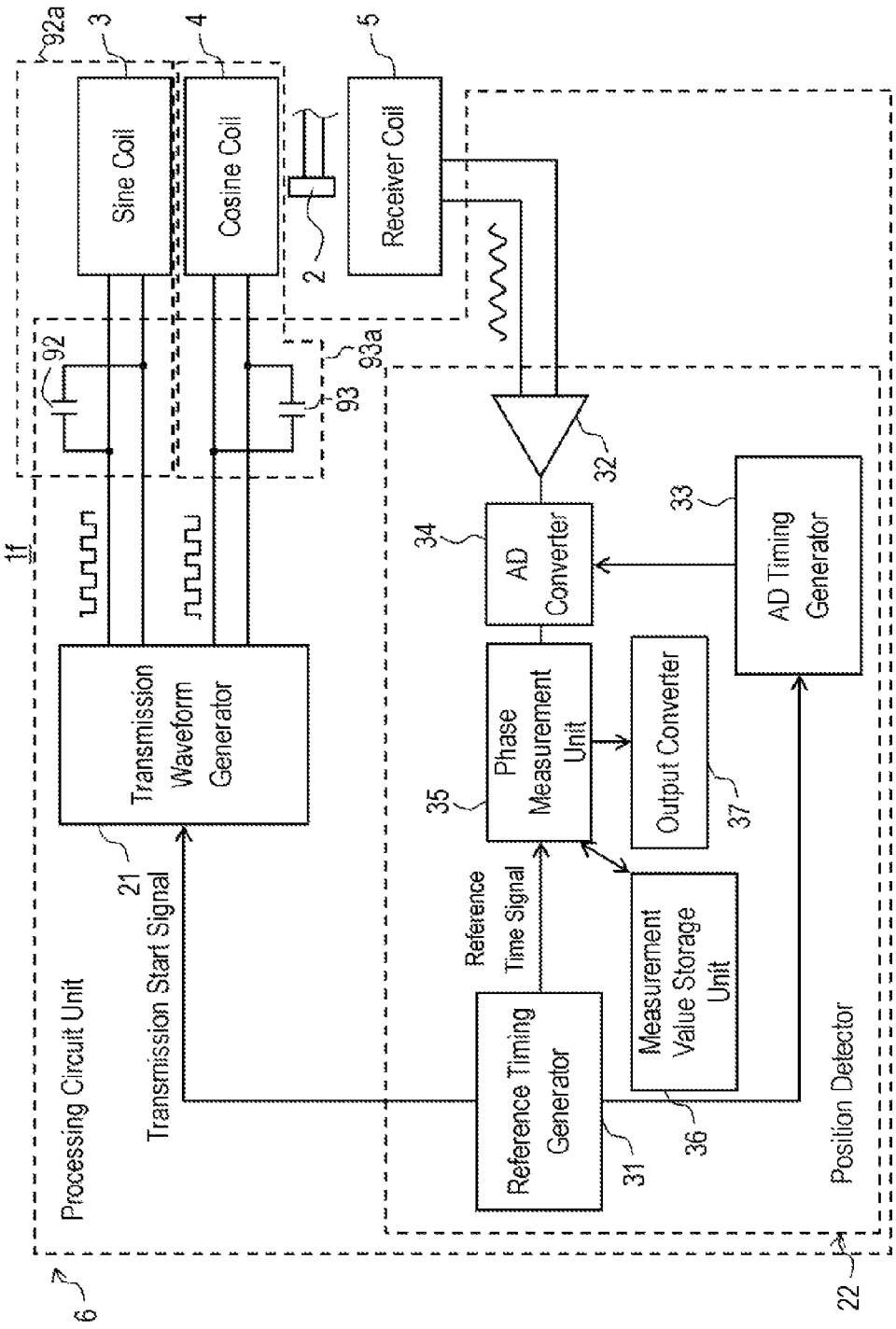
FIG. 23 is a circuit block diagram of another position sensor according to the seventh exemplary embodiment.

FIG. 23 is a schematic diagram of another position sensor if in accordance with the seventh exemplary embodiment. In FIG. 23, components identical to those of position sensor 1e illustrated in FIG. 21 are denoted by the same reference numerals. Instead of capacitor 91 of the position sensor illustrated in FIG. 21, position sensor if illustrated in FIG. 23 includes capacitor 92 that forms resonant circuit 92a together with sine coil 3, and capacitor 93 that forms resonant circuit 93a together with cosine coil 4. Resonant circuit 92a formed by sine coil 3 and capacitor 92 is a parallel resonant circuit, and resonant circuit 93a formed by cosine coil 4 and capacitor 93 is a parallel resonant circuit. Both of the resonant frequencies of resonant circuits 92a and 93a are identical to the resonant frequency of resonant circuit 91a composed of receiver coil 5 and capacitor 91 illustrated in FIG. 21. Both of the resonant frequencies of resonant circuits 92a, 93a are identical to the fundamental frequency f of the input waves $Wi_1$ and $Wi_2$ which are rectangular waves and are input into sine coil 3 and cosine coil 4, respectively.

In position sensor 1f illustrated in FIG. 23, the input wave $Wi_1$ input into sine coil 3 resonates in resonant circuit 92a formed by sine coil 3 and capacitor 92, and the input wave $Wi_2$ input into cosine coil 4 resonates in resonant circuit 93a formed by cosine coil 4 and capacitor 93. Such resonance allows the input waves $Wi_1$ and $Wi_2$ input into sine coil 3 and cosine coil 4 to have large amplitude and high S/N ratio. This allows the output signal V obtained from receiver coil 5 to have large amplitude and high S/N ratio. This may simplify circuitry of position sensor 1f illustrated in FIG. 23 similarly to the position sensor illustrated in FIG. 21.

In addition, since resonant circuit 92a formed by sine coil 3 and capacitor 92, and resonant circuit 93a formed by cosine coil 4 and capacitor 93 are parallel resonant circuits, the output signal V of receiver coil 5 with large amplitude and high S/N ratio may be obtained with a small current value.

Figure 24:
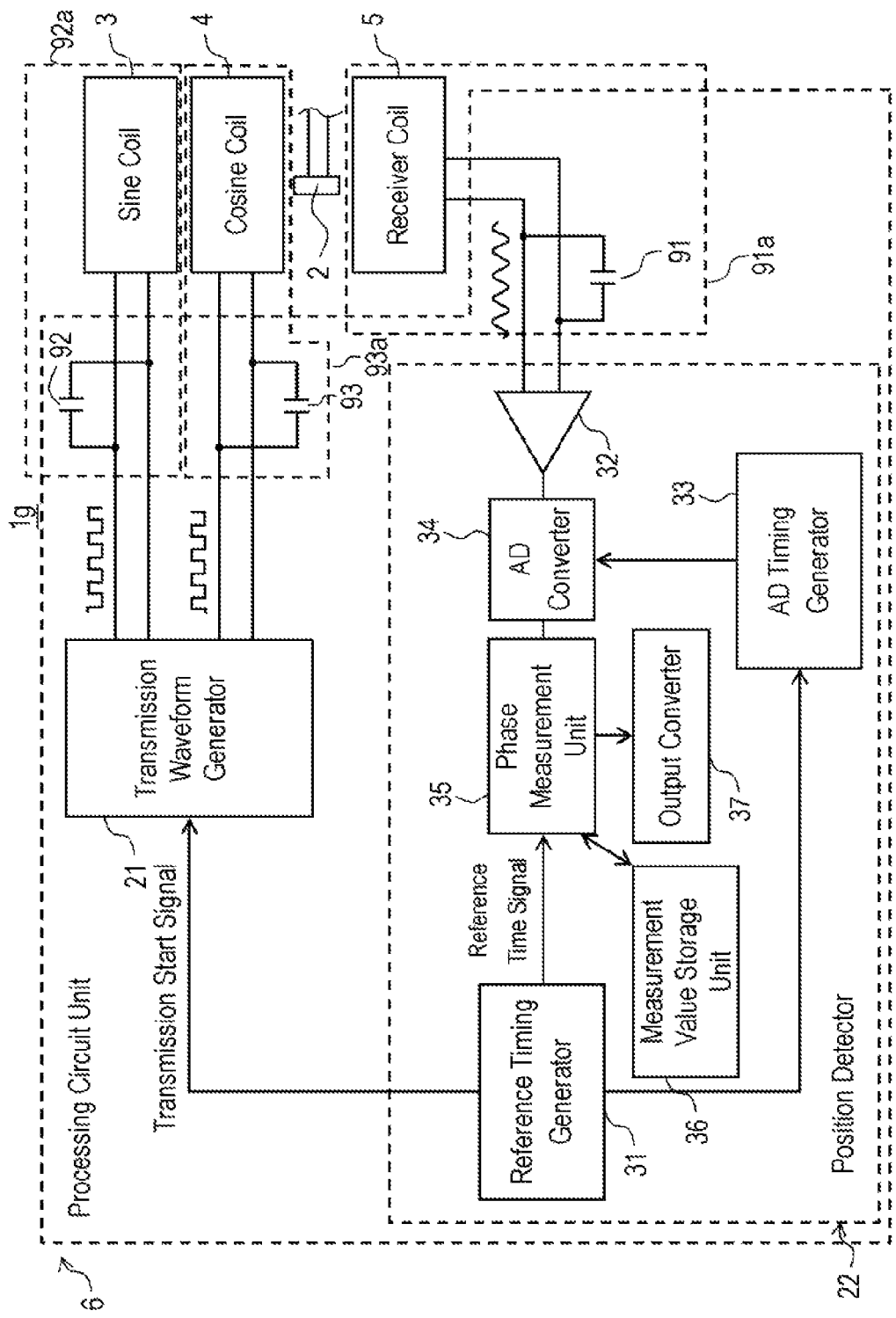
FIG. 24 is a circuit block diagram of still another position sensor according to the seventh exemplary embodiment.

FIG. 24 is a schematic diagram of still another position sensor 1g according to the seventh exemplary embodiment. In FIG. 24, components identical to those of position sensor 1e illustrated in FIG. 21 are denoted by the same reference numerals. In addition to capacitor 91 of the position sensor illustrated in FIG. 21, position sensor 1g illustrated in FIG. 24 further includes capacitor 92 that forms resonant circuit 92a together with sine coil 3, and capacitor 93 that forms resonant circuit 93a together with cosine coil 4. Resonant circuit 92a formed by sine coil 3 and capacitor 92 is a parallel resonant circuit, and resonant circuit 93a formed by cosine coil 4 and capacitor 93 is a parallel resonant circuit. Both of the resonant frequencies of resonant circuits 92a and 93a are identical to the resonant frequency of resonant circuit 91a formed by receiver coil 5 and capacitor 91. Both of the resonant frequencies of resonant circuits 92a and 93a are identical to the fundamental frequency f of the input waves $Wi_1$ and $Wi_2$ which are rectangular waves and are input into sine coil 3 and cosine coil 4, respectively.

In position sensor 1g illustrated in FIG. 24, the input wave $Wi_1$ input into sine coil 3 resonates in resonant circuit 92a formed by sine coil 3 and capacitor 92, and the input wave $Wi_2$ input into cosine coil 4 resonates in resonant circuit 93a formed by cosine coil 4 and capacitor 93. In addition, the output signal V obtained from receiver coil 5 resonates in resonant circuit 91a formed by receiver coil 5 and capacitor 91. Such resonance allows the output signal V obtained from receiver coil 5 to have large amplitude and high S/N ratio. This may simplify circuitry of position sensor 1g illustrated in FIG. 24 similarly to position sensor 1e illustrated in FIG. 21.

Moreover, in position sensor 1g illustrated in FIG. 24, in addition to resonance in resonant circuit 91a formed by receiver coil 5 and capacitor 91, resonance in resonant circuit 92a formed by sine coil 3 and capacitor 92 and resonance in resonant circuit 93a formed by cosine coil 4 and capacitor 93 allow the output signal V of receiver coil 5 to have large amplitude and high S/N ratio. Accordingly, in position sensor 1g illustrated in FIG. 24, the output signal V of receiver coil 5 that has larger amplitude and higher S/N ratio may be obtained than the position sensors illustrated in FIG. 21 and FIG. 23.

In addition, in position sensor 1g illustrated in FIG. 24, since resonant circuit 92a formed by sine coil 3 and capacitor 92, and resonant circuit 93a formed by cosine coil 4 and capacitor 93 are parallel resonant circuits, the output signal V of receiver coil 5 with large amplitude and high S/N ratio may be obtained with a small current value.

REFERENCE MARKS IN THE DRAWINGS 1a to 1g position sensor
2 target
3 sine coil (first transmission coil)
4 cosine coil (second transmission coil)
5 receiver coil
6 processing circuit unit
7 circuit board
21 transmission waveform generator
22 position detector
31 reference timing generator
32 amplifier
33 A/D timing generator
34 A/D converter
35 phase measurement unit
36 measurement value storage unit
37 output converter
41 mode selector
51 reference value storage unit
52 phase adjustment unit
71 output adjustment unit
91, 92, 93 capacitor
91a, 92a, 93a resonant circuit
$Wi_1$ input wave (first input wave)
$Wi_{1-1}$ input wave (first input wave)
$Wi_{1-2}$ input wave (second input wave)
$Wi_2$ input wave (second input wave)
$Wi_{2-1}$ input wave (third input wave)
$Wi_{2-2}$ input wave (fourth input wave)
V output signal (first output signal)
V1 output signal (first output signal)
V2 output signal (second output signal)
α phase offset
$α_1$ phase offset (first phase offset)
$α_2$ phase offset (second phase offset)
θ phase (first phase)
$θ_1$ phase (first phase)
$θ_2$ phase (second phase)
$θ_X$ phase component

The invention claimed is:

1. A position sensor comprising:
a first transmission coil for transmitting an electromagnetic wave, the first transmission coil having a first predetermined shape;
a second transmission coil for transmitting an electromagnetic wave, the second transmission coil having a second predetermined shape different from the first predetermined shape;
a receiver coil for receiving the electromagnetic waves transmitted from the first transmission coil and the second transmission coil;
a transmission waveform generator that inputs a first input wave and a second input wave to the first transmission coil and the second transmission coil, respectively, the first input wave and the second input wave having frequencies identical to each other and having phases different from each other; and
a position detector that detects a position of a target provided movably with respect to the first transmission coil, the second transmission coil, and the receiver coil based on a first output signal obtained from the receiver coil in response to the first input wave and the second input wave input from the transmission waveform generator to the first transmission coil and the second transmission coil, respectively, wherein the position detector is configured to detect the position of the target based on values obtained by sampling the first output signal obtained from the receiver coil at least two times at a sampling period different from an integer multiple of a half of a period of the first input wave and the second input wave.

2. The position sensor according to claim 1, wherein the position detector is configured to detect the position of the target based on values obtained by sampling the first output signal obtained from the receiver coil at least three times at the sampling period.

3. The position sensor according to claim 2,
wherein the sampling period is R/N times the period of the first input wave and the second input wave where N is an integer not smaller than 3 and R is an integer which is larger than N and which is not an integer multiple of N, and
wherein the position detector is configured to detect the position of the target based on values obtained by sampling the first output signal obtained from the receiver coil N times at the sampling period.

4. The position sensor according to claim 3, wherein the position detector is configured to detect the position of the target based on values obtained by sampling the first output signal obtained from the receiver coil N×m times at the sampling period (m is an integer not smaller than 2).

5. The position sensor according to claim 1,
wherein the phases of the first input wave and the second input wave have a first predetermined phase relationship,
wherein the transmission waveform generator has a first mode in which the first input wave and the second input wave are input to the first transmission coil and the second transmission coil, respectively, and a second mode in which a third input wave and a fourth input wave are input to the first transmission coil and the second transmission coil, respectively, the third input wave and the fourth input wave having the frequencies of the first input wave and the second input wave, the third input wave and the fourth input wave having phases that are different from each other and that have a second predetermined phase relationship different from the first predetermined phase relationship,
wherein the first output signal is obtained from the receiver coil in the first mode,
wherein a second first output signal is obtained from the receiver coil in the second mode, and
wherein the position detector includes:
a phase measurement unit that calculates a phase component corresponding to the position of the target based on a value obtained by sampling the first output signal at the sampling period and a value obtained by sampling the second output signal at the sampling period, the phase component being included in a first phase of the first output signal and a second phase of the second output signal; and
an output converter that converts the phase component calculated by the phase measurement unit into the position of the target.

6. The position sensor according to claim 5, wherein the phase measurement unit is configured to:

measure the first phase of the first output signal based on the value obtained by sampling the first output signal;
measure the second phase of the second output signal based on the value obtained by sampling the second output signal; and
calculate the phase component corresponding to the position of the target based on the first phase and the second phase.

7. The position sensor according to claim 1,
wherein the phases of the first input wave and the second input wave have a first predetermined phase relationship,
wherein the transmission waveform generator has a first mode in which the first input wave and the second input wave are input to the first transmission coil and the second transmission coil, respectively, and has a second mode in which a third input wave and a fourth input wave are input to the first transmission coil and the second transmission coil, respectively, the third input wave and the fourth input wave having the frequencies of the first input wave and the second input wave, the third input wave and the fourth input wave having phases that are different from each other and that have a second predetermined phase relationship different from the first predetermined phase relationship,
wherein the first output signal is obtained from the receiver coil in the first mode,
wherein a second first output signal is obtained from the receiver coil in the second mode, and
wherein the position detector includes:
a phase measurement unit that measures a first phase of the first output signal based on a value obtained by sampling the first output signal, and that measures a second phase of the second output signal based on a value obtained by sampling the second output signal;
a phase adjustment unit that calculates a first phase offset and a second phase offset included in the first phase and the second phase, respectively, and that adjusts and calculates a phase component included in the first phase and the second phase based on the first phase offset and the second phase offset, the phase component included in the first phase and the second phase corresponding to the position of the target; and
an output converter that converts the phase component corresponding to the position of the target calculated by the phase adjustment unit into the position of the target.

8. The position sensor according to claim 1, further comprising an output adjustment unit that adjusts magnitude of the output signal obtained from the receiver coil.

9. The position sensor according to claim 1, further comprising
a capacitor that forms a resonant circuit together with at least one of the first transmission coil, the second transmission coil, and the receiver coil,
wherein the transmission waveform generator inputs, into the first transmission coil and the second transmission coil, a first rectangular wave and a second rectangular wave as the first input wave and the second input wave, respectively, the first rectangular wave and the second rectangular wave having frequencies identical to a resonant frequency of the resonant circuit.

* * * * *